US009656495B2

(12) United States Patent
Noda

(10) Patent No.: US 9,656,495 B2
(45) Date of Patent: May 23, 2017

(54) TAPE CASSETTE

(75) Inventor: Kengo Noda, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/430,033

(22) Filed: Mar. 26, 2012

(65) Prior Publication Data

US 2012/0175454 A1 Jul. 12, 2012

Related U.S. Application Data

(63) Continuation-in-part of application No. PCT/JP2009/071812, filed on Dec. 28, 2009.

(51) Int. Cl.

*G03B 23/02* (2006.01)
*G11B 23/087* (2006.01)
*B41J 32/00* (2006.01)
*B41J 15/04* (2006.01)
*B41J 3/407* (2006.01)

(52) U.S. Cl.

CPC ............ *B41J 32/00* (2013.01); *B41J 3/4075* (2013.01); *B41J 15/044* (2013.01)

(58) Field of Classification Search

USPC ...... 242/348, 348.1, 348.2, 348.4, 341, 344, 242/563, 563.1, 534, 912
See application file for complete search history.

(56) References Cited

U.S. PATENT DOCUMENTS 3,901,372 A 8/1975 Denley
4,127,883 A 11/1978 Mestdagh
4,226,547 A 10/1980 Bradshaw et al.
4,360,278 A 11/1982 Paque
D267,330 S 12/1982 Worrell
4,391,539 A 7/1983 Connoy
4,402,619 A 9/1983 Paque et al.
4,557,617 A 12/1985 Richardson et al.
4,567,488 A 1/1986 Moriguchi et al.

(Continued)

FOREIGN PATENT DOCUMENTS

AU 2003294971 A1 7/2004
CA 2108332 A1 4/1994

(Continued)

OTHER PUBLICATIONS

U.S. Office Action issued in U.S. Appl. No. 13/934,512 on Nov. 19, 2013.

(Continued)

*Primary Examiner* — Emmanuel M Marcelo
*Assistant Examiner* — Angela Caligiuri
(74) *Attorney, Agent, or Firm* — Banner & Witcoff, Ltd.

(57) ABSTRACT

A tape cassette is provided with a cassette case, a tape, a tape discharge portion, a first indicator portion, a first indicator member and a first attachment portion. The cassette case includes a bottom case and a top case. The tape is a print medium. The tape discharge portion discharges the tape from the cassette case. The first indicator portion includes at least one indicator hole and indicates a type of the tape. The first indicator member is provided with the first indicator portion. The first attachment portion is provided on an upstream side of the tape discharge portion and to which the first indicator member is attached.

15 Claims, 24 Drawing Sheets

(56) References Cited

U.S. PATENT DOCUMENTS

| | | | |
|---|---|---|---|
| 4,678,353 A | 7/1987 | Richardson et al. | |
| 4,725,155 A | 2/1988 | Kittel et al. | |
| 4,773,775 A | 9/1988 | Bradshaw et al. | |
| 4,815,871 A | 3/1989 | McGourty et al. | |
| 4,815,874 A | 3/1989 | Richardson et al. | |
| 4,815,875 A | 3/1989 | Richardson et al. | |
| 4,832,514 A | 5/1989 | Basile | |
| 4,844,636 A | 7/1989 | Paque | |
| 4,880,325 A | 11/1989 | Ueda et al. | |
| 4,892,425 A | 1/1990 | Shimizu et al. | |
| D307,296 S | 4/1990 | Ivarson et al. | |
| 4,915,516 A | 4/1990 | Shimizu et al. | |
| 4,917,514 A | 4/1990 | Richardson et al. | |
| D307,918 S | 5/1990 | Goda | |
| 4,927,278 A | 5/1990 | Kuzuya et al. | |
| 4,930,913 A | 6/1990 | Basile | |
| D311,416 S | 10/1990 | Richardson et al. | |
| 4,966,476 A | 10/1990 | Kuzuya et al. | |
| 4,983,058 A | 1/1991 | Nagae | |
| 5,022,771 A | 6/1991 | Paque | |
| D319,070 S | 8/1991 | Lavander | |
| D320,391 S | 10/1991 | Paque | |
| 5,056,940 A | 10/1991 | Basile | |
| 5,078,523 A | 1/1992 | McGourty et al. | |
| 5,098,208 A | 3/1992 | Martinez | |
| 5,104,247 A | 4/1992 | Ohshima | |
| 5,111,216 A | 5/1992 | Richardson et al. | |
| 5,188,469 A | 2/1993 | Nagao et al. | |
| 5,193,919 A | 3/1993 | Godo et al. | |
| 5,195,835 A | 3/1993 | Collins | |
| 5,203,951 A | 4/1993 | Hattori et al. | |
| 5,223,939 A | 6/1993 | Imaizumi et al. | |
| 5,239,437 A | 8/1993 | Hoge et al. | |
| D342,275 S | 12/1993 | Cooper | |
| RE34,521 E | 1/1994 | Shimizu et al. | |
| 5,277,503 A | 1/1994 | Nagao | |
| 5,318,370 A | 6/1994 | Nehowig | |
| 5,348,406 A | 9/1994 | Yoshiaki et al. | |
| 5,350,243 A | 9/1994 | Ichinomiya et al. | |
| D352,305 S | 11/1994 | Cooper | |
| 5,374,132 A | 12/1994 | Kimura | |
| D356,333 S | 3/1995 | Pearce et al. | |
| 5,395,173 A | 3/1995 | Ueno et al. | |
| 5,399,033 A | 3/1995 | Putman | |
| D357,497 S | 4/1995 | Gray et al. | |
| 5,411,339 A | 5/1995 | Bahrabadi et al. | |
| 5,419,648 A | 5/1995 | Nagao et al. | |
| D359,303 S | 6/1995 | Gray et al. | |
| 5,424,757 A | 6/1995 | Thom | |
| 5,429,443 A | 7/1995 | Kobayashi et al. | |
| 5,431,504 A | 7/1995 | Beadman et al. | |
| 5,435,657 A | 7/1995 | Pearce et al. | |
| 5,466,076 A | 11/1995 | Kobayashi et al. | |
| 5,492,282 A | 2/1996 | Okuchi et al. | |
| 5,492,420 A | 2/1996 | Nunokawa et al. | |
| 5,494,362 A | 2/1996 | Kobayashi et al. | |
| 5,506,736 A | 4/1996 | Ota | |
| 5,511,891 A | 4/1996 | Nehowig et al. | |
| 5,518,328 A | 5/1996 | Okuchi et al. | |
| D372,044 S | 7/1996 | Ware et al. | |
| 5,533,818 A | 7/1996 | Bahrabadi | |
| 5,536,092 A | 7/1996 | Yamaguchi | |
| 5,538,352 A | 7/1996 | Sugiura | |
| 5,540,510 A | 7/1996 | Sims et al. | |
| 5,541,796 A | 7/1996 | Sawada | |
| 5,553,952 A | 9/1996 | Umbach | |
| 5,564,843 A | 10/1996 | Kawaguchi | |
| 5,593,237 A | 1/1997 | Nozaki et al. | |
| 5,595,447 A | 1/1997 | Takayama et al. | |
| 5,599,119 A | 2/1997 | Nunokawa et al. | |
| 5,605,404 A | 2/1997 | Nunokawa et al. | |
| 5,620,268 A * | 4/1997 | Yamaguchi et al. | 400/613 |
| 5,634,728 A | 6/1997 | Nunokawa et al. | |
| 5,653,542 A | 8/1997 | Sugimoto et al. | |
| 5,658,083 A | 8/1997 | Day et al. | |
| 5,659,441 A | 8/1997 | Eckberg et al. | |
| 5,709,486 A | 1/1998 | Day | |
| 5,727,888 A | 3/1998 | Sugimoto et al. | |
| 5,730,536 A | 3/1998 | Yamaguchi | |
| 5,739,839 A | 4/1998 | Iwai et al. | |
| 5,752,777 A | 5/1998 | Nunokawa et al. | |
| 5,765,954 A | 6/1998 | Nunokawa et al. | |
| 5,771,803 A | 6/1998 | Takami | |
| 5,788,387 A | 8/1998 | Takayama et al. | |
| 5,795,086 A | 8/1998 | Watanabe et al. | |
| 5,813,773 A | 9/1998 | Kawai | |
| 5,813,779 A | 9/1998 | Palmer et al. | |
| 5,823,689 A | 10/1998 | Nehowig et al. | |
| 5,825,724 A | 10/1998 | Matsumoto et al. | |
| 5,826,995 A | 10/1998 | Day et al. | |
| 5,857,788 A | 1/1999 | Gutsell et al. | |
| 5,860,752 A | 1/1999 | Watanabe et al. | |
| 5,887,993 A | 3/1999 | Nunokawa et al. | |
| 5,961,225 A | 10/1999 | Nunokawa et al. | |
| 5,964,539 A | 10/1999 | Yamaguchi et al. | |
| 5,967,678 A | 10/1999 | Nunokawa et al. | |
| 5,997,194 A | 12/1999 | Nunokawa et al. | |
| 6,012,860 A | 1/2000 | Nunokawa et al. | |
| 6,042,280 A | 3/2000 | Yamaguchi et al. | |
| 6,048,118 A | 4/2000 | Martinez et al. | |
| 6,050,672 A | 4/2000 | Matsuhashi | |
| 6,050,734 A | 4/2000 | Watanabe et al. | |
| 6,059,469 A | 5/2000 | Hirumi | |
| 6,106,171 A | 8/2000 | Nunokawa et al. | |
| 6,116,796 A | 9/2000 | Yamaguchi et al. | |
| 6,126,344 A | 10/2000 | Takayama et al. | |
| 6,132,120 A | 10/2000 | Yamaguchi et al. | |
| 6,146,034 A | 11/2000 | Watanabe et al. | |
| 6,149,325 A | 11/2000 | Nunokawa et al. | |
| 6,160,679 A | 12/2000 | Maekawa et al. | |
| 6,168,328 B1 | 1/2001 | Ueda et al. | |
| 6,190,065 B1 | 2/2001 | Brzuskiewicz | |
| 6,190,069 B1 | 2/2001 | Yamaguchi et al. | |
| 6,196,740 B1 | 3/2001 | Yamaguchi et al. | |
| 6,227,477 B1 | 5/2001 | Komatsuzaki et al. | |
| 6,232,993 B1 | 5/2001 | Kobayashi et al. | |
| 6,270,269 B1 | 8/2001 | Watanabe et al. | |
| 6,317,156 B1 | 11/2001 | Nagasaki et al. | |
| 6,334,724 B2 | 1/2002 | Yamaguchi et al. | |
| 6,386,774 B1 | 5/2002 | Takayama et al. | |
| 6,406,202 B1 | 6/2002 | Unno et al. | |
| 6,435,744 B1 | 8/2002 | Dunn et al. | |
| 6,476,838 B1 | 11/2002 | Italiano | |
| 6,485,206 B1 | 11/2002 | Takahashi | |
| 6,520,696 B2 | 2/2003 | Huss et al. | |
| 6,644,876 B2 | 11/2003 | Carriere et al. | |
| D486,853 S | 2/2004 | Wilken et al. | |
| 6,709,179 B2 | 3/2004 | Yamaguchi et al. | |
| 6,910,819 B2 | 6/2005 | Carriero et al. | |
| 6,929,415 B2 | 8/2005 | Wilken | |
| 6,955,318 B2 | 10/2005 | Nonomura | |
| D519,522 S | 4/2006 | Lee | |
| 7,070,347 B2 | 7/2006 | Carriere et al. | |
| 7,070,348 B2 | 7/2006 | Sugimoto et al. | |
| 7,097,372 B1 | 8/2006 | Heyse et al. | |
| 7,121,751 B2 | 10/2006 | Harada et al. | |
| 7,128,483 B2 | 10/2006 | Harada et al. | |
| D534,203 S | 12/2006 | Harada et al. | |
| 7,201,522 B2 | 4/2007 | Bandholz et al. | |
| D542,334 S | 5/2007 | Harada et al. | |
| 7,232,268 B2 | 6/2007 | Sugimoto et al. | |
| 7,287,715 B2 | 10/2007 | Ban | |
| 7,296,941 B2 | 11/2007 | Suzuki et al. | |
| 7,357,585 B2 | 4/2008 | Kurashina | |
| 7,404,684 B2 | 7/2008 | Sugimoto et al. | |
| D579,942 S | 11/2008 | Terry et al. | |
| 7,503,714 B2 | 3/2009 | Yamamoto et al. | |
| 7,841,790 B2 | 11/2010 | Yamaguchi et al. | |
| 7,942,594 B2 | 5/2011 | Kumazaki et al. | |
| 7,965,308 B2 | 6/2011 | Jauert et al. | |
| 8,045,288 B2 | 10/2011 | Ota et al. | |
| 8,109,684 B2 | 2/2012 | Yamaguchi | |
| 8,162,553 B2 | 4/2012 | Vandermeulen | |
| 8,164,609 B2 | 4/2012 | Liu et al. | |

(56) References Cited

U.S. PATENT DOCUMENTS

| | | | |
|---|---|---|---|
| 8,382,389 | B2 | 2/2013 | Yamaguchi et al. |
| D681,727 | S | 5/2013 | Van Den Broecke |
| 8,529,142 | B2 | 9/2013 | Tanaka |
| 8,540,444 | B2 | 9/2013 | Vandermeulen et al. |
| 8,562,228 | B2 | 10/2013 | Yamaguchi et al. |
| 8,641,304 | B2 | 2/2014 | Yamaguchi et al. |
| 8,734,035 | B2 | 5/2014 | Suva et al. |
| 8,740,482 | B2 | 6/2014 | Yamaguchi et al. |
| 8,757,907 | B2 | 6/2014 | Yamaguchi et al. |
| 8,764,326 | B2 | 7/2014 | Yamaguchi et al. |
| 8,770,877 | B2 | 7/2014 | Yamaguchi et al. |
| 2002/0006303 | A1 | 1/2002 | Yamaguchi et al. |
| 2002/0012558 | A1 | 1/2002 | Huss et al. |
| 2002/0047063 | A1 | 4/2002 | Kaneda et al. |
| 2002/0135938 | A1 | 9/2002 | Hiraguchi et al. |
| 2003/0081978 | A1 | 5/2003 | Carriere et al. |
| 2004/0056143 | A1 | 3/2004 | Nonomura |
| 2004/0062586 | A1 | 4/2004 | Harada et al. |
| 2004/0233269 | A1 | 11/2004 | Tsubota |
| 2004/0265027 | A1 | 12/2004 | Hine et al. |
| 2005/0036816 | A1 | 2/2005 | Carriere et al. |
| 2005/0152732 | A1 | 7/2005 | Bandholz et al. |
| 2005/0172981 | A1 | 8/2005 | Byun |
| 2006/0008608 | A1 | 1/2006 | Kurashina |
| 2006/0088802 | A1 | 4/2006 | Akaiwa |
| 2006/0182921 | A1 | 8/2006 | Hioki et al. |
| 2006/0193669 | A1 | 8/2006 | Takada et al. |
| 2006/0204304 | A1 | 9/2006 | Hioki et al. |
| 2006/0216099 | A1 | 9/2006 | Sakano et al. |
| 2006/0216100 | A1 | 9/2006 | Minoya et al. |
| 2006/0233582 | A1 | 10/2006 | Horiuchi |
| 2006/0238600 | A1 | 10/2006 | Vandermeulen et al. |
| 2006/0239743 | A1 | 10/2006 | Naito |
| 2007/0009302 | A1 | 1/2007 | Vandermeulen |
| 2007/0009306 | A1 | 1/2007 | Harada et al. |
| 2007/0031171 | A1 | 2/2007 | Heyse et al. |
| 2007/0041772 | A1 | 2/2007 | Harada et al. |
| 2007/0070168 | A1 | 3/2007 | Mindler et al. |
| 2007/0098473 | A1 | 5/2007 | Heyse et al. |
| 2007/0172293 | A1 | 7/2007 | Vandermeulen |
| 2007/0212149 | A1 | 9/2007 | Ota et al. |
| 2007/0231041 | A1 | 10/2007 | Ueda et al. |
| 2007/0237562 | A1 | 10/2007 | Kato et al. |
| 2007/0264070 | A1 | 11/2007 | Loo et al. |
| 2007/0283249 | A1 | 12/2007 | Nose et al. |
| 2008/0003043 | A1 | 1/2008 | Fukui et al. |
| 2008/0050160 | A1 | 2/2008 | Yamaguchi et al. |
| 2008/0056793 | A1 | 3/2008 | Yokoyama |
| 2008/0080922 | A1 | 4/2008 | Vandermeulen |
| 2008/0181703 | A1 | 7/2008 | Ito et al. |
| 2008/0181708 | A1 | 7/2008 | Yamaguchi et al. |
| 2008/0226373 | A1 | 9/2008 | Yamaguchi et al. |
| 2008/0232886 | A1 | 9/2008 | Kato et al. |
| 2008/0310904 | A1 | 12/2008 | Yamaguchi et al. |
| 2009/0016795 | A1 | 1/2009 | Caveney et al. |
| 2009/0190988 | A1 | 7/2009 | Vereecken et al. |
| 2009/0202283 | A1 | 8/2009 | Kumazaki et al. |
| 2009/0285617 | A1 | 11/2009 | Vandermeulen |
| 2010/0119281 | A1 | 5/2010 | Ford et al. |
| 2010/0166475 | A1 | 7/2010 | Yamaguchi et al. |
| 2010/0166478 | A1 | 7/2010 | Yamaguchi et al. |
| 2010/0166479 | A1 | 7/2010 | Yamaguchi et al. |
| 2010/0232862 | A1 | 9/2010 | Vandermeulen |
| 2010/0247208 | A1 | 9/2010 | Yamaguchi et al. |
| 2010/0247209 | A1 | 9/2010 | Yamaguchi et al. |
| 2010/0247210 | A1 | 9/2010 | Yamaguchi et al. |
| 2010/0272492 | A1 | 10/2010 | Van Britsom et al. |
| 2011/0058884 | A1 | 3/2011 | Kato et al. |
| 2012/0008999 | A1 | 1/2012 | Yamaguchi et al. |
| 2012/0027485 | A1 | 2/2012 | Suva et al. |
| 2012/0027486 | A1 | 2/2012 | Suva et al. |
| 2012/0027487 | A1 | 2/2012 | Suva et al. |
| 2012/0057917 | A1 | 3/2012 | Van Britsom et al. |
| 2012/0080550 | A1 | 4/2012 | Yamaguchi et al. |
| 2012/0170959 | A1 | 7/2012 | Vandermeulen et al. |
| 2012/0188325 | A1 | 7/2012 | Yamaguchi et al. |
| 2012/0189366 | A1 | 7/2012 | Yamaguchi et al. |
| 2012/0201588 | A1 | 8/2012 | Yamaguchi et al. |
| 2014/0205350 | A1 | 7/2014 | Yamaguchi et al. |
| 2014/0218458 | A1 | 8/2014 | Suva et al. |

FOREIGN PATENT DOCUMENTS

| | | | |
|---|---|---|---|
| CA | 2182264 | A1 | 6/1996 |
| CN | 1098984 | A | 2/1995 |
| CN | 1119146 | A | 3/1996 |
| CN | 1143928 | A | 2/1997 |
| CN | 1146954 | A | 4/1997 |
| CN | 1148547 | A | 4/1997 |
| CN | 1148548 | | 4/1997 |
| CN | 1166155 | A | 11/1997 |
| CN | 1469811 | | 1/2001 |
| CN | 1289293 | | 3/2001 |
| CN | 1313197 | A | 9/2001 |
| CN | 1313198 | A | 9/2001 |
| CN | 1085151 | C | 5/2002 |
| CN | 1376115 | | 10/2002 |
| CN | 1385312 | A | 12/2002 |
| CN | 1385313 | A | 12/2002 |
| CN | 1385314 | A | 12/2002 |
| CN | 1397431 | | 2/2003 |
| CN | 1415482 | A | 5/2003 |
| CN | 1415484 | | 5/2003 |
| CN | 1415484 | A | 5/2003 |
| CN | 1493462 | | 5/2004 |
| CN | 1636755 | | 7/2005 |
| CN | 1642746 | | 7/2005 |
| CN | 1663807 | A | 9/2005 |
| CN | 1744993 | A | 3/2006 |
| CN | 17444994 | A | 3/2006 |
| CN | 1762720 | | 4/2006 |
| CN | 1799850 | A | 7/2006 |
| CN | 1799851 | A | 7/2006 |
| CN | 1820940 | A | 8/2006 |
| CN | 1827386 | | 9/2006 |
| CN | 1835867 | | 9/2006 |
| CN | 1865012 | A | 11/2006 |
| CN | 1914045 | A | 2/2007 |
| CN | 1990261 | A | 7/2007 |
| CN | 1331684 | C | 8/2007 |
| CN | 101028771 | A | 9/2007 |
| CN | 101039807 | A | 9/2007 |
| CN | 101060985 | | 10/2007 |
| CN | 101128324 | | 2/2008 |
| CN | 101229724 | | 7/2008 |
| CN | 101264701 | A | 9/2008 |
| CN | 101264702 | A | 9/2008 |
| CN | 101310989 | | 11/2008 |
| CN | 101327696 | | 12/2008 |
| CN | 101356061 | A | 1/2009 |
| CN | 101516628 | A | 8/2009 |
| CN | 101758676 | A | 6/2010 |
| CN | 102616025 | | 8/2012 |
| CN | 202895934 | U | 4/2013 |
| EP | 214466 | A2 | 3/1987 |
| EP | 0 329 369 | A2 | 8/1989 |
| EP | 0 511 602 | A1 | 11/1992 |
| EP | 0555954 | A2 | 8/1993 |
| EP | 0593269 | A2 | 4/1994 |
| EP | 0 629 509 | A2 | 12/1994 |
| EP | 0635375 | | 1/1995 |
| EP | 0 644 506 | A2 | 3/1995 |
| EP | 0644506 | A2 | 3/1995 |
| EP | 0 684 143 | A2 | 11/1995 |
| EP | 0703089 | A1 | 3/1996 |
| EP | 0 734 878 | A2 | 10/1996 |
| EP | 0742103 | A1 | 11/1996 |
| EP | 0760291 | | 3/1997 |
| EP | 0863021 | B1 | 9/1998 |
| EP | 0644506 | | 4/1999 |
| EP | 0644506 | B1 | 4/1999 |
| EP | 0936076 | A2 | 8/1999 |
| EP | 0940263 | A2 | 9/1999 |
| EP | 0958931 | A2 | 11/1999 |

(56) References Cited

FOREIGN PATENT DOCUMENTS

| | | | |
|---|---|---|---|
| EP | 0997300 | A2 | 5/2000 |
| EP | 1167049 | A1 | 1/2002 |
| EP | 1170139 | A1 | 1/2002 |
| EP | 1 199 179 | A1 | 4/2002 |
| EP | 1199179 | A1 | 4/2002 |
| EP | 1 284 196 | A2 | 2/2003 |
| EP | 1502758 | | 2/2005 |
| EP | 1 516 739 | A1 | 3/2005 |
| EP | 1552949 | | 7/2005 |
| EP | 1575781 | A1 | 9/2005 |
| EP | 1 700 705 | A1 | 9/2006 |
| EP | 1 707 395 | A1 | 10/2006 |
| EP | 1829696 | A2 | 9/2007 |
| EP | 2059396 | A1 | 5/2009 |
| EP | 2 236 304 | A1 | 10/2010 |
| EP | 2236303 | A1 | 10/2010 |
| EP | 2448762 | B1 | 9/2013 |
| JP | S56-20944 | U | 2/1981 |
| JP | 58-139415 | U | 9/1983 |
| JP | 58220783 | | 12/1983 |
| JP | 5978879 | | 5/1984 |
| JP | 60-099692 | A | 6/1985 |
| JP | S61-179776 | | 8/1986 |
| JP | 62-173944 | | 11/1987 |
| JP | S63-81063 | U | 5/1988 |
| JP | 63-166557 | A | 7/1988 |
| JP | 63-203348 | A | 8/1988 |
| JP | 63-254085 | A | 10/1988 |
| JP | H01-195088 | A | 8/1989 |
| JP | H01-146945 | U | 10/1989 |
| JP | H02-56664 | | 4/1990 |
| JP | H02-56665 | | 4/1990 |
| JP | H02-147272 | | 6/1990 |
| JP | 3-093584 | A | 4/1991 |
| JP | 3-120680 | A | 5/1991 |
| JP | 03-151261 | | 6/1991 |
| JP | 03151261 | | 6/1991 |
| JP | 3-63155 | B2 | 9/1991 |
| JP | 3-118672 | U | 12/1991 |
| JP | 04-016113 | | 2/1992 |
| JP | 4-037575 | A | 2/1992 |
| JP | 4-133756 | A | 5/1992 |
| JP | H04-168086 | A | 6/1992 |
| JP | 5-16342 | U | 3/1993 |
| JP | 5-063067 | A | 3/1993 |
| JP | H05-18853 | | 3/1993 |
| JP | 05104840 | | 4/1993 |
| JP | 5-155067 | A | 6/1993 |
| JP | 5-54225 | U | 7/1993 |
| JP | 5-78565 | U | 10/1993 |
| JP | 5-80765 | U | 11/1993 |
| JP | 5-294051 | A | 11/1993 |
| JP | H05-301435 | | 11/1993 |
| JP | 6-012053 | U | 2/1994 |
| JP | 6-21953 | U | 3/1994 |
| JP | 07-068814 | | 3/1994 |
| JP | 6-122239 | | 5/1994 |
| JP | 6-122249 | | 5/1994 |
| JP | 6-124406 | A | 5/1994 |
| JP | 6-127094 | | 5/1994 |
| JP | 6-152907 | A | 5/1994 |
| JP | 6-53560 | U | 7/1994 |
| JP | 6-183117 | A | 7/1994 |
| JP | 6-191081 | A | 7/1994 |
| JP | 6-210889 | A | 8/1994 |
| JP | H06-255145 | A | 9/1994 |
| JP | 674348 | U | 10/1994 |
| JP | 6-328800 | A | 11/1994 |
| JP | 7-1782 | | 1/1995 |
| JP | 7-001805 | A | 1/1995 |
| JP | 7-009743 | A | 1/1995 |
| JP | 7-025123 | A | 1/1995 |
| JP | H07-25122 | | 1/1995 |
| JP | 7-047737 | A | 2/1995 |
| JP | 7-20725 | B2 | 3/1995 |
| JP | 7-061009 | A | 3/1995 |
| JP | 7-069497 | A | 3/1995 |
| JP | H07-68877 | | 3/1995 |
| JP | 7-089115 | A | 4/1995 |
| JP | 7-089196 | A | 4/1995 |
| JP | 7-101133 | A | 4/1995 |
| JP | 7-108702 | A | 4/1995 |
| JP | H07-108730 | | 4/1995 |
| JP | 7-137327 | A | 5/1995 |
| JP | 7-40456 | U | 7/1995 |
| JP | H07-214876 | | 8/1995 |
| JP | 7-237314 | A | 9/1995 |
| JP | 7-251539 | A | 10/1995 |
| JP | 7-276695 | A | 10/1995 |
| JP | 7-290803 | A | 11/1995 |
| JP | 7-314864 | A | 12/1995 |
| JP | 7-314865 | A | 12/1995 |
| JP | 7-314866 | A | 12/1995 |
| JP | 07314862 | | 12/1995 |
| JP | 8-025768 | A | 1/1996 |
| JP | 8-039909 | A | 2/1996 |
| JP | 8-58211 | A | 3/1996 |
| JP | H08-90887 | A | 4/1996 |
| JP | 8-118738 | A | 5/1996 |
| JP | H08-165035 | | 6/1996 |
| JP | 08216461 | | 8/1996 |
| JP | 8-252964 | A | 10/1996 |
| JP | 8-267839 | A | 10/1996 |
| JP | 8-290618 | A | 11/1996 |
| JP | 09-039347 | | 2/1997 |
| JP | 2596263 | B2 | 4/1997 |
| JP | H09-109533 | | 4/1997 |
| JP | 9-123579 | | 5/1997 |
| JP | 9-134557 | A | 5/1997 |
| JP | H09-118044 | A | 5/1997 |
| JP | 9-141986 | A | 6/1997 |
| JP | 09-141997 | | 6/1997 |
| JP | 9-188049 | A | 7/1997 |
| JP | 9-188050 | A | 7/1997 |
| JP | 09240158 | | 9/1997 |
| JP | 10-056604 | A | 2/1998 |
| JP | 10-181063 | A | 7/1998 |
| JP | H1-146945 | A | 2/1999 |
| JP | 11-078188 | A | 3/1999 |
| JP | H11-78189 | | 3/1999 |
| JP | 11-91144 | | 4/1999 |
| JP | 11-105351 | A | 4/1999 |
| JP | 11-129563 | A | 5/1999 |
| JP | 11-263055 | A | 9/1999 |
| JP | H11-263056 | A | 9/1999 |
| JP | 2000-006481 | A | 1/2000 |
| JP | 2000-006501 | A | 1/2000 |
| JP | 2000-025251 | A | 1/2000 |
| JP | 2000-025316 | A | 1/2000 |
| JP | 2998617 | B2 | 1/2000 |
| JP | 2000-043336 | A | 2/2000 |
| JP | 2000-043337 | A | 2/2000 |
| JP | 2000-076372 | | 3/2000 |
| JP | 2000-085224 | A | 3/2000 |
| JP | 2000-103129 | A | 4/2000 |
| JP | 2000-103131 | A | 4/2000 |
| JP | 3031439 | | 4/2000 |
| JP | 2000-135843 | A | 5/2000 |
| JP | 2000-198258 | A | 7/2000 |
| JP | 2000-211193 | | 8/2000 |
| JP | 2000-229750 | | 8/2000 |
| JP | 2001-011594 | A | 1/2001 |
| JP | 2001-048389 | A | 2/2001 |
| JP | 2001-088359 | | 4/2001 |
| JP | 2001-121797 | A | 5/2001 |
| JP | 3207860 | B2 | 9/2001 |
| JP | 2001-310540 | A | 11/2001 |
| JP | 2001-319447 | A | 11/2001 |
| JP | 2002-042441 | A | 2/2002 |
| JP | 2002-053248 | A | 2/2002 |
| JP | 3266736 | B2 | 3/2002 |
| JP | 3266739 | B2 | 3/2002 |
| JP | 2002-103762 | | 4/2002 |
| JP | 2002-104568 | A | 4/2002 |

(56) References Cited

FOREIGN PATENT DOCUMENTS

| | | | |
|---|---|---|---|
| JP | 2002-166606 | | 6/2002 |
| JP | 2002-167084 | | 6/2002 |
| JP | 2002-179300 | A | 6/2002 |
| JP | 2002166605 | | 6/2002 |
| JP | 2002-192769 | A | 10/2002 |
| JP | 2002-308481 | A | 10/2002 |
| JP | 2002-308518 | | 10/2002 |
| JP | 2002-308518 | A | 10/2002 |
| JP | 2002-367333 | A | 12/2002 |
| JP | 3357128 | B2 | 12/2002 |
| JP | 2003-011454 | | 1/2003 |
| JP | 2003-026164 | | 1/2003 |
| JP | 2003-048337 | A | 2/2003 |
| JP | 2003-506235 | | 2/2003 |
| JP | 3378622 | | 2/2003 |
| JP | 2003-072127 | | 3/2003 |
| JP | 2003145902 | A | 5/2003 |
| JP | 3426983 | | 7/2003 |
| JP | 2003-251902 | A | 9/2003 |
| JP | 2003-251904 | | 9/2003 |
| JP | 2003-285522 | A | 10/2003 |
| JP | 2004-018077 | | 1/2004 |
| JP | 2004-155150 | A | 6/2004 |
| JP | 3543659 | B2 | 7/2004 |
| JP | 2004-255656 | | 9/2004 |
| JP | 3564848 | B2 | 9/2004 |
| JP | 3567469 | | 9/2004 |
| JP | 2004-291591 | A | 10/2004 |
| JP | 2004-323241 | A | 11/2004 |
| JP | 3106187 | | 12/2004 |
| JP | 2005-059504 | | 3/2005 |
| JP | 2005-088597 | A | 4/2005 |
| JP | 2005-178206 | | 7/2005 |
| JP | 2005-231203 | A | 9/2005 |
| JP | 2005-280008 | A | 10/2005 |
| JP | 2005-297348 | A | 10/2005 |
| JP | 2005-298031 | | 10/2005 |
| JP | 2006-021432 | | 1/2006 |
| JP | 2006-096030 | A | 4/2006 |
| JP | 2006-512224 | A | 4/2006 |
| JP | 2006-142835 | A | 6/2006 |
| JP | 2006-168974 | A | 6/2006 |
| JP | 2006-182034 | A | 7/2006 |
| JP | 2006-240310 | A | 9/2006 |
| JP | 2006-248059 | A | 9/2006 |
| JP | 2006-264337 | | 10/2006 |
| JP | 2006-272895 | A | 10/2006 |
| JP | 2006-272977 | A | 10/2006 |
| JP | 2006-289991 | A | 10/2006 |
| JP | 2007-111863 | | 5/2007 |
| JP | 2007-196654 | A | 8/2007 |
| JP | 2007-230155 | A | 9/2007 |
| JP | 2007-268815 | | 10/2007 |
| JP | 2007-296863 | A | 11/2007 |
| JP | 4003068 | B2 | 11/2007 |
| JP | 2008044180 | | 2/2008 |
| JP | 4061507 | B2 | 3/2008 |
| JP | 2008062474 | A | 3/2008 |
| JP | 2008-080668 | A | 4/2008 |
| JP | 2008-083432 | A | 4/2008 |
| JP | 2008-509823 | A | 4/2008 |
| JP | 2008094103 | | 4/2008 |
| JP | 2008-213462 | A | 9/2008 |
| JP | 2008-229855 | A | 10/2008 |
| JP | 2008-254384 | | 10/2008 |
| JP | 2008-279678 | | 11/2008 |
| JP | 2008265180 | A | 11/2008 |
| JP | 2008265278 | | 11/2008 |
| JP | 2008-307703 | | 12/2008 |
| JP | 2009001020 | | 1/2009 |
| JP | 2009-028976 | A | 2/2009 |
| JP | 2009-509812 | A | 3/2009 |
| JP | 2009-184832 | A | 8/2009 |
| JP | 2009-214431 | | 9/2009 |
| JP | 2009-215083 | A | 9/2009 |
| JP | 2010-234697 | A | 10/2010 |
| JP | 4571626 | B2 | 10/2010 |
| JP | 2011-011407 | A | 1/2011 |
| JP | 2011011401 | A | 1/2011 |
| JP | 2011-110843 | A | 6/2011 |
| JP | 2011-110845 | A | 6/2011 |
| JP | 2011-110848 | A | 6/2011 |
| KR | 2007-0091073 | A | 9/2007 |
| RU | 2297333 | C2 | 4/2007 |
| TW | 200827179 | A | 7/2008 |
| WO | 96/16812 | A1 | 6/1996 |
| WO | 00/32401 | A1 | 6/2000 |
| WO | 0110649 | | 2/2001 |
| WO | 0232680 | | 4/2002 |
| WO | 03/080350 | A1 | 10/2003 |
| WO | 2004/058509 | A1 | 7/2004 |
| WO | 2005101306 | A1 | 10/2005 |
| WO | 2005/120844 | A1 | 12/2005 |
| WO | 2006/033431 | | 2/2006 |
| WO | 2006013466 | | 2/2006 |
| WO | 2006/024913 | A2 | 3/2006 |
| WO | 2006033432 | A1 | 3/2006 |
| WO | 2006/090842 | A1 | 8/2006 |
| WO | 2008/029931 | A1 | 3/2008 |
| WO | 2009/107534 | A1 | 9/2009 |
| WO | 2010113445 | A1 | 10/2010 |
| WO | 20101113782 | | 10/2010 |

OTHER PUBLICATIONS

Final Office Action received in corresponding U.S. Appl. No. 12/732,457 mailed Mar. 26, 2014.

Non-Final Office Action received in corresponding U.S. Appl. No. 13/431,371 mailed Mar. 25, 2014.

Japanese Office Action in JP 2010-041323 on May 22, 2012.

Japanese Office Action in JP 2010-084499 on Jun. 12, 2012.

Japanese Office Action in JP 2008-331639 on Mar. 27, 2012.

Japanese Office Action in JP 2008-331638 on Mar. 27, 2012.

Japanese Office Action in JP 2009-156405 on Mar. 27, 2012.

Japanese Office Action in JP 2009-156406 on Mar. 27, 2012.

Japanese Office Action in JP 2009-156407 on Mar. 27, 2012.

Japanese Office Action in JP 2009-270221 on Mar. 27, 2012.

Japanese Office Action in JP 2009-086239 on May 8, 2012.

Japanese Office Action in JP 2009-086222 on Jun. 12, 2012.

International Preliminary Report on Patentability in PCT/JP2010/055310 in Apr. 11, 2012.

Chinese Office Action issued in Chinese Application No. 200910262676.7 on Apr. 26, 2013.

Chinese Office Action issued in Chinese Application No. 200910262678.6 on Apr. 19, 2013.

Chinese Office Action issued in Chinese Application No. 201080013099.9 on Apr. 15, 2013.

Japanese Office Action issued in Japanese Application No. 2009-154699 on May 21, 2013.

Japanese Office Action issued in Japanese Application No. 2009-154698 on May 21, 2013.

European Communication of EP 10711477.9 dated Sep. 6, 2012.

NZ Examination Report of NZ 596044 dated Sep. 28, 2012.

New Zealand Office Action issued in Application No. 596044 on Sep. 25, 2013.

Chinese Office Action issued in Application No. 201010150928 on Sep. 3, 2013.

U.S. Office Action issued in U.S. Appl. No. 13/240,266 on Oct. 16, 2013.

Chinese Office Action issued in Application No. 201010150090.4 on Sep. 26, 2013.

Chinese Office Action issued in Application No. 201010150109.5 on Sep. 22, 2013.

Japanese Office Action of JP 2009-270056 dated Nov. 13, 2012.

Japanese Office Action of JP 2009-297502 dated Nov. 13, 2012.

Final Office Action issued Dec. 23, 2013 in U.S. Appl. No. 13/431,350.

Japanese Office Action issued in Japanese Application No. 2011-506968 on Jan. 29, 2013.

(56) References Cited

OTHER PUBLICATIONS

Notice of Allowance issued in corresponding U.S. Appl. No. 12/732,747 mailed Feb. 19, 2014.
Notice of Allowance issued in corresponding U.S. Appl. No. 12/732,404 mailed Feb. 4, 2014.
Notice of Allowance issued in corresponding U.S. Appl. No. 12/732,828 mailed Jan. 27, 2014.
Notice of Allowance issued in corresponding U.S. Appl. No. 12/644,451 mailed Feb. 24, 2014.
May 21, 2014 (EP) Extended European Search Report issued in European Application No. 10758552.3.
May 6, 2014 (CN) Chinese Office Action issued in Chinese Application No. 201010150087.2.
May 6, 2014 (CN) Chinese Office Action issued in Chinese Application No. 201010150878.5.
May 13, 2014 (CN) Chinese Office Action issued in Chinese Application No. 201080013339.5.
Apr. 25, 2014 (MX) Mexican Office Action issued in Mexican Application No. MX/a/2011/013553.
Jun. 10, 2014 (JP) Japanese Office Action issued Japanese Application No. 2013-142488.
Jun. 24, 2014 (JP) Japanese Office Action issued Japanese Application No. 2013-153250.
Jun. 24, 2014 (JP) Japanese Office Action issued Japanese Application No. 2013-153340.
Japanese Office Action issued in Japanese Application 2010-73748 on Apr. 23, 2013.
Japanese Office Action issued in Japanese Application 2010-73750 on Apr. 23, 2013.
Nov. 15, 2011 (PCT) International Preliminary Report on Patentability issued in PCT/JP2009/071568.
Nov. 15, 2011 (PCT) International Preliminary Report on Patentability issued in PCT/JP2010/055326.
Nov. 15, 2011 (PCT) International Preliminary Report on Patentability issued in PCT/JP2010/050253.
Nov. 15, 2011 (JP) Office Action issued in Japanese Patent Application No. 2009-088241.
Nov. 15, 2011 (PCT) International Preliminary Report on Patentability issued in PCT/JP2010/055324.
Apr. 10, 2014 (CN) Office Action issued in Chinese Application No. 201010150109 [Correcting citation, "Office Action issued Apr. 1, 2001 in Chinese Application No. 20101015019" as submitted Jun. 11, 2014.].
May 20, 2010 (PCT) International Search Report in International Application No. PCT/JP2009/007086.
May 20, 2010 (PCT) International Search Report in International Application No. PCT/JP2009/007085.
Jul. 30, 2010 (PCT) International Search Report in International Application No. PCT/JP2010/002169.
Jul. 30, 2010 (PCT) International Search Report in International Application No. PCT/JP2010/002165.
Mar. 23, 2010 (PCT) International Search Report in International Application No. PCT/JP2009/071568.
May 21, 2010 (PCT) International Search Report in International Application No. PCT/JP2009/007089.
Jun. 22, 2010 (PCT) International Search Report in International Application No. PCT/JP2010/055324.
Jun. 22, 2010 (PCT) International Search Report in International Application No. PCT/JP2010/055326.
Mar. 16, 2010 (PCT) International Search Report in International Application No. PCT/JP2010/050253.
May 20, 2010 (PCT) International Search Report in International Application No. PCT/JP2009/007087.
Mar. 5, 2010 (PCT) International Search Report in International Application No. PCT/JP2009/007088.
Aug. 3, 2010 (PCT) International Search Report in International Application No. PCT/JP2010/002154.
Aug. 3, 2010 (PCT) International Search Report in International Application No. PCT/JP2010/002161.
Jun. 22, 2010 (PCT) International Search Report in International Application No. PCT/JP2010/055305.
Aug. 24, 2010 (PCT) International Search Report in International Application No. PCT/JP2010/004076.
Jun. 22, 2010 (PCT) International Search Report in International Application No. PCT/JP2010/055311.
Jun. 22, 2010 (PCT) International Search Report in International Application No. PCT/JP2010/055310.
Jun. 28, 2010 (PCT) International Search Report in International Application No. PCT/JP2010/002170.
Mar. 23, 2010 (PCT) International Search Report in International Application No. PCT/JP2009/070971.
May 21, 2010 Extended European Search Report in European Patent Application No. 09180351.
Jul. 2, 2010 Extended European Search Report in European Patent Application No. 10157994.
Jul. 12, 2010 Extended European Search Report in European Patent Application No. 10158024.
Oct. 12, 2010 Extended European Search Report in European Patent Application No. 10155348.
May 21, 2010 Extended European Search Report in European Patent Application No. 09180354.
Dec. 3, 2010 Extended European Search Report in European Patent Application No. 10175769.
Oct. 11, 2011 (JP) Office Action issued in Japanese Patent Application No. 2008-331634.
Oct. 11, 2011—(JP) Office Action issued in Japanese Patent Application No. 2009-088440.
Oct. 11, 2011 (JP) Office Action issued in Japanese Patent Application No. 2009-088227.
Oct. 11, 2011 (JP) Office Action issued in Japanese Patent Application No. 2009-088238.
Oct. 11, 2011 (JP) Office Action issued in Japanese Patent Application No. 2009-088441.
Oct. 11, 2011 (JP) Office Action issued in Japanese Patent Application No. 2009-088460.
Jan. 17, 2012 (JP) Office Action issued in Japanese Patent Application No. 2009-088456.
Mar. 16, 2010 (PCT) International Search Report and Written Opinion issued in International Application No. PCT/JP2009/071812.
Office Action issued in Chinese Patent Application 201010274378.2 dated Jan. 22, 2014.
Extended European Search Report issued Dec. 16, 2013 in EP App. No. 12160324.5.
Extended European Search Report issued Dec. 18, 2013 in EP App. No. 12160192.6.
Extended European Search Report issued Dec. 20, 2013 in EP App. No. 12161271.7.
Office Action issued Dec. 19, 2013 in Chinese Application No. 200910262674.8.
Office Action issued Jan. 17, 2014 in Chinese Application No. 201210071810.7.
Office Action issued Jan. 3, 2014 in Australian Application No. 2010231426.
Office Action issued Dec. 30, 2013 in Chinese Application No. 201010209208.6.
Office Action issued Dec. 30, 2013 in Chinese Application No. 201210070147.9.
Extended European Search Report issued Feb. 5, 2014 in EP App. No. 09852818.5.
Chinese Office Action issued in Chinese Application No. 200910262680.3 on May 2, 2013.
Chinese Office Action issued in Chinese Application 200910262679.0 on May 2, 2013.
Chinese Office Action issued in Chinese Application 200910262677.1 on May 2, 2013.
Japanese Office Action issued in Japanese Application 2010-073747 on May 14, 2013.
Japanese Office Action issued in Japanese Application 2010-073749 on May 21, 2013.
Japanese Office Action issued in Japanese Application 2010-073751 on May 28, 2013.

(56) References Cited

OTHER PUBLICATIONS

Japanese Office Action issued in Japanese Application 2010-073754 on Jun. 4, 2013.
Japanese Office Action issued in Japanese Application 2010-073755 on May 21, 2013.
Japanese Office Action issued in Japanese Application 2009-156350 on Jul. 2, 2013.
Japanese Office Action issued in Japanese Application 2009-156281 on Jul. 2, 2013.
Chinese Office Action issued in Chinese Application 2009-80161443.6 on Jun. 4, 2013.
New Zealand Office Action issued in New Zealand Application 596044 on Jul. 10, 2013.
Japanese Office Action issued in Japanese Application No. 2009-156398 on Apr. 2, 2013.
Japanese Office Action issued in Japanese Application No. 2009-156403 on Apr. 2, 2013.
Japanese Office Action issued in Japanese Application No. 2009-156281 on Apr. 2, 2013.
Japanese Office Action issued in Japanese Application No. 2009-156355 on Apr. 2, 2013.
Japanese Office Action issued in Japanese Application No. 2009-156399 on Apr. 2, 2013.
Japanese Office Action issued in Japanese Application No. 2009-156404 on Apr. 2, 2013.
Japanese Office Action issued in Japanese Application No. 2009-156350 on Apr. 2, 2013.
Japanese Office Action issued in Japanese Application No. 2009-156357 on Apr. 2, 2013.
Japanese Office Action issued in Japanese Application No. 2009-156371 on Apr. 2, 2013.
Japanese Office Action issued in Japanese Application No. 2009-270325 on Apr. 2, 2013.
Chinese Office Action issued in Chinese Application No. 200980158165.9 on Mar. 8, 2013.
European Search Report issued in Application No. 09852278.2 on Apr. 8, 2013.
International Preliminary Report on Patentability of PCT/JP2009/071812 dated Aug. 14, 2012.
Japanese Office Action of JP 2009-086172 dated Sep. 11, 2012.
Japanese Office Action of JP 2009-088449 dated Sep. 11, 2012.
Japanese Office Action of JP 2010-084500 dated Jul. 3, 2012.
Japanese Office Action of JP 2010-084501 dated Jul. 3, 2012.
Japanese Office Action of JP 2010-084502 dated Jul. 3, 2012.
Extended European Search Report issued in Application No. 09842716.4 on Nov. 6, 2013.
Chinese Office Action issued in Application No. 201010150088.7 on Sep. 30, 2013.
Chinese Office Action issued in Application No. 200980158165.9 on Oct. 28, 2013.
Extended European Search Report issued in Application No. 10758310.6 on Nov. 12, 2013.
U.S. Office Action issued in U.S. Appl. No. 13/240,216 on Nov. 13, 2013.
Japanese Office Action issue in Application No. 2011-507142 on Nov. 26, 2013.
European Office Action issued in Application No. 10711776.4 on Nov. 22, 2013.
New Zealand Office Action issue in Application No. 596044 on Nov. 8, 2013.
Japanese Office Action issue in Application No. 2011-507049 on Dec. 3, 2013.
Chinese Office Action issue in Application No. 200980161405.0 on Nov. 1, 2013.
Chinese Office Action issued in Chinese Application No. 200910262675.2 on Aug. 7, 2013.
Chinese Office Action issued in Chinese Application No. 201080013339.5 on Aug. 22, 2013.
Japanese Office Action issued in Japanese Application No. 2011507143 on Sep. 3, 2013.
Japanese Office Action issued in Japanese Application No. 2011547222 on Oct. 1, 2013.
Jul. 7, 2014 (US) Final Office Action issued in U.S. Appl. No. 13/430,080.
Jul. 22, 2014 (US) Office Action in U.S. Appl. No. 12/732,257.
Jul. 18, 2014 (US) Office Action in U.S. Appl. No. 13/431,350.
Jul. 8, 2014 (JP) Office Action issued in Japanese Patent Application No. 2013-153421.
Jul. 8, 2014 (JP) Office Action issued in Japanese Patent Application No. 2013-153495.
Jun. 27, 2014 (AU) Office Action issued in Australian Patent Application No. 2010231426.
Jun. 2, 2014 (AU) Office action issued in Australian Patent Application No. 2010231425.
Jul. 8, 2014 (CA) Office Action issued in Canadian Patent Application No. 2,755,882.
Jun. 20, 2014 (CN) Office action issued in Chinese Patent Application No. 201210070147.
Jun. 26, 2014 (CN) Office action issued in Chinese Patent Application No. 200980161405.
Aug. 28, 2014—(US) Non-Final Office Action—U.S. Appl. No. 13/240,216.
Sep. 2, 2014—(US) Non-Final Office Action—U.S. Appl. No. 14/226,165.
Sep. 9, 2014—(US) Non-Final Office Action—U.S. Appl. No. 14/226,380.
Sep. 9, 2014—(US) Non-Final Office Action—U.S. Appl. No. 14/226,417.
Sep. 10, 2014—(US) Notice of Allowance—U.S. Appl. No. 13/934,512.
Sep. 11, 2014—(US) Non-Final Office Action—U.S. Appl. No. 13/848,750.
Sep. 12, 2014—(US) Final Office Action—U.S. Appl. No. 13/431,371.
Sep. 12, 2014—(US) Non-Final Office Action—U.S. Appl. No. 14/226,386.
Sep. 22, 2014—(US) Non-Final Office Action—U.S. Appl. No. 14/141,673.
Sep. 24, 2014—(US) Notice of Allowance—U.S. Appl. No. 13/431,277.
Sep. 25, 2014—(US) Non-Final Office Action—U.S. Appl. No. 14/226,424.
Jan. 22, 2015—(US) Notice of Allowance—U.S. Appl. No. 12/732,457.
Jan. 16, 2015—(US) Non-Final Office Action—U.S. Appl. No. 14/226,402.
Jan. 20, 2015—(US) Non-Final Office Action—U.S. Appl. No. 13/431,371.
Jan. 28, 2015—(US) Notice of Allowance—U.S. Appl. No. 13/431,277.
Nov. 12, 2014 (MX) Office Action in Application No. MX/a/2011/013553.
Dec. 26, 2014—(CN) Office Action in Application No. 201080013339.5.
Jan. 22, 2015—(US) Non-Final Office Action—U.S. Appl. No. 14/226,411.
Feb. 10, 2015—(US) Notice of Allowance—U.S. Appl. No. 14/226,380.
Dec. 5, 2014—(US) Non-Final Office Action—U.S. Appl. No. 14/226,325.
Dec. 1, 2014—(US) Non-Final Office Action—U.S. Appl. No. 14/226,289.
Nov. 4, 2014—(US) Non-Final Office Action—U.S. Appl. No. 14/226,367.
Nov. 4, 2014—(US) Non-Final Office Action—U.S. Appl. No. 14/226,428.
Nov. 5, 2014—(US) Non-Final Office Action—U.S. Appl. No. 14/226,373.
Nov. 25, 2014—(US) Notice of Allowance—U.S. Appl. No. 13/934,512.
Oct. 10, 2014—(US) Notice of Allowance—U.S. Appl. No. 12/732,457.

(56) References Cited

OTHER PUBLICATIONS

Oct. 27, 2014—(US) Non-Final Office Action—U.S. Appl. No. 14/141,576.
Oct. 30, 2014 (US) Final Office Action U.S. Appl. No. 14/226,256.
Dec. 16, 2014—(US) Notice of Allowance—U.S. Appl. No. 13/240,216.
Jul. 25, 2014—(CN) Notice of Second Office Action—App 201010150090.4—Eng Tran.
Jul. 28, 2014—(CN) Notice of Second Office Action—App 201010150088.7—Eng Tran.
Aug. 12, 2014—(CN) Notice of Second Office Action—App 201210071810.7—Eng Tran.
Aug. 26, 2014—(CN) Notice of Second Office Action—App 201010274378.2—Eng Tran.
Sep. 24, 2014—(JP) Notification of Rejection—App 2013-142488—Eng Tran.
Dec. 16, 2014—(US) Non-Final Office Action—U.S. Appl. No. 14/226,259.
Jan. 2, 2015—(US) Non-Final Office Action—U.S. Appl. No. 14/226,262.
Jan. 5, 2015—(US) Non-final Office Action—U.S. Appl. No. 14/226,201.
Feb. 13, 2015—(US) Non-Final Office Action—U.S. Appl. No. 13/240,322.
Feb. 12, 2015—(US) Final Office Action—U.S. Appl. No. 12/732,257.
Feb. 12, 2015—(US) Final Office Action—U.S. Appl. No. 13/431,350.
Feb. 12, 2015—(US) Final Office Action—U.S. Appl. No. 14/226,417.
Feb. 17, 2015—(US) Final Office Action—U.S. Appl. No. 14/141,673.
Mar. 4, 2015—(US) Final Office Action—U.S. Appl. No. 14/141,576.
Mar. 4, 2015—(US) Non-Final Office Action—U.S. Appl. No. 14/226,386.
Mar. 6, 2015—(US) Final Office Action—U.S. Appl. No. 14/226,424.
Feb. 6, 2015—(EP) Extended Search Report—App. 14189221.6.
Jan. 29, 2015—(TW) Office Action—App 099132599.
Mar. 17, 2015—(US) Notice of Allowance—U.S. Appl. No. 13/848,750.
Apr. 1, 2015—(US) Notice of Allowance—U.S. Appl. No. 12/732,457.
Jan. 23, 2015 (AU) Office Action in Application No. 2010231426.
Mar. 6, 2015 (AU) Office Action in Application No. 2010231425.
Mar. 10, 2015 (JP) Office Action in Application No. 2014-095027.
Mar. 13, 2015 (US) Notice of Allowance in Application No. 14226165.
Mar. 12, 2015 (EP) Search Report in Application No. 14156840.2.
Mar. 23, 2015 (US) Notice of Allowance in Application No. 13934512.
Apr. 9, 2015—(US) Non-Final Office Action—U.S. Appl. No. 14/641,681.
Apr. 17, 2015—(US) Final Office Action—U.S. Appl. No. 14/226,367.
Apr. 21, 2015—(US) Final Office Action—U.S. Appl. No. 14/226,428.
May 1, 2015—(US) Notice of Allowance—U.S. Appl. No. 12/644,572.
May 6, 2015—(US) Final Office Action—U.S. Appl. No. 14/226,259.
May 6, 2015—(US) Final Office Action—U.S. Appl. No. 14/226,373.
Apr. 7, 2015 (TW) Office Action in Application No. 99132600.
May 19, 2015—(US) Final Office Action—U.S. Appl. No. 14/226,289.
May 19, 2015—(US) Notice of Allowance—U.S. Appl. No. 14/226,201.
May 20, 2015—(US) Notice of Allowance—U.S. Appl. No. 13/848,750.
May 29, 2015—(US) Notice of Allowance—U.S. Appl. No. 14/226,165.
Jun. 2, 2015—(US) Final Office Action—U.S. Appl. No. 14/226,262.
Jun. 5, 2015—(US) Notice of Allowance—U.S. Appl. No. 14/226,380.
Jun. 2, 2015—(US) Non-Final Office Action—U.S. Appl. No. 14/226,256.
Apr. 9, 2015—(TW) Office Action—App 099132598—Eng. Tran.
Jun. 17, 2015—(US) Final Office Action—U.S. Appl. No. 14/226,325.
May 26, 2015—(CN) Office Action—App 201310659625.4.
May 29, 2015—(MY) Substantive Examination Adverse Report—App. PI 2013702520—Eng Tran.
Jun. 1, 2015—(CN) Notification of First Office Action—App 201310717842.4—Eng Tran.
Jun. 1, 2015—(CN) Notification of First Office Action—App 201310717871.0—Eng Tran.
Jun. 19, 2015 (CN) Notification of First Office Action—App 201310659875.8.
Jul. 7, 2015—(US) Notice of Allowance—U.S. Appl. No. 14/141,673.
Jul. 16, 2015—(US) Non-Final Office Action—U.S. Appl. No. 14/226,417.
Jul. 31, 2015—(US) Final Office Action—U.S. Appl. No. 14/226,411.
Aug. 24, 2015—(US) Final Office Action—U.S. Appl. No. 14/226,402.
Apr. 2, 2015 (EP) Office Action in Application No. 10711776.4.
Apr. 9, 2015—(US) Notice of Allowance—U.S. Appl. No. 13/431,277.
Apr. 10, 2015—(US) Non-Final Office Action—U.S. Appl. No. 13/430,080.
Apr. 13, 2015—(CN) Notification of Third Office Action—App 201210071810.7—Eng. Tran.
Apr. 14, 2015—(US) Notice of Allowance—U.S. Appl. No. 13/240,266.
Apr. 20, 2015 (AU) Office Action in Application No. 2010231426.
Aug. 4, 2015—(US) Notice of Allowance—U.S. Appl. No. 14/141,576.
Aug. 6, 2015—(CN) Office Action—App 201410046812.X—Eng Tran.
Aug. 11, 2015—(AU) Patent Examination Report 1—App 2014221250.
Aug. 13, 2015—(US) Final Office Action—U.S. Appl. No. 13/431,371.
Feb. 19, 2015 (CA) Office Action in Application No. 2755885.
Jun. 25, 2015—(US) Non-Final Office Action—U.S. Appl. No. 13/431,350.
Mar. 2, 2015 (TW) Office Action in Application No. 101110368.
May 22, 2015—(US) Non-Final Office Action—U.S. Appl. No. 12/732,257.
Sep. 1, 2015—(US) Notice of Allowance—U.S. Appl. No. 14/226,259.
Sep. 8, 2015—(JP) Office Action—App 2014-210427—Eng Tran.
Sep. 8, 2015—(US) Notice of Allowance—U.S. Appl. No. 14/141,673.
Sep. 9, 2015—(US) Final Office Action—U.S. Appl. No. 14/226,386.
Sep. 17, 2015—(US) Non-Final Office Action—U.S. Appl. No. 14/226,424.
Sep. 18, 2015—(US) Non-Final Office Action—U.S. Appl. No. 14/226,428.
Oct. 1, 2015—(US) Notice of Allowance—U.S. Appl. No. 12/732,457.
Oct. 5, 2015—(US) Notice of Allowance—U.S. Appl. No. 12/644,572.
Oct. 5, 2015—(US) Notice of Allowance—U.S. Appl. No. 14/141,673.
Oct. 7, 2015—(US)—Final Office Action—U.S. Appl. No. 13/240,322.

(56) References Cited

OTHER PUBLICATIONS

Oct. 20, 2015—(US) Notice of Allowance—U.S. Appl. No. 14/226,201.
Oct. 22, 2015—(US) Final Office Action—U.S. Appl. No. 14/641,681.
Oct. 23, 2015—(US) Final Office Action—U.S. Appl. No. 13/431,350.
Oct. 30, 2015—(US)—Non-Final Office Action—U.S. Appl. No. 14/226,373.
Nov. 3, 2015—(US) Notice of Allowance—U.S. Appl. No. 14/226,259.
Nov. 9, 2015—(US) Notice of Allowance—U.S. Appl. No. 13/848,750.
Oct. 26, 2015—(US)—Non-Final Office Action—U.S. Appl. No. 14/643,865.
Nov. 13, 2015—(US) Non-Final Office Action—U.S. Appl. No. 14/226,289.
Nov. 25, 2015—(US) Final Office Action—U.S. Appl. No. 14/226,256.
Nov. 27, 2015—(US) Notice of Allowance—U.S. Appl. No. 14/226,367.
Dec. 4, 2015—(US) Notice of Allowance—U.S. Appl. No. 14/226,325.
Dec. 10, 2015—(US) Non-Final Office Action—U.S. Appl. No. 14/755,141.
Nov. 20, 2015—(KR) Office Action—App 10-2015-7006347.
Nov. 20, 2015—(KR) Office Action—App 10-2011-7017238.
Dec. 11, 2015—(US) Notice of Allowance—U.S. Appl. No. 14/226,165.
Dec. 17, 2015—(US) Non-Final Office Action—U.S. Appl. No. 14/920,398.
Dec. 21, 2015—(US) Notice of Allowance—U.S. Appl. No. 13/934,512.
Dec. 23, 2015—(US) Final Office Action—U.S. Appl. No. 14/226,417.
Oct. 27, 2015—(CN) Office Action—App 201410195767.4.
Dec. 24, 2015—(US) Non-Final Office Action—U.S. Appl. No. 14/226,380.
Nov. 27, 2015—(CN) Office Action—App 201410311930.9.
Dec. 3, 2015—(CN) Office Action—App 201510088644.5.
Jan. 12, 2016—(US) Notice of Allowance—U.S. Appl. No. 13/431,371.
Jan. 15, 2016—(US) Notice of Allowance—U.S. Appl. No. 12/732,257.
Jan. 29, 2016—(US) Notice of Allowance—U.S. Appl. No. 14/226,411.
Feb. 5, 2016—(US) Non-Final Office Action—U.S. Appl. No. 13/240,322.
Feb. 11, 2016—(US) Notice of Allowance—U.S. Appl. No. 14/226,402.
Feb. 12, 2016—(US) Notice of Allowance—U.S. Appl. No. 13/431,277.
Feb. 16, 2016—(US) Non-Final Office Action—U.S. Appl. No. 14/867,877.
Feb. 24, 2016—(US) Non-Final Office Action—U.S. Appl. No. 14/226,262.
Feb. 25, 2016—(US) Non-Final Office Action—U.S. Appl. No. 14/141,568.
Feb. 22, 2016—(US) Non-Final Office Action—U.S. Appl. No. 14/226,386.
Feb. 23, 2016—(US) Final Office Action—U.S. Appl. No. 14/226,424.
Mar. 4, 2016—(US) Notice of Allowance—U.S. Appl. No. 14/643,865.
Dec. 24, 2015—(TW) Decision of Rejection—App 101110368—Eng Tran.
Sep. 2, 2015—(CN) Notification of First Office Action—App 201410200475.5.
Sep. 22, 2016—(KR) Notice of Final Rejection—App 10-2011-7021961, Eng Tran.
Mar. 29, 2016—(US) Notice of Allowance—U.S. Appl. No. 14/641,681.
Apr. 18, 2016—(US) Final Office Action—U.S. Appl. No. 14/226,373.
Apr. 19, 2016—(US) Notice of Allowance—U.S. Appl. No. 14/226,417.
Apr. 21, 2016—(US) Notice of Allowance—U.S. Appl. No. 14/226,428.
May 3, 2016—(US) Final Office Action—U.S. Appl. No. 14/226,289.
May 25, 2016—(US) Notice of Allowance—U.S. Appl. No. 14/755,141.
Jun. 24, 2016—(US) Notice of Allowance—U.S. Appl. No. 14/226,256.
Aug. 16, 2016—(US) Notice of Allowance—U.S. Appl. No. 13/240,322.

* cited by examiner

TAPE CASSETTE

CROSS-REFERENCE TO RELATED APPLICATION

This application is a continuation-in-part of International Application No. PCT/JP2009/071812, filed Dec. 28, 2009. The disclosure of the foregoing application is hereby incorporated by reference in its entirety.

BACKGROUND

The present disclosure relates to a tape cassette that can be freely inserted into and removed from a tape printer.

In related art, a tape cassette is known which is structured to be freely inserted into and removed from a cassette housing portion of a tape printer, and which includes a cassette case in which a tape as a print medium is housed. The cassette case is provided with a bottom case and a top case that is attached to an upper side of the bottom case. Via a print head, the tape printer prints characters, such as letters, on the tape that is pulled out from the cassette case. A plurality of types of tape cassette are prepared corresponding to types (a tape width, a printing format and the like, for example) of the tape that is housed in the cassette case.

A tape cassette is known that, when it is inserted in a cassette housing portion, causes a tape printer to detect a type of a tape housed in the cassette case. In more detail, a cassette detection portion, in which through holes are formed in a pattern corresponding to the type of the tape, is provided in a portion of a lower surface of the tape cassette. A plurality of detection switches that protrude upward are provided in the cassette housing portion. When the tape cassette is inserted in the cassette housing portion, the plurality of detection switches are selectively pressed in accordance with the pattern of the through holes formed in the cassette detection portion. The tape printer detects the type of the tape in accordance with a combination of pressing and non-pressing of the plurality of detection switches.

SUMMARY

In related art, the cassette detection portion is formed on the bottom case, and it is therefore necessary to prepare a same number of the bottom cases as the number of types of the tape. In this case, when the tape cassette is manufactured, component management for the bottom cases may become complicated. In addition, since it is necessary to prepare dies that respectively correspond to the plurality of types of bottom cases, there is a possibility that manufacturing costs of the bottom cases are increased.

In addition, the pattern of the through holes and non-through portions provided in the cassette detection portion is a random pattern. Therefore, even if a person visually checks the cassette detection portion, the type of the tape cannot be recognized. For this reason, there is a risk that the type of the tape housed in the cassette case by an operator is different from the type of the tape indicated by the cassette detection portion.

Various exemplary embodiments of the broad principles derived herein provide a tape cassette that can be manufactured accurately at a low cost.

The exemplary embodiments provide a tape cassette that is provided with a cassette case, a tape, a tape discharge portion, a first indicator portion, a first indicator member and a first attachment portion. The cassette case includes a bottom case and a top case that is attached to an upper side of the bottom case, and includes a top surface, a bottom surface, a front surface and a pair of side surfaces. The tape is housed in the cassette case, the tape being a print medium. The tape discharge portion discharges, from the cassette case, the tape that has been guided in the cassette case along a predetermined feed path, at least part of which extends in parallel with the front surface. The first indicator portion includes at least one indicator hole and indicates a type of the tape. The first indicator member is a member independent from at least the bottom case, and is provided with the first indicator portion. The first attachment portion is provided on an upstream side, in a tape feed direction, of the tape discharge portion in the front surface, and to which the first indicator member is attached.

BRIEF DESCRIPTION OF THE DRAWINGS

Exemplary embodiments will be described below in detail with reference to the accompanying drawings in which.

DETAILED DESCRIPTION OF THE EXEMPLARY EMBODIMENTS

Hereinafter, various embodiments of the present disclosure will be explained with reference to the drawings. Note that in the explanation that follows, a video conference system that includes conference terminal devices that transmit and receive audio data and video data will be explained as an example of a conference system, but the present disclosure can also be applied to an audio conference system that includes conference terminal devices that transmit and receive audio data only.

A tape printer 1 and a tape cassette 30 according to a first embodiment will be explained hereinafter with reference to FIG. 1 to FIG. 13. In the explanation of the present embodiment, the lower left side, the upper right side, the lower right side and the upper left side in FIG. 1 respectively correspond to the front side, the rear side, the right side and the left side of the tape printer 1. The lower right side, the upper left side, the upper right side and the lower left side in FIG. 9 respectively correspond to the front side, the rear side, the right side and the left side of the tape cassette 30.

Figure 4:
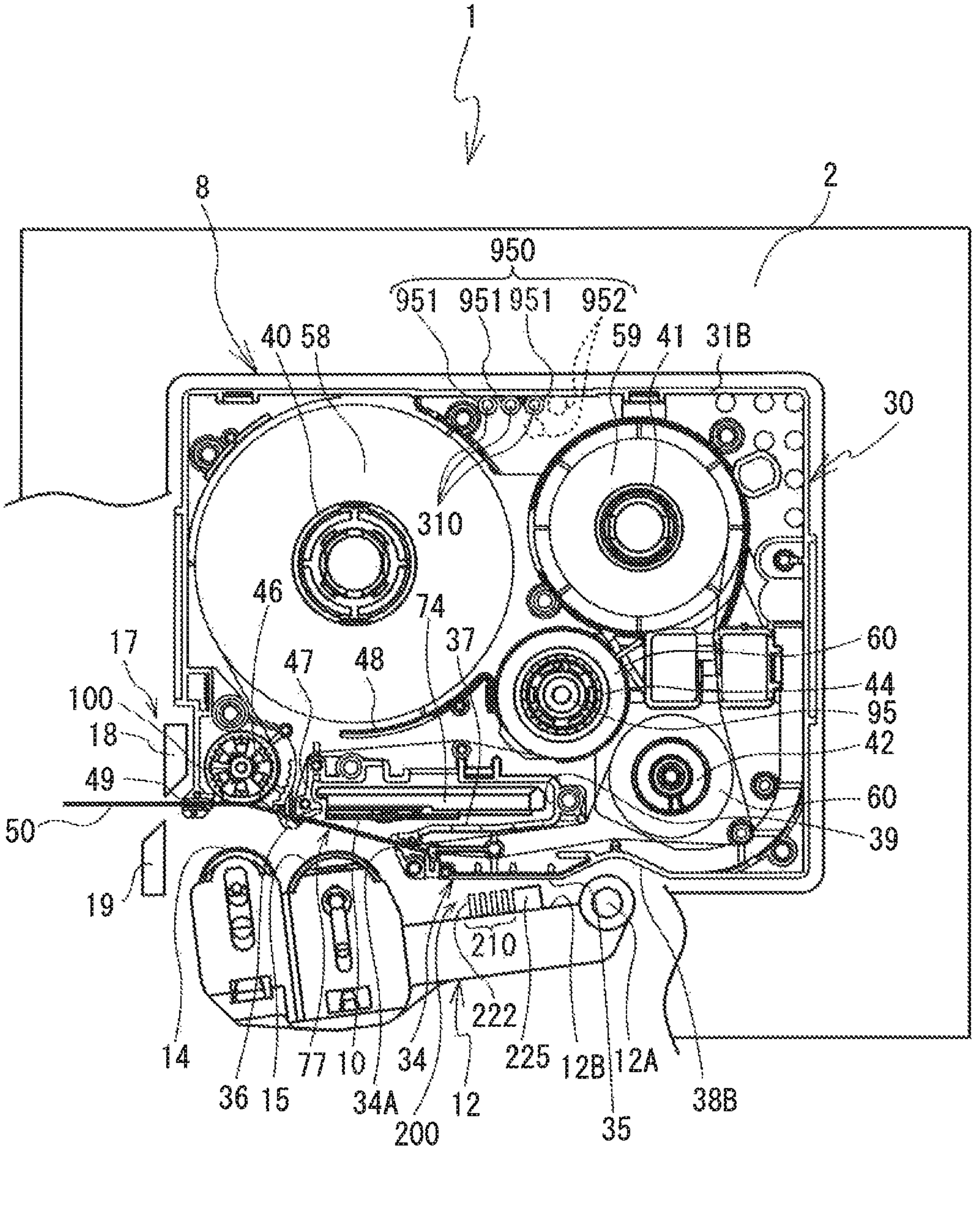
FIG. 4 is a plan view of a cassette housing portion 8 in which a tape cassette 30 has been inserted, in a case where a platen holder 12 is in a stand-by position.
Figure 5:
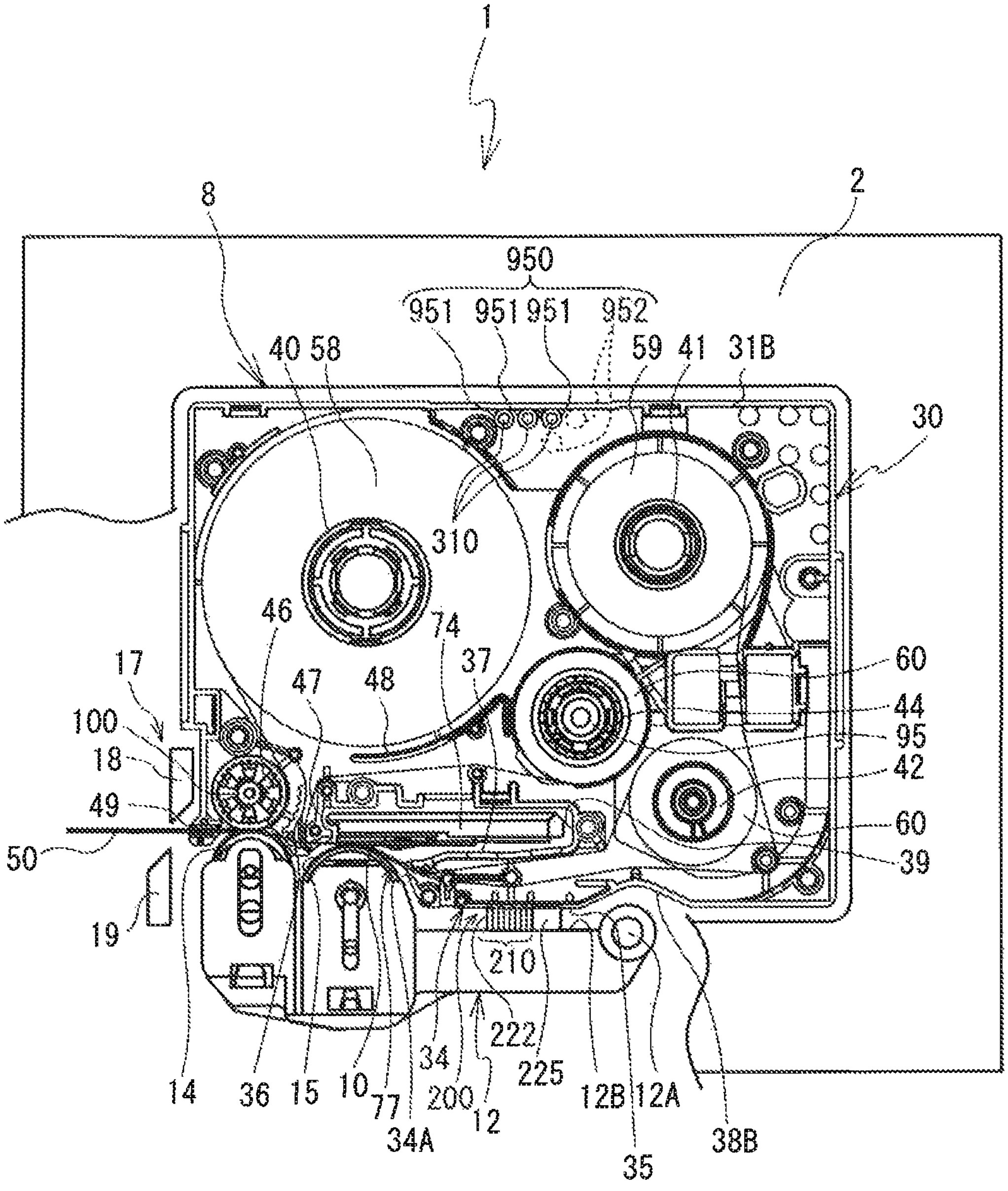
FIG. 5 is a plan view of the cassette housing portion 8 in which the tape cassette 30 has been mounted, in a case where the platen holder 12 is in a print position.

Note that, in FIG. 4 and FIG. 5, although walls that form a periphery around a cassette housing portion 8 are shown, these drawings are simply schematic diagrams, and the walls shown in the drawings are depicted as thicker than they are in actuality. Further, in FIG. 4 and FIG. 5, the states in which the tape cassette 30 is inserted in the cassette housing portion 8 are shown with a top case 31A removed.

First, an outline structure of the tape printer 1 according to the first embodiment will be explained. The tape printer 1 is a general purpose tape printer, in which various types of tape cassette can be used, such as a thermal type, a receptor type, a laminated type and a heat sensitive laminated type. Hereinafter, an example will be described in which a laminated tape having a print surface that is laminated is created.

Figure 1:
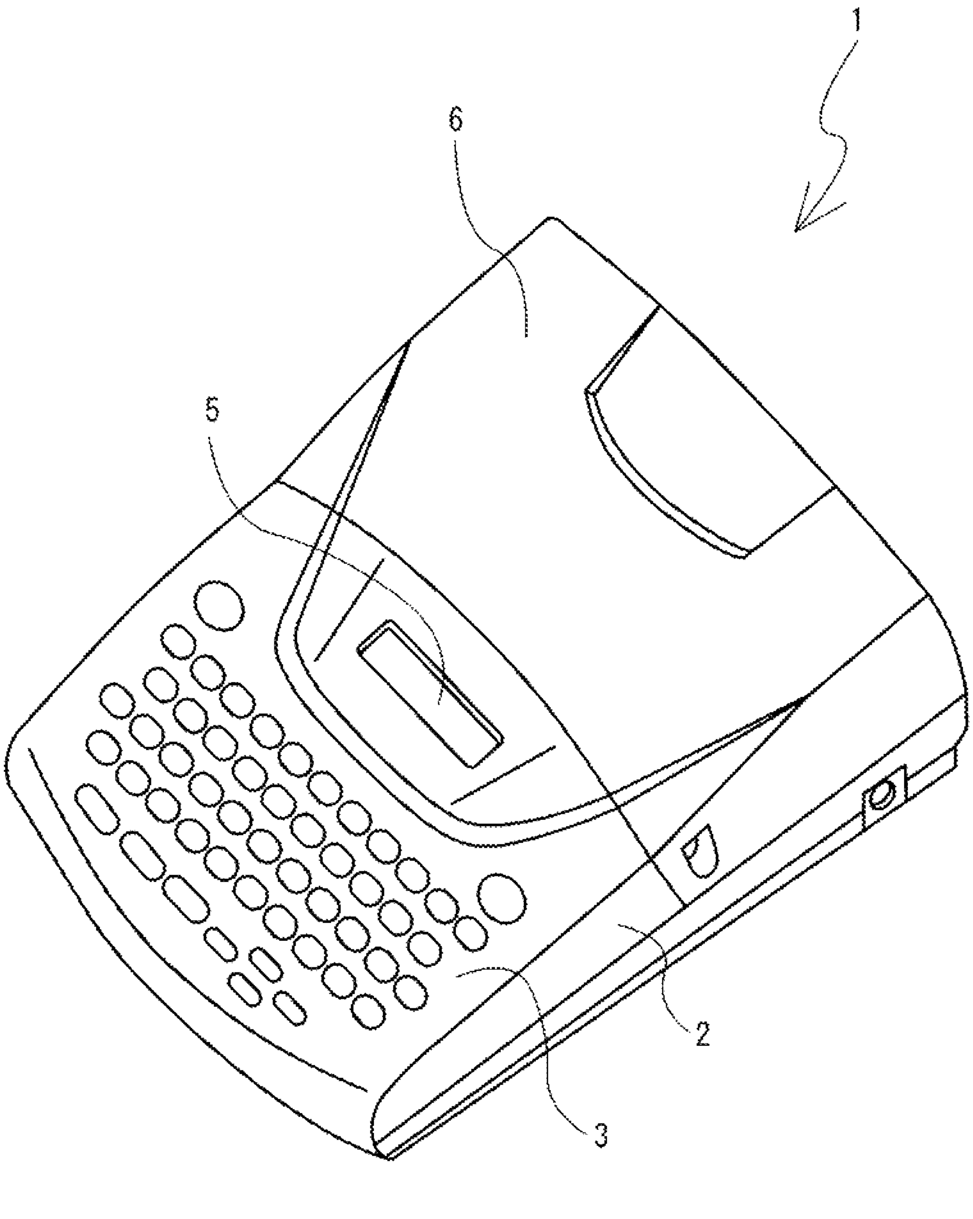
FIG. 1 is a perspective view of a tape printer 1, as seen from above, when a cassette cover 6 is in a closed state.
Figure 2:
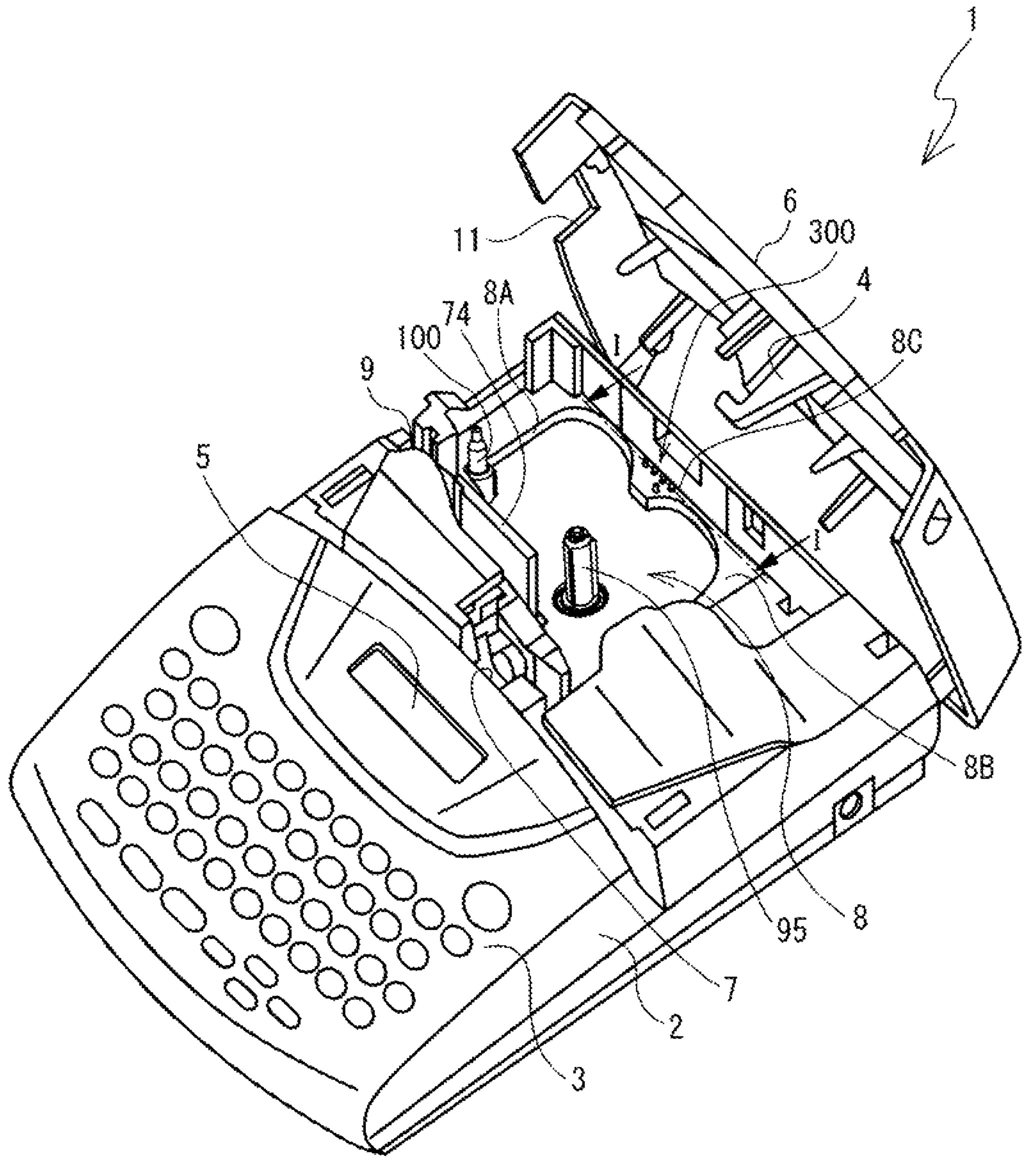
FIG. 2 is a perspective view of the tape printer 1, as seen from above, when the cassette cover 6 is in an open state.

As shown in FIG. 1 and FIG. 2, the tape printer 1 is provided with a main unit cover 2 that has a rectangular shape in a plan view. A keyboard 3 is provided on the front side of the main unit cover 2, the keyboard 3 including character keys such as characters, symbols and numerals, a variety of function keys and so on. On the rear side of the keyboard 3 is positioned a display 5 that can display input characters and symbols. On the rear side of the display 5 is provided a cassette cover 6 that can be opened and closed when replacing the tape cassette 30 (refer to FIG. 4). A discharge slit 9 is provided to the rear of the left side of the main unit cover 2, from which a printed tape is discharged to the outside. A discharge window 11 is formed on the left side surface of the cassette cover 6, such that, when the cassette cover 6 is in a closed state, the discharge slit 9 is exposed to the outside. A hook shaped engaging lock 4, which protrudes downward from a lower surface, is provided substantially in the center of the front surface of the cassette cover 6. A lock hole 7 is provided in the main unit cover 2, in a position corresponding to the engaging lock 4. When the cassette cover 6 is closed, the engaging lock 4 is latched into the lock hole 7, thus inhibiting the cassette cover 6 from spontaneously opening.

An internal structure of the main unit cover 2 that corresponds to the cassette cover 6 will be explained with reference to FIG. 2 to FIG. 7. As shown in FIG. 2, the cassette housing portion 8, which is an area in which the tape cassette 30 can be freely inserted or removed, is provided inside the main unit cover 2 that corresponds to the cassette cover 6. The cassette housing portions 8 is an area in which the tape cassette 30 can be freely inserted or removed, and includes a cavity 8A and a cassette support portion 8B. The cavity 8A is formed as a depression that substantially corresponds to the shape of a bottom surface 30B (refer to FIG. 9) of a cassette case 31 that will be described later, and has a flat bottom surface. The cassette support portion 8B is a flat surface portion extending horizontally from outer edges of the cavity 8A.

The shape of the cassette support portion 8B in a plan view substantially corresponds to the shape of the tape cassette 30 in a plan view, and is a rectangular shape that is longer in a left-right direction. A rear edge portion of the cavity 8A has such a shape that two arcs are arranged side by side in the left-right direction in a plan view. A portion of the cassette support portion 8B that is located between the two arcs is referred to as a rear support portion 8C. The rear support portion 8C is a portion that faces a rear indicator portion 950 (refer to FIG. 4) of the tape cassette 30 that is inserted in the cassette housing portion 8.

As shown in FIG. 2, the rear support portion 8C is provided with a rear detection portion 300. The rear detection portion 300 is provided with rear detection switches 310 that are a plurality of detection switches.

Figure 3:
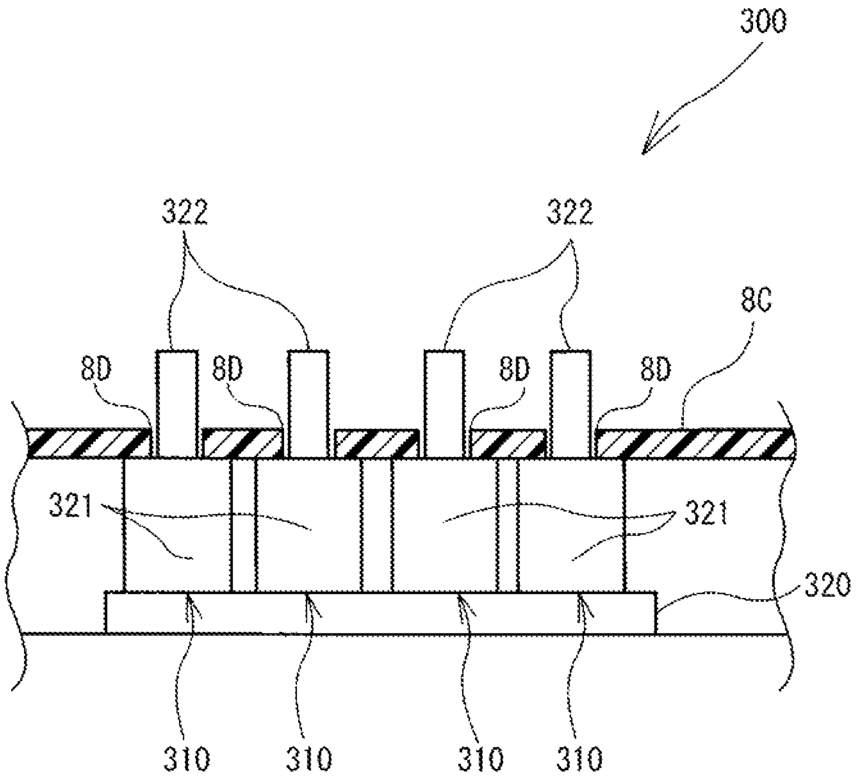
FIG. 3 is a cross-sectional view in a direction of arrows taken along a line 1-1 in FIG. 2.

A detailed structure of the rear detection switches 310 will be explained with reference to FIG. 3. Each of the rear detection switches 310 is provided with a substantially cylindrically-shaped main body portion 321 that is provided below the rear support portion 8C, and a rod-shaped switch terminal 322 that can advance from and retract into one end of each of the main body portions 321 in an axial line direction. Each of the main body portions 321 is installed in the interior of the main unit cover 2 such that the other end is fixed to a switch support plate 320. On the one end of each of the main body portions 321, the switch terminals 322 can advance and retract through a plurality of through holes 8D formed in the rear support portion 8C. Normally, the switch terminals 322 are each maintained in a state of protruding from the main body portions 321 by spring members (not shown in the drawings) that are provided in the interiors of the main body portions 321. When the switch terminals 322 are not being pressed, they are in the state of protruding from the main body portions 321 (an off state), and when the switch terminals 322 are being pressed, they are in the state of being pushed into the main body portions 321 (an on state).

As shown in FIG. 2, when the tape cassette 30 is not inserted in the cassette housing portion 8, the respective rear detection switches 301 are separated from the tape cassette 30, and thus they are all in the off state. As shown in FIG. 4 and FIG. 5, when the tape cassette 30 is inserted in the cassette housing portion 8, the respective rear detection switches 310 face the bottom surface 30B of the tape cassette 30 and they are selectively pressed by the rear indicator portion 950. The tape printer 1 detects the type of the tape (hereinafter referred to as the tape type) housed in the tape cassette 30, based on a combination of the on and off states of the respective rear detection switches 310. The detection of the tape type by the rear detection portion 300 will be separately described later.

The cassette housing portion 8 is provided with a feeding mechanism that pulls out the tape from the tape cassette 30 and feeds it, a printing mechanism that prints characters etc.

on a surface of the tape, and the like. As shown in FIG. 3 to FIG. 5, a ribbon take-up shaft 95 is provided in the cassette housing portion 8 in a standing manner in order to rotatably drive a ribbon spool 42, which will be described later. On the front left side of the ribbon take-up shaft 95, a head holder 74 that has a substantially rectangular shape in a front view is provided in a standing manner. On the left side of the head holder 74, a tape drive shaft 100 is provided in a standing manner in order to rotatably drive a tape drive roller 46, which will be described later.

As shown in FIG. 4 and FIG. 5, a thermal head 10 that prints characters etc. on a film tape 59 is attached to a front surface of the head holder 74. An arm-shaped platen holder 12 is provided in front of the head holder 74 and is supported such that the platen holder 12 can swing around a shaft support portion 12A. A platen roller 15 and a movable feed roller 14 are both rotatably supported on the leading end side of the platen holder 12. The platen roller 15 faces the thermal head 10 and is able to come into contact with and separate from the thermal head 10. The movable feed roller 14 faces the tape drive roller 46 that Fits with the tape drive shaft 100 by insertion, and is able to come into contact with and separate from the tape drive roller 46.

A release lever (not shown in the drawings), which moves in the left-right direction in response to the opening and closing of the cassette cover 6, is coupled to the platen holder 12. When the cassette cover 6 is opened, the release lever moves in the right direction, and the platen holder 12 moves toward the stand-by position shown in FIG. 4. In the stand-by position shown in FIG. 4, the platen holder 12 has moved in the direction separating it from the cassette housing portion 8, and the tape cassette 30 can therefore be inserted into or removed from the cassette housing portion 8. The platen holder 12 is constantly elastically urged to remain in the stand-by position by a coil spring that is not shown in the drawings.

When the cassette cover 6 is closed, the release lever moves in the left direction and the platen holder 12 moves toward the print position shown in FIG. 5. In the print position shown in FIG. 5, the platen holder 12 has moved in the direction that brings it into proximity with the cassette housing portion 8. Then, when the tape cassette 30 is inserted in the cassette housing portion 8, the platen roller 15 applies pressure to the thermal head 10 via the film tape 59 and an ink ribbon 60. The movable feed roller 14 applies pressure to the tape drive roller 46 via a double-sided adhesive tape 58 and the film tape 59. In the print position shown in FIG. 5, printing can be performed using the tape cassette 30 inserted in the cassette housing portion 8. The double-sided adhesive tape 58, the film tape 59 and the ink ribbon 60 will be described in detail later.

A feed path, through which a laminated tape 50 is fed, is provided from a tape discharge opening 49 of the tape cassette 30 to the discharge slit 9 (refer to FIG. 2) of the tape printer 1. A cutting mechanism 17 that cuts the laminated tape 50 at a predetermined position is provided on the feed path. The cutting mechanism 17 is formed by a fixed blade 18, and a movable blade 19 that faces the fixed blade 18 and that is supported such that it can move in the forward-rearward direction (in the up-down direction shown in FIG. 4). The movable blade 19 is moved in the forward-rearward direction by a cutter motor 24 (refer to FIG. 8).

A rear side surface of the platen holder 12, namely, a surface on a side facing the thermal head 10 is provided with an arm detection portion 200 slightly to the right of a middle position in the longitudinal direction of the surface. Hereinafter, the rear side surface of the platen holder 12 is referred to as a cassette-facing surface 12B. The arm detection portion 200 includes arm detection switches 210 that are a plurality of detection switches. A switch terminal 222 of each of the arm detection switches 210 protrudes substantially horizontally from the cassette-facing surface 12B toward the cassette housing portion 8.

In other words, each of the arm detection switches 210 protrudes in a direction that is substantially orthogonal to the direction in which the tape cassette 30 is inserted into and removed from the cassette housing portion 8, and faces a front surface (more specifically, an arm front surface 35 that will be described later) of the tape cassette 30 that is in the cassette housing portion 8. When the tape cassette 30 is inserted in a proper position in the cassette housing portion 8, each of the arm detection switches 210 is provided at a height position corresponding to the arm indicator portion 800 (refer to FIG. 9) that will be described later.

Figure 6:
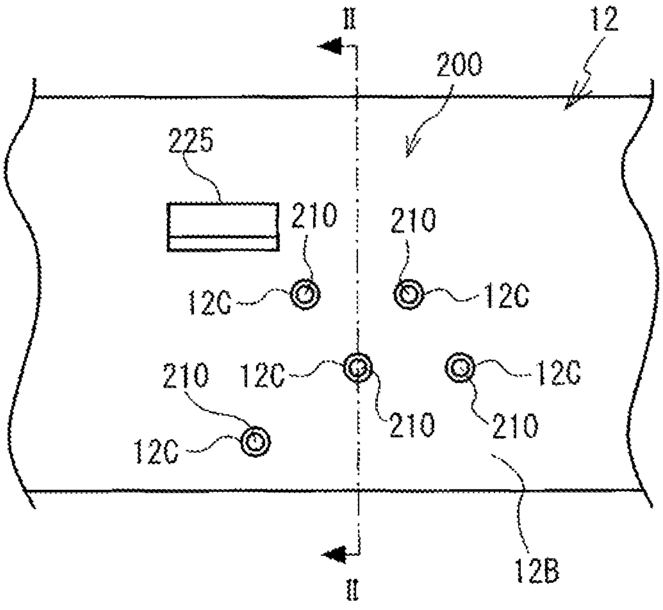
FIG. 6 is a partially enlarged view of a cassette-facing surface 12B that is provided with an arm detection portion 200.

A detailed arrangement and structure of the arm detection switches 210 provided on the platen holder 12 will be explained with reference to FIG. 6 and FIG. 7. As shown in FIG. 6, five through holes 12C are provided, arranged in three rows in the up-down direction, in the cassette-facing surface 12B of the platen holder 12. Specifically, they are arranged as two holes in a top row, two holes in a middle row and one hole in a bottom row. The positions of the through holes 12C in the left-right direction are different from each other. Specifically, the five through holes 12C are arranged in a zigzag pattern, from the right side (the left side in FIG. 6) of the cassette-facing surface 12B, in order from the bottom row, the right side of the top row, the right side of the middle row, the left side of the top row, and the left side of the middle row. The five arm detection switches 210 are provided corresponding to these through holes 12C.

Figure 7:
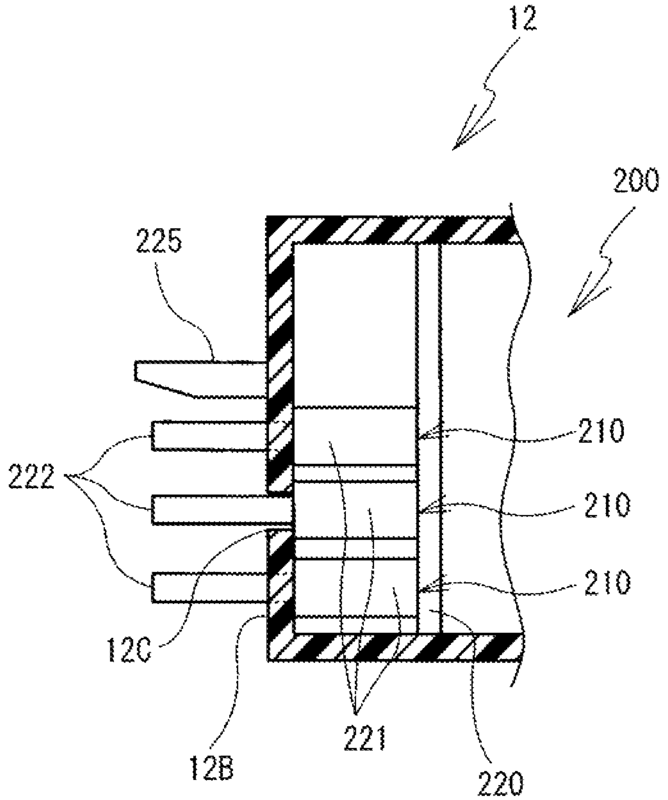
FIG. 7 is a cross-sectional view in the direction of arrows taken along a line II-II in FIG. 6.

As shown in FIG. 7, the arm detection switches 210 are provided with substantially cylindrically-shaped main body portions 221 that are installed in the interior of the platen holder 12, and with the rod-shaped switch terminals 222 that can advance from and retract into one end of each of the main body portions 221 in the axial line direction. The other end of each of the main body portions 221 is fastened to a switch support plate 220 in the interior of the platen holder 12. On the one end of each of the main body portions 221, the switch terminals 222 can advance and retract through the plurality of through holes 12C formed in the cassette-facing surface 12B of the platen holder 12. Normally, the switch terminals 222 are each maintained in a state of protruding from the main body portions 221 by spring members (not shown in the drawings) that are provided in the interiors of the main body portions 221. When the switch terminals 222 are not being pressed, they are in the state of protruding from the main body portions 221 (an off state), and when the switch terminals 222 are being pressed, they are in the state of being pushed into the main body portions 221 (an on state).

In a case where the tape cassette 30 has been inserted in the cassette housing portion 8, when the platen holder 12 moves toward the stand-by position (refer to FIG. 4), the respective arm detection switches 210 are separated from the tape cassette 30 and thus they are all in the off state. When the platen holder 12 moves toward the print position (refer to FIG. 5), the arm detection switches 210 face the front surface (more specifically, the arm front surface 35 that will be described later) of the tape cassette 30 and are selectively pressed by the arm indicator portion 800 that will be described later. The tape printer 1 detects the type of the tape in the tape cassette 30 based on a combination of the on and off states of the respective arm detection switches 210.

Detection of the tape type by the arm detection portion 200 will be explained in more detail later.

As shown in FIG. 4 and FIG. 5, a latch projection 225 that is a plate-shaped projecting portion that extends in the left-right direction is provided on the cassette-facing surface 12B of the platen holder 12. The latch projection 225 protrudes substantially horizontally from the cassette-facing surface 12B toward the cassette housing portion 8, in the same manner as the switch terminals 222 of the arm detection switches 210. In other words, the latch projection 225 protrudes such that it faces the front surface (more specifically, the arm front surface 35 that will be described later) of the tape cassette 30 that is in the cassette housing portion 8. When the tape cassette 30 is inserted in the proper position in the cassette housing portion 8, the latch projection 225 is provided at a height position corresponding to a latch hole 804 (refer to FIG. 9) that will be described later.

An arrangement and structure of the latch projection 225 on the platen holder 12 will be explained with reference to FIG. 6 and FIG. 7. As shown in FIG. 6, the latch projection 225 is provided on the cassette-facing surface 128 of the platen holder 12 and is positioned above the detection switches 210 in the top row, extending to the right from a position in the left-right direction between the arm detection switch 210 on the right side (the left side in FIG. 6) in the top row and the arm detection switch 210 in the bottom row.

As shown in FIG. 7, the latch projection 225 is integrally formed with the platen holder 12 such that it protrudes toward the rear (the left side in FIG. 7) from the cassette-facing surface 12B of the platen holder 12. A height of protrusion of the latch projection 225 when taking the cassette-facing surface 12B as a reference is substantially the same as or slightly greater than a height of protrusion of each of the switch terminals 222 when taking the cassette-facing surface 12B as a reference. A portion of a lower surface of the latch projection 225 is inclined with respect to the horizontal direction such that the thickness gradually reduces toward the leading end side (the left side in FIG. 7).

Figure 8:
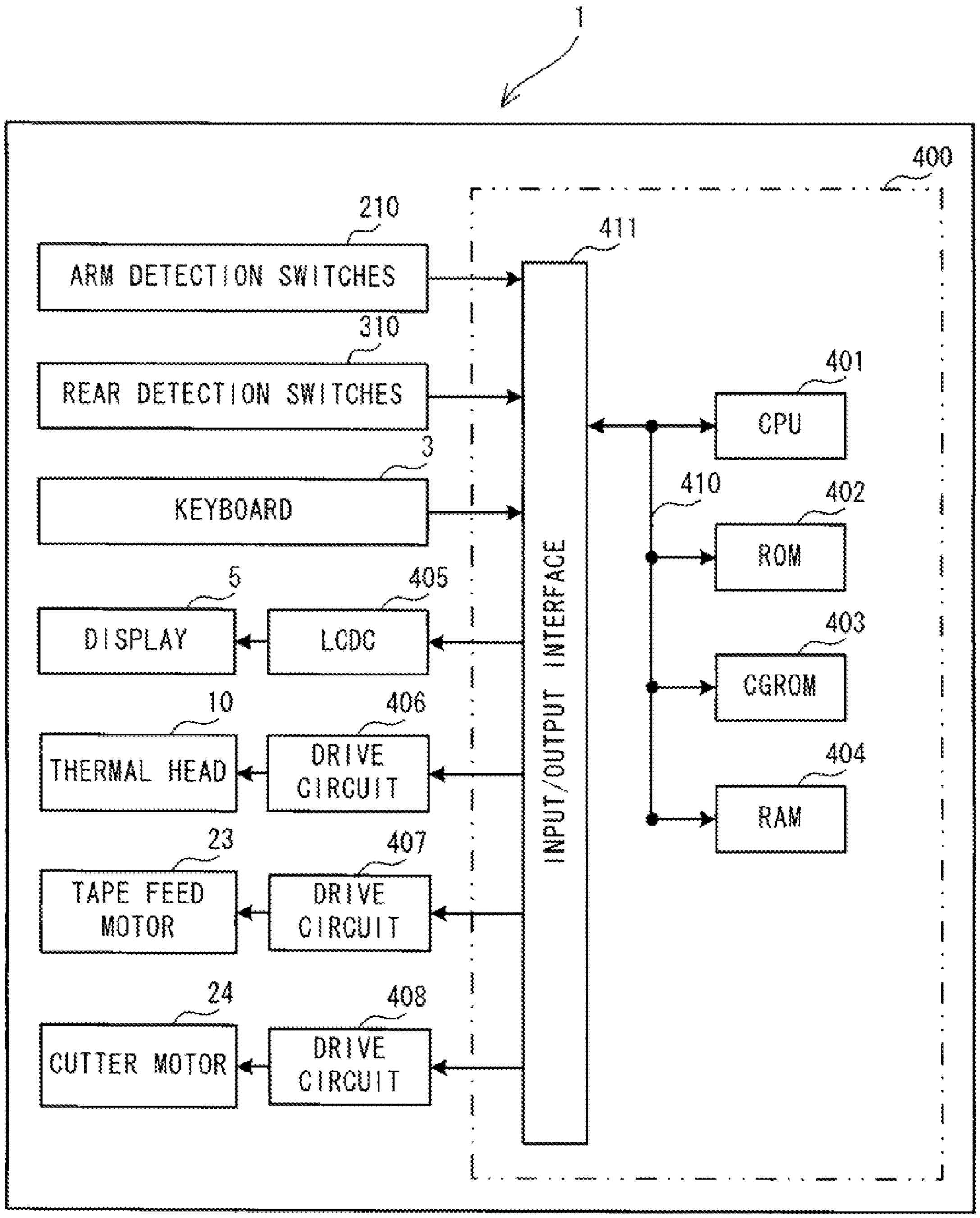
FIG. 8 is a block diagram showing an electrical configuration of the tape printer 1.

Next, an electrical configuration of the tape printer 1 will be explained with reference to FIG. 8. As shown in FIG. 8, the tape printer 1 includes a control circuit 400 formed on a control board. In the control circuit 400, a ROM 402, a CGROM 403, a RAM 404 and an input/output interface 411 are connected, via a data bus 410, to a CPU 401 that controls each instrument.

Various types of programs that are performed by the CPU 401 to control the tape printer 1 are stored in the ROM 402. A table to identify the tape type of the tape cassette 30 inserted in the cassette housing portion 8 is also stored in the ROM 402. Printing dot pattern data for printing characters is stored in the CGROM 403. A plurality of storage areas are provided in the RAM 404 for a text memory, a print buffer and the like.

The arm detection switches 210, the rear detection switches 310, the keyboard 3, a liquid crystal drive circuit (LCDC) 405, drive circuits 406, 407, 408, and the like are connected to the input/output interface 411. The drive circuit 406 is an electronic circuit for driving the thermal head 10. The drive circuit 407 is an electronic circuit for driving a tape feed motor 23. The drive circuit 408 is an electronic circuit for driving the cutter motor 24, which operates the movable blade 19. The liquid crystal drive circuit (LCDC) 405 includes a video RAM (not shown in the drawings) for outputting display data to the display 5.

Next, a structure of the tape cassette 30 according to the present embodiment will be explained with reference to FIG. 4, FIG. 5 and FIG. 9 to FIG. 12. The tape cassette 30 of the present embodiment is a general-purpose tape cassette that can be used as various types of tape cassettes, such as a heat-sensitive type, a receptor type, a laminated type, a heat-sensitive laminated type and the like, and an example is described in which it is used as a laminated type tape cassette.

Figure 9:
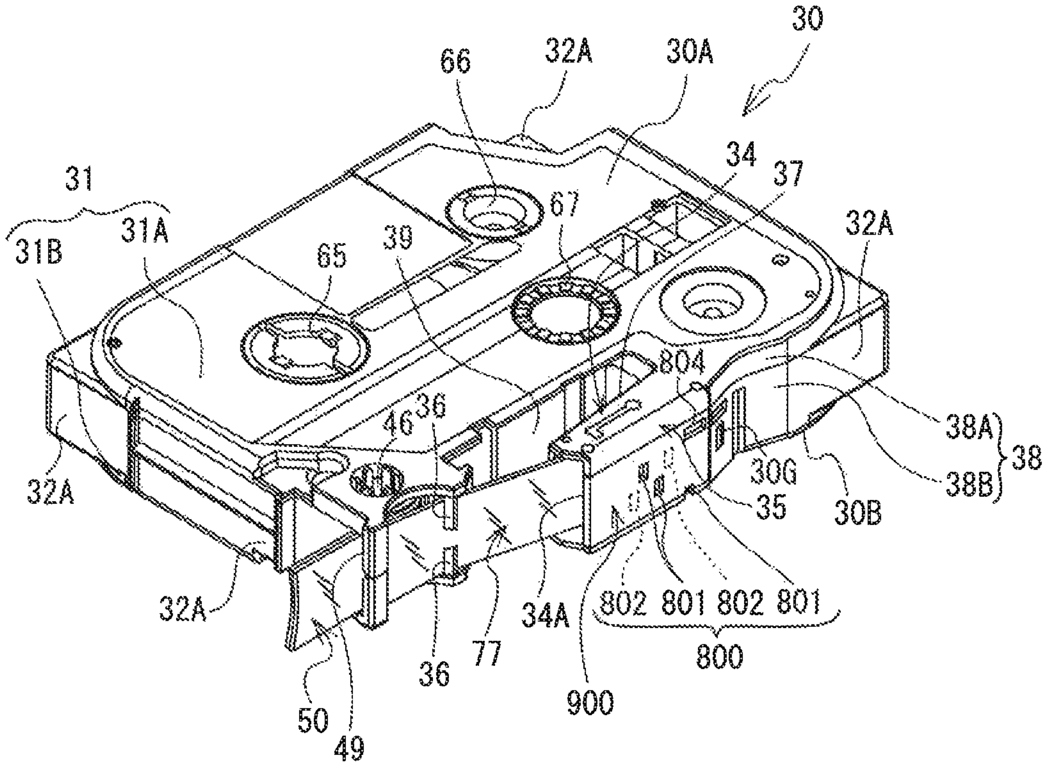
FIG. 9 is a perspective view of the tape cassette 30 according to a first embodiment.

As shown in FIG. 9, the tape cassette 30 includes the cassette case 31 that is overall a substantially cuboid (box shaped) housing with corners that are rounded in a plan view. The cassette case 31 is provided with a bottom case 31B, which includes the bottom surface 30B of the cassette case 31, and a top case 31A, which includes a top surface 30A of the cassette case 31 and which is fixed to an upper portion of the bottom case 31B. Hereinafter, a distance from the bottom surface 30B to the top surface 30A is referred to as a height dimension of the tape cassette 30 or the cassette case 31.

Figure 10:
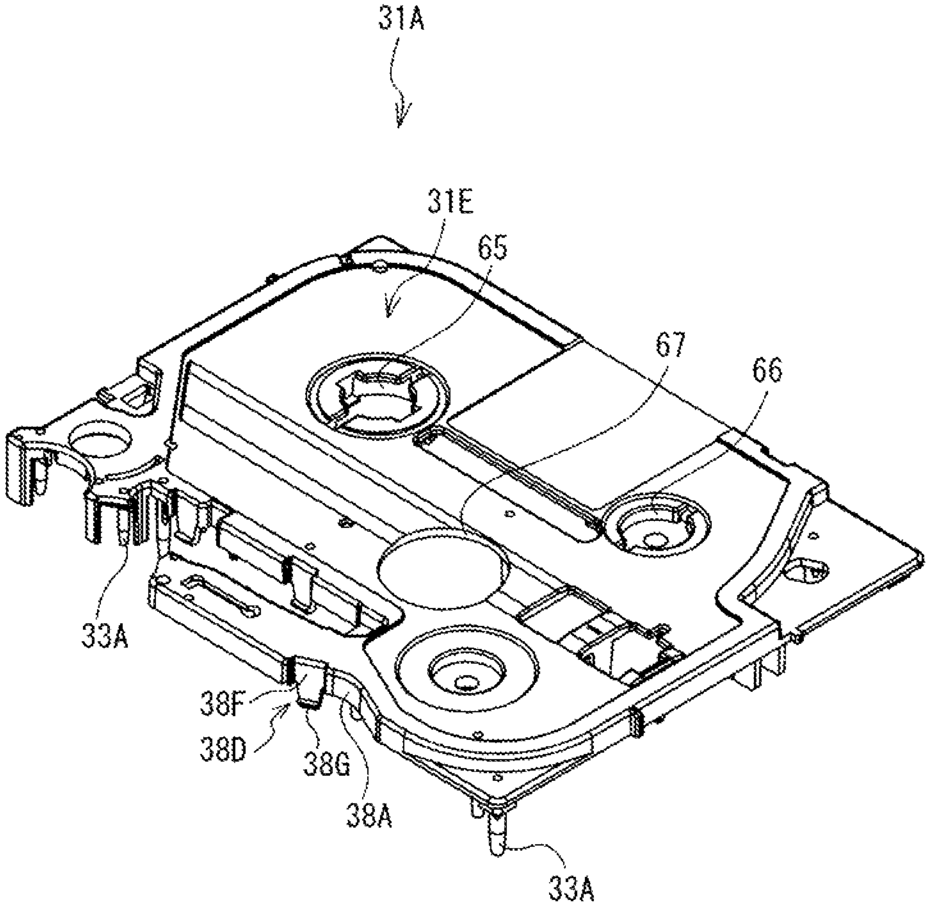
FIG. 10 is a perspective view of a top case 31A.

As shown in FIG. 10, the top case 31A is provided with a rectangular-shaped top wall 31E that is longer in the left-right direction in a plan view. The top wall 31E is provided with support holes 65, 66 and 67 that rotatably support spools etc. that will be described later. A lower surface of the top wall 31E is provided with a plurality of substantially cylinder-shaped pin portions 33A that protrude downward. An upper semi-circular portion 38A, which is recessed in a substantially semi-circular shape in a plan view, is formed on a front edge portion of the top wall 31E. A hook-shaped fixing portion 38D extends downward from a left portion of the upper semi-circular portion 38A. The fixing portion 38D includes an extending portion 38F that extends downward from the top wall 31E, and a tab portion 38G that protrudes from a leading end portion of the extending portion 38F toward the front.

Figure 11:
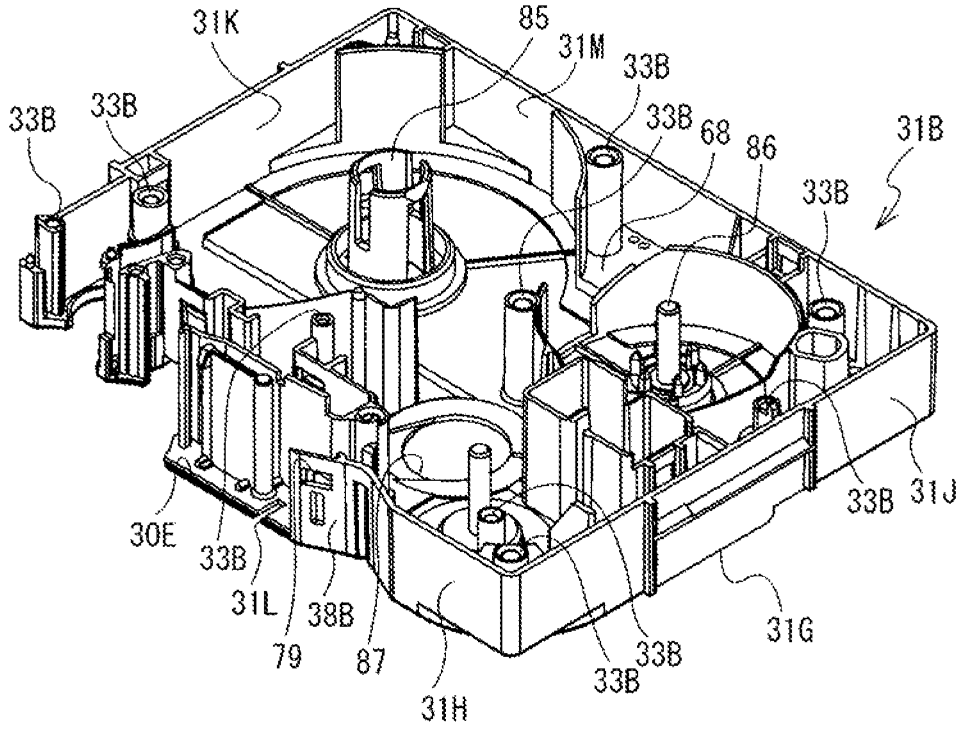
FIG. 11 is a perspective view of a bottom case 31B.

As shown in FIG. 11, the bottom case 31B is formed in a box shape in which an upper portion opens, and is provided with a bottom wall 31G, a right front wall 31H, a right side wall 31J, a left side wall 31K, a back wall 31M and a lower semi-circular portion 38B. The bottom wall 31G is provided with a support hole 87 and support shafts 85 and 86 that rotatably support the spools etc. that will be described later. The bottom wall 31G is provided with a plurality of cylindrically-Shaped boss portions 33B that protrude upward from a top surface. The diameter of cylindrical holes provided in the boss portions 33B is substantially the same as the diameter of the pin portions 33A. An upper end position of the boss portions 3313 is the same as an upper end position of the right front wall 31H, the right side wall 31J, the left side wall 31K and the back wall 31M.

A rear surface portion 68, which is a substantially triangular-shaped flat portion in a plan view and which corresponds to the rear support portion 8C (refer to FIG. 2), is provided in a substantially central portion, in the left-right direction, of the rear end edge of the bottom wall 31G. The rear surface portion 68 is located on a same plane (namely, at a same height position) as a lower surface of a corner portion 32A (refer to FIG. 9). The rear surface portion 68 is provided with a rear indicator portion 950 (refer to FIG. 4 and FIG. 5) that will be described later.

The right front wall 31H is extended from a front right corner portion of the bottom case 31B to the left along a front end portion of the bottom wall 31G. The lower semi-circular portion 38B, which is recessed in a substantially semi-circular shape in a plan view, is provided continuously to the left side of the right front wall 31H. The lower semi-circular portion 38B is positioned slightly to the right of the center in the left-right direction of the cassette case 31. An upper left portion of the lower semi-circular portion 38B is provided with a fixing hole 79 that is a horizontally long rectangular through hole in a front view.

When the top case 31A (refer to FIG. 9) is attached to the bottom case 31B, the pin portions 33A are inserted from above into the cylindrical holes of the boss portions 33B. When the top case 31A is pushed downward, the tab portion 38G of the top case 31A is fitted into the fixing hole 79 of the bottom case 31B. Thus, the top case 31A is attached to the bottom case 31B and the cassette case 31 is formed. An open portion 30D (refer to FIG. 12) that will be described later is formed in the front surface of the cassette case 31.

As shown in FIG. 9, the cassette case 31 has corner portions 32A that are formed to have the same width (the same length in the up-down direction) regardless of the tape type (the tape width, the printing format and the like, for example) of the tape cassette 30. The corner portions 32A protrude to the outside so as to form a right angle in a plan view. However, in the plan view, the front left corner portion 32A does not form a right angle because the tape discharge opening 49 is provided in the corner.

As shown in FIG. 4 and FIG. 5, three types of tape rolls, i.e., the double-sided adhesive tape 58 wound around a first tape spool 40, the transparent film tape 59 wound around a second tape spool 41, and the ink ribbon 60 wound around the ribbon spool 42 are housed in the cassette case 31. The double-sided adhesive tape 58 is a double-sided tape having a surface to which a release paper is adhered, and is adhered to a print surface of the printed film tape 59.

The first tape spool 40, around which the double-sided adhesive tape 58 is wound with the release paper facing the outside, is rotatably arranged in a rear left portion inside the cassette case 31 via the above-described support hole 65. The second tape spool 41, around which the film tape 59 is wound, is rotatably arranged in a rear right portion inside the cassette case 31 via the above-described support hole 66. The ink ribbon 60 that is wound around the ribbon spool 42 is rotatably arranged in a front right portion inside the cassette case 31.

The rear indicator portion 950 is provided between the double-sided adhesive tape 58 that is wound around the first tape spool 40 and the film tape 59 that is wound around the second tape spool 41. The rear indicator portion 950 is provided in a position that corresponds to the rear detection portion 300 (refer to FIG. 3). The rear indicator portion 950 has a plurality of indicator portions. Each of the indicator portions is either a non-pressing portion 951 that is a hole, whose opening shape is circular, into which the switch terminal 322 can be inserted, or a pressing portion 952 that is a surface portion that comes into contact with the switch terminal 322. The rear indicator portion 950 of the present embodiment includes either the non-pressing portion 951 or the pressing portion 952 in each of five positions corresponding to the five switch terminals 322.

The arrangement pattern of the non-pressing portions 951 and the pressing portions 952 is determined in accordance with information (color information) indicating a tape color and a character color of the tape cassette 30. Note that a data table, in which the combinations of the on and off states of the five rear detection switches 310 are associated with the color information of the tape cassette 30, is stored in the ROM 402 (refer to FIG. 8) of the tape printer 1. In this data table, the off state of the rear detection switch 310 corresponds to the non-pressing portion 951, and the on state of the rear detection switch 310 corresponds to the pressing portion 952.

A ribbon take-up spool 44 is rotatably arranged via the above-described support hole 67 between the first tape spool 40 and the ribbon spool 42 inside the cassette case 31. When the ribbon take-up spool 44 is rotatably driven by the ribbon take-up shaft 95 that is fitted into its interior by insertion, the ribbon take-up spool 44 pulls out the ink ribbon 60 from the ribbon spool 42 and takes up the ink ribbon 60 that has been used for printing characters etc.

As shown in FIG. 9, a semi-circular groove 38 that is a groove portion forming a generally semi-circular shape in a plan view is provided in the front surface of the cassette case 31, and extends across the height direction of the cassette case 31 (in other words, extends from the top surface 30A to the bottom surface 30B). The semi-circular groove 38 is provided with the upper semi-circular portion 38A formed in the top case 31A and the lower semi-circular portion 38B formed in the bottom case 31B. The semi-circular groove 38 is a recess provided such that, when the tape cassette 30 is inserted in the cassette housing portion 8, there is no interference between the shaft support portion 12A (refer to FIG. 4) of the platen holder 12 and the cassette case 31.

Of the front surface of the cassette case 31, the section that extends to the left from the semi-circular groove 38 is referred to as the arm front surface 35. A part that extends from the right portion of the tape cassette 30 in the left direction and that is defined by the arm front surface 35, and an arm back surface 37 that is positioned separately to the arm front surface 35 in the rearward direction and extending in the height direction, is referred to as an arm portion 34.

As shown in FIG. 4 and FIG. 5, the film tape 59 pulled out from the second tape spool 41 and the ink ribbon 60 pulled out from the ribbon spool 42 are both guided into the arm portion 34. A discharge opening 34A is formed by the arm front surface 35 and the leading end of the arm back surface 37. The film tape 59 and the ink ribbon 60 that have been guided into the arm portion 34 are overlapped at the discharge opening 34A and discharged toward an exposure portion 77 that will be described later.

A space that is defined by the arm back surface 37 and by a peripheral wall surface which is provided continuously from the arm back surface 37, that is a generally rectangular shape in a plan view and that penetrates the tape cassette 30 in the up-down direction, is a head insertion portion 39. The head insertion portion 39 is connected to the outside at the front surface of the tape cassette 30 through the exposure portion 77 that is an opening provided in the front surface of the tape cassette 30. The head holder 74 that supports the thermal head 10 of the tape printer 1 is inserted into the head insertion portion 39. At the exposure portion 77, one of the surfaces of the film tape 59 discharged from the discharge opening 34A of the arm portion 34 is exposed to the front, and the other surface of the film tape 59 faces the thermal head 10 positioned to the rear. In the present embodiment, the other surface of the film tape 59 faces the thermal head 10 with the ink ribbon 60 interposed therebetween. At the exposure portion 77, printing is performed on the film tape 59 by the thermal head 10 using the ink ribbon 60.

The tape drive roller 46 is rotatably and axially supported on a downstream side of the head insertion portion 39, in a feed direction of the film tape 59 and the ink ribbon 60 from the discharge opening 34A of the arm portion 34 to the tape discharge opening 49. When the tape drive roller 46 is rotatably driven by the tape drive shaft 100 that is fitted into its interior by insertion, it pulls out the print tape 59 from the second tape spool 41 by moving in concert with the movable feed roller 14 of the platen holder 12 that faces the tape drive roller 46. At the same time, the double-sided adhesive tape 58 is pulled out from the first tape spool 40 and guided so that it adheres to the print surface of the film tape 59.

As shown in FIG. 4, FIG. 5 and FIG. 9, a pair of upper and lower regulating members 36 are provided on an upstream side of the tape drive roller 46. On a downstream side of the thermal head 10, base portions of the regulating members 36 restrict the printed film tape 59 in the up-down direction (in the tape width direction) and guide it toward the tape discharge opening 49. The film tape 59 and the double-sided adhesive tape 58 are bonded together correctly without generating any positional displacement between them.

A guide wall 47 is provided in a standing manner in the vicinity of the regulating members 36. The guide wall 47 separates the used ink ribbon 60, which has been fed via the head insertion portion 39, from the film tape 59 and guides it toward the ribbon take-up spool 44. A second separating wall 48 is provided in a standing manner between the guide wall 47 and the ribbon take-up spool 44. The second separating wall 48 inhibits mutual contact between the used ink ribbon 60 that is guided along the guide wall 47 and the double-sided adhesive tape 58 that is wound on and supported by the first tape spool 40.

Figure 12:
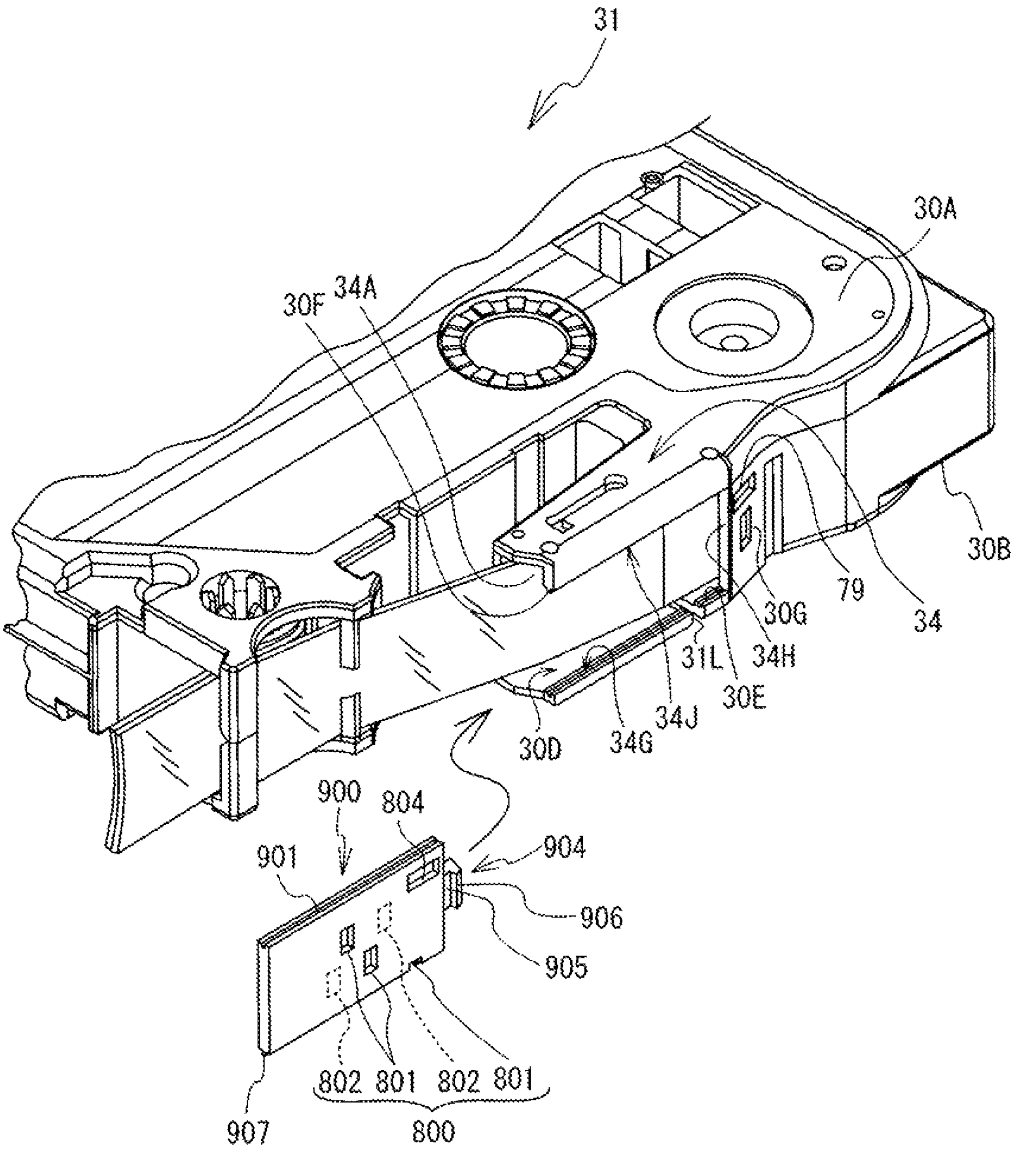
FIG. 12 is a view in which a first indicator member 900 is attached to an open portion 30D.

As shown in FIG. 9 and FIG. 12, a first indicator member 900, which is a plate-shaped member having a horizontally long rectangular shape in a front view, is detachably provided on a front portion of the arm portion 34. The first indicator member 900 is provided with the arm indicator portion 800 that indicates the tape type of the tape cassette 30. As shown in FIG. 12, when the first indicator member 900 is removed from the front portion of the arm portion 34, the open portion 30D, through which the film tape 59 can be visually checked, is formed in the front portion of the arm portion 34. When the first indicator member 900 is attached to the open portion 30D, the arm front surface 35 is formed on the front portion of the arm portion 34.

Structures of the open portion 30D and the first indicator member 900 will be explained with reference to FIG. 12. The open portion 30D is formed continuously from the discharge opening 34A to the right. The open portion 30D has a cutout shape that corresponds to a front shape of the first indicator member 900, and is provided with a lower edge surface 34G, a right edge surface 34H and an upper edge surface 34J.

A groove portion 30E is provided from the left end to the right end of the lower edge surface 34G. The right edge surface 34H is the left end face of the lower semi-circular portion 38B. A notch portion 31L, which is notched from a front edge portion of the bottom wall 31G (refer to FIG. 11) toward the rear, is formed in the lower edge surface 34G slightly to the left of the right edge surface 34H. A convex portion 30F is provided that continuously protrudes downward from the left end to the right end of the upper edge surface 34J. A through hole 30G, whose opening shape is a vertically long rectangular shape, is provided to the right of the open portion 30D.

The first indicator member 900 is formed in a flat plate shape and has a horizontally long rectangular shape in a front view. A groove portion 901 is formed from the left end to the right end of the upper end face of the first indicator member 900. A convex portion 907 is formed that continuously protrudes downward from the left end to the right end of the lower end face of the first indicator member 900.

A hook arm 904 that protrudes to the right is provided on a right end portion of the first indicator member 900. The hook arm 904 is a hook-shaped body that extends to the right using a right rear end portion of the first indicator member 900 as a base portion, and is provided with an extending portion 905 and a hook portion 906. The extending portion 905 is a plate-shaped portion having a thickness thinner than that of the first indictor member 900. The hook portion 906 is a projecting portion which protrudes from a leading end portion of the extending portion 905 toward the front, and which has a substantially triangular shape in a plan view. When the extending portion 905 receives a force from the front to the rear, it deflects to the rear.

A method for attaching and removing the first indicator member 900 to and from the open portion 30D will be explained with reference to FIG. 9 to FIG. 12. When the first indicator member 900 is attached to the open portion 30D, an operator slidingly moves the first indicator member 900 from the discharge opening 34A side to the right side, and thereby pushes the first indicator member 900 into the open portion 30D. At this time, the operator causes the groove portion 901 to slide along the convex portion 30F and also causes the convex portion 907 to slide along the groove portion 30E.

When the leading end (the right end) of the hook arm 904 reaches the right edge surface 34H and enters the rear side of the semi-circular groove 38, the hook portion 906 comes into contact with a rear surface of the semi-circular groove 38 and is pressed rearward. The extending portion 905 deflects to the rear, with the base portion serving as a base point, because its leading end portion receives a rearward force. When the first indicator member 900 moves further to the right and the hook portion 906 reaches the through hole 30G, the hook portion 906, which is impelled by the extending portion 905, enters the through hole 30G. The position of the hook portion 906 is fixed and the first indicator member 900 is attached to the open portion 30D.

When the first indicator member 900 is removed from the open portion 30D, the operator pushes the hook portion 906 that has entered the through hole 30G toward the rear and releases the fixation of the hook portion 906. In this state, the operator slidingly moves the first indicator member 900 to the left from the inside of the open portion 30D, and thereby pulls out the first indicator member 900 to the discharge opening 34A side. At this time, the groove portion 901 is guided along the convex portion 30F and the convex portion 907 is guided along the groove portion 30E. Thus, the first indicator member 900 is removed from the open portion 30D.

Figure 13:
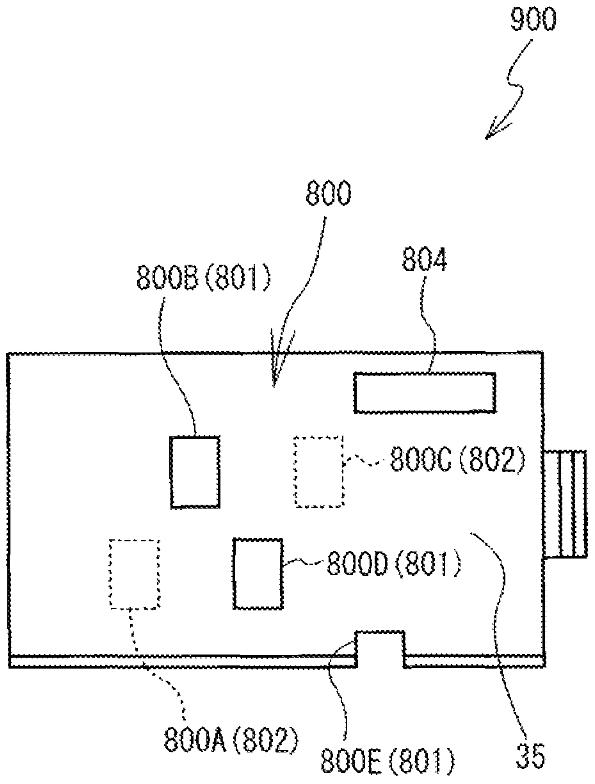
FIG. 13 is an enlarged front view of an arm front surface 35.

The arm indicator portion 800 that is provided on the first indicator member 900 will be explained with reference to FIG. 13. The arm indicator portion 800 is provided in a position corresponding to the arm detection portion 200 (refer to FIG. 7). The arm indicator portion 800 includes a plurality of indicator portions. Each of the indicator portions is either a non-pressing portion 801 that is a through hole whose opening shape is a vertically long rectangular shape and into which the switch terminal 222 can be inserted, or a pressing portion 802 that is a surface portion that comes into contact with the switch terminal 222. The arm indicator portion 800 of the present embodiment includes either the non-pressing portion 801 or the pressing portion 802 at each of five positions corresponding to the five switch terminals 222.

An arrangement pattern of the non-pressing portions 801 and the pressing portions 802 is determined in accordance with the tape type (in the present embodiment, printing information that indicates the tape width and the printing format) of the tape cassette 30. Note that a data table, in which the combinations of the on and off states of the five arm detection switches 210 are associated with the printing information of the tape cassette 30, is stored in the ROM 402 (refer to FIG. 8) of the tape printer 1. In this data table, the off state of the arm detection switch 210 corresponds to the non-pressing portion 801, and the on state of the arm detection switch 210 corresponds to the pressing portion 802.

Hereinafter, the arrangement pattern of the non-pressing portions 801 and the pressing portions 802 will be explained with reference to FIG. 13. Note that, when the non-pressing portions 801 and the pressing portions 802 are collectively referred to or when no distinction is made between them, they are simply referred to as indicator portions 800A to 800E.

The indicator portion 800A and the indicator portion 800D are provided side by side along the left-right direction, slightly below the center in the vertical direction of the first indicator member 900. The indicator portion 800B and the indicator portion 800C are provided side by side along the left-right direction, slightly above the center in the vertical direction of the first indicator member 900. The indicator portion 800E is provided in a right portion of a lower end portion of the first indicator member 900. In the present embodiment, the positions of the indicator portions 800A to 800E in the left-right direction are different from each other. In other words, the indicator portions 800A to 800E are not mutually arranged in rows in the up-down direction, and the respective indicator portions 800A to 800E are arranged in a zigzag pattern.

In the present embodiment, the indicator portions 800A, 800B and 800E indicate the width (seven types from 3.5 mm to 36 mm, for example) of the tape that is housed in the tape cassette 30, by a combination of each of the non-pressing portions 801 and the pressing portions 802. A printing format (normal image printing or mirror image printing, for example) of the tape that is housed in the tape cassette 30 is indicated by whether the indicator portion 800C is the non-pressing portion 801 or the pressing portion 802. Other information (whether a tape color is white or a color other than white, for example) relating to the tape that is housed in the tape cassette 30 is indicated by whether the indicator portion 800D is the non-pressing portion 801 or the pressing portion 802.

In the first indicator member 900, the latch hole 804, which is a through hole having a substantially rectangular shape in a front view and which is longer in the left-right direction, is provided in the upper right of the arm indicator portion 800. The latch hole 804 is a hole portion into which the latch projection 225 is inserted when the platen holder 12 moves to the print position (refer to FIG. 5). Note that a section of a lower wall of the latch hole 804 is formed to be inclined with respect to the horizontal direction so that the an opening width of the latch hole 804 in the up-down direction is largest on the arm front surface 35 and the opening width is gradually reduced toward the inside.

When the tape cassette 30 having the above-described structure is assembled, first, as shown in FIG. 4, the operator houses the double-sided adhesive tape 58, the film tape 59 and the ink ribbon 60 respectively in predetermined positions in the bottom case 31B. Next, the operator attaches the top case 31A (refer to FIG. 10) to the bottom case 31B (refer to FIG. 11). When the top case 31A is attached to the bottom case 31B, the open portion 30D is formed in the front portion of the arm portion 34 as shown in FIG. 12. Lastly, the operator attaches the first indicator member 900 to the open portion 30D and thus the assembly of the tape cassette 30 is completed.

When the length in the up-down direction of the first indicator member 900 is smaller than a predetermined width, the length in the up-down direction of the indicator portion 800E, which is provided in the lowest position among the plurality of indicator portions 800A to 800E, may become smaller than that of the other indicator portions 800A to 800D. In this case, regardless of the fact that the indicator portion 800E is the non-pressing portion 801, there is a possibility that the switch terminal 222 of the arm detection switch 210 that faces the indicator portion 800E comes into contact with the bottom wall 31G of the bottom case 31B and the on state is established erroneously.

In the present embodiment, in a case where the indicator portion 800E is the non-pressing portion 801, when the first indicator member 900 is attached to the open portion 30D, the non-pressing portion 801 is communicatively connected to the notch portion 31L in the up-down direction (refer to FIG. 9 and FIG. 13), the notch portion 31L being formed in the open portion 30D of the bottom case 31B. Thus, even when the length in the up-down direction of the indicator portion 800E is smaller than that of the other indicator portions 800A to 800D, the arm detection switch 210 that faces the indicator portion 800E does not come into contact with the bottom wall 31G and is appropriately inserted into the non-pressing portion 801.

On the other hand, when the length in the up-down direction of the first indicator member 900 is larger than the predetermined width, the length in the up-down direction of the indicator portion 800E is the same as that of the other indicator portions 800A to 800D. Therefore, in a case where the indicator portion 800E is the non-pressing portion 801, in a similar way to a case in which the other indicator portions 800A to 800D are the non-pressing portions 801, it can be a hole portion that is open only in the front surface of the tape cassette 30.

A method for identifying the tape type based on the arm indicator portion 800 and the rear indicator portion 950 will be explained below.

Detection of the tape type by the arm detection portion 200 will be explained with reference to FIG. 4, FIG. 5 and FIG. 13. When the tape cassette 30 is inserted in the proper position in the cassette housing portion 8 by a user and the cassette cover 6 is closed, the platen holder 12 moves from the stand-by position shown in FIG. 4 toward the print position shown in FIG. 5. In response to this, the arm detection portion 200 and the latch projection 225 that are provided in the cassette-facing surface 12B of the platen holder 12 move to positions respectively facing the arm indicator portion 800 and the latch hole 804 that are provided in the arm front surface 35 of the tape cassette 30.

Each of the switch terminals 222 (refer to FIG. 6 and FIG. 7) of the five arm detection switches 210 that protrude from the cassette-facing surface 12B respectively faces either the non-pressing portion 801 or the pressing portion 802 that is provided in corresponding position of the arm indicator portion 800, and the switch terminals 222 are selectively pressed. In the example of the tape cassette 30 shown in FIG. 13, the switch terminals 222 that face the indicator portions 800A and 800C in the arm indicator portion 800 are pressed by the surface portions of the arm front surface 35 that are the pressing portions 802. The switch terminals 222 that face the non-pressing portions 801 in the arm indicator portion 800, namely the indicator portions 800B, 800D and 800E, are inserted into switch holes that are the non-pressing portions 801. Thus, in the arm detection portion 200, the two arm detection switches 210 corresponding to the indicator portions 800A and 800C are in the on state, and the three arm detection switches 210 corresponding to the indicator portions 800B, 800D and 800E are in the off state.

As described above, the data table in which the combinations of the on and off states of the arm detection switches 210 are associated with the printing information is stored in the ROM 402 (refer to FIG. 8) of the tape printer 1. The CPU 401 (refer to FIG. 8) refers to this data table and identifies the printing information corresponding to the combination of the on and off states of the arm detection switches 210. Specifically, the tape width, the printing format and the other information of the tape cassette 30 are identified.

The way in which the tape type is detected by the rear detection portion 300 will be explained with reference to FIG. 4 and FIG. 5. As shown in FIG. 4 and FIG. 5, when the tape cassette 30 is inserted in the proper position in the cassette housing portion 8, the periphery (more specifically, the corner portions 32A) of the cassette case 31 is supported from below by the cassette support portion 8B (refer to FIG. 2) of the cassette housing portion 8. At the same time, the rear surface portion 68 of the bottom case 31B is supported from below by the rear support portion 8C (refer to FIG. 2).

The rear detection portion 300 (refer to FIG. 2) provided in the rear support portion 8C (refer to FIG. 2) faces the rear indicator portion 950 of the tape cassette 30. More specifically, the switch terminals 322 (refer to FIG. 3) of the rear detection switches 310 that protrude from the rear support portion 8C respectively face either the non-pressing portion 951 or the pressing portion 952 provided at corresponding positions in the rear indicator portion 950, and are selectively pressed. More specifically, the rear detecting switches 310 that face the non-pressing portions 951 are inserted into the non-pressing portions 951, and are thus in the off state. The rear detecting switches 310 that face the pressing portions 952 are pressed by the pressing portions 952, and are thus in the on state.

As described above, the data table, in which the combinations of the on and off states of the rear detection switches 310 are associated with the color information, is stored in the ROM 402 (refer to FIG. 8) of the tape printer 1. The CPU 401 (refer to FIG. 8) refers to this data table and identifies the color information corresponding to the combination of the on and off states of the rear detection switches 310.

The tape cassette 30 of the present embodiment is structured such that not only the tape printer 1 can recognize the printing information by detecting the arm indicator portion 800, but also a person can recognize the printing information by visually checking the arm indicator portion 800. A method for recognizing the printing information by visually checking the arm indicator portion 800 will be explained with reference to FIG. 13.

As described above, whether each of the indicator portions 800A, 800B and 800E is the non-pressing portion 801 or the pressing portion 802 is determined in advance in accordance with the tape width. The operator can ascertain the tape width by visually checking the arm indicator portion 800 and simply confirming whether each of the indicator portions 800A, 800B and 800E is the non-pressing portion 801 or the pressing portion 802.

Whether the indicator portion 800C is the non-pressing portion 801 or the pressing portion 802 is determined in advance in accordance with the printing format. By simply confirming the indicator portion 800C, the operator can ascertain whether normal image printing or mirror image printing is to be performed. Whether the indicator portion 800D is the non-pressing portion 801 or the pressing portion 802 is determined in advance in accordance with the other information (whether the tape color is white or not, for example). The operator can ascertain whether the tape color is white or not by simply confirming the indicator portion 800D.

In this manner, in the tape cassette 30 of the present embodiment, the arrangement pattern of the non-pressing portions 801 and the pressing portions 802 is determined based on predetermined rules depending on the tape type. Therefore, the tape type (the printing information in the present embodiment) of the tape cassette 30 can be recognized by the person visually checking the arm indicator portion 800.

Printing operations of the tape printer 1 in which the tape cassette 30 is inserted will be simply explained with reference to FIG. 4 and FIG. 5. When the tape cassette 30 is inserted in the cassette housing portion 8, the tape drive shaft 100 is fittingly inserted into the tape drive roller 46 and the ribbon take-up shaft 95 is fittingly inserted into the ribbon take-up spool 44 (refer to FIG. 4). When the cassette cover 6 is closed, the platen holder 12 moves to the print position, the platen roller 15 faces the thermal head 10, and the movable feed roller 14 presses the tape drive roller 46 (refer to FIG. 5).

When printing is performed in the tape printer 1, the tape drive roller 46 that is rotatably driven via the tape drive shaft 100 pulls out the film tape 59 from the second tape spool 41 by moving in concert with the movable feed roller 14. The ribbon take-up spool 44 that is rotatably driven via the ribbon take-up shaft 95 pulls out the unused ink ribbon 60 from the ribbon spool 42 in synchronization with the print speed. The film tape 59 that has been pulled out from the second tape spool 41 is fed along a feed path within the arm portion 34 while passing outside of the ribbon spool 42. Then, the film tape 59 is supplied from the discharge opening 34A to the head insertion portion 39 in a state in which the ink ribbon 60 is joined to the print surface of the film tape 59, and is fed between the thermal head 10 and the platen roller 15 of the tape printer 1.

Then, characters, graphics and symbols etc. are printed onto the print surface of the film tape 59 by the thermal head 10. Following that, the used ink ribbon 60 is separated from the printed film tape 59 at the guide wall 47 and is taken up by the ribbon take-up spool 44. Meanwhile, the double-sided adhesive tape 58 is pulled out from the first tape spool 40 by the tape drive roller 46 moving in concert with the movable feed roller 14. While being guided and caught between the tape drive roller 46 and the movable feed roller 14, the double-sided adhesive tape 58 is laminated and affixed to the print surface of the printed film tape 59. The printed film tape 59 to which the double-sided adhesive tape 58 has been affixed (namely, the laminated tape 50) is fed toward the tape discharge opening 49, and then cut by the cutting mechanism 17. Thus, the printing operations of the tape printer 1 are completed.

Note that, in the present embodiment, the laminated type tape cassette 30 formed from a general purpose cassette is used in the tape printer 1 that is a general purpose machine. Therefore, the single tape printer 1 can be adapted to be used for tape cassettes of various types, such as the heat-sensitive type, the receptor type, the heat-sensitive laminated type and the like.

As explained above, in the tape cassette 30 of the first embodiment, the arm indicator portion 800 to identify the type of the tape housed in the cassette case 31 is provided on the first indicator member 900 that is independent from the top case 31A and the bottom case 31B. Therefore, the common top case 31A and the common bottom case 31B can be used regardless of the type of the tape housed in the cassette case 31. As compared to a case in which the bottom cases 31B and the top cases 31A that are different depending on each tape type are prepared, it is possible to reduce the types of the bottom case 31B and the top case 31A. Thus, component management of the bottom case 31B and the top case 31A during manufacture is simplified. It is possible to reduce dies for manufacturing the bottom case 31B and the top case 31A, and to reduce manufacturing costs of the tape cassette 30.

The arrangement pattern of the non-pressing portions 801 and the pressing portions 802 formed in the first indicator member 900 is determined in advance so that a person can recognize the tape type by visual check. The first indicator member 900 is provided on the upstream side, in the tape feed direction, of the discharge opening 34A in the arm portion 34. Therefore, the person can visually check the arm indicator portion 800 as well as the tape in the arm portion 34 from the front of the tape cassette 30. Accordingly, the operator can verify the type of the tape to be housed in the cassette case 31 against the tape type indicated by the arm indicator portion 800, and it is therefore possible to accurately manufacture the tape cassette 30.

The operator can visually check the film tape 59 housed in the tape cassette 30, at the open portion 30D to which the first indicator member 900 is attached. The operator can attach the first indicator member 900 to the open portion 30D while confirming the film tape 59 from the open portion 30D.

Since the first indicator member 900 is slidingly attached to the open portion 30D, it can be easily attached. The operator also can remove the first indicator member 900 from the open portion 30D. Therefore, even in case of a combination error of the tape type and the first indicator member 900, it is sufficient to replace only the first indicator member 900. Therefore, even if there is an assembly error of the tape or the first indicator member 900, it is possible to omit a useless process, such as disassembling the cassette case 31.

Figure 14:
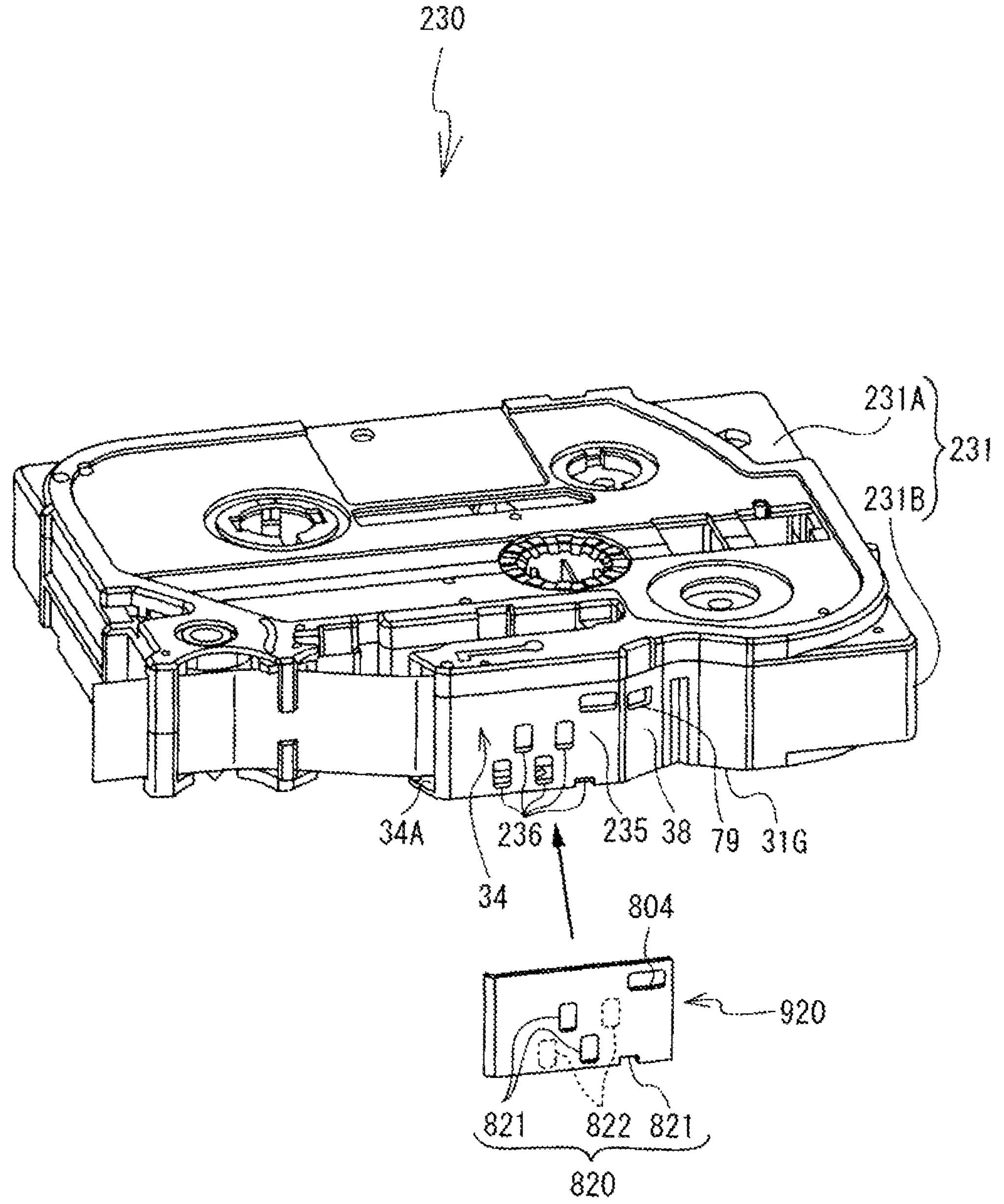
FIG. 14 is a view in which a first indicator member 920 is attached to a wall portion 235 according to a second embodiment.

A tape cassette 230 of a second embodiment will be explained with reference to FIG. 14. In the tape cassette 230 of the second embodiment, a first indicator member 920 in the form of a film is, adhered to a wall portion 235 that is formed on the upstream side, in the tape feed direction, of the discharge opening 34A in the arm portion 34. Note that the tape cassette 230 is the same as the tape cassette 30 according to the first embodiment except for some of the structural components. Therefore, the same structural components and processes are denoted with the same reference numerals and an explanation thereof is omitted or simplified.

The tape cassette 230 includes a cassette case 231 that is provided with a top case 231A and a bottom case 231B. The semi-circular groove 38 is formed in a front surface of the cassette case 231, in a similar way to the cassette case 31 of the first embodiment. The tape cassette 230 is provided with the wall portion 235 which extends from a left end portion of the semi-circular groove 38 to the discharge opening 34A and which blocks the front portion of the arm portion 34. The wall portion 235 is provided with five detection holes 236.

In the present embodiment, four of the five detection holes 236 are through holes whose opening shape is a vertically long rectangular shape, and one of them is open continuously from a right portion of a lower end portion of the wall portion 235 to the bottom wall 31G. In a state in which the tape cassette 230 is inserted in the cassette housing portion 8 of the tape printer 1, the detection holes 236 are arranged respectively at positions facing the switch terminals 222 of the arm detection switches 210. The first indicator member 920 in the form of a film is adhered to a front surface of the wall portion 235.

The first indicator member 920 will be explained with reference to FIG. 14. The first indicator member 920 is a film having a rectangular shape in a plan view, and adhesive is applied to one of its surfaces. An arm indicator portion 820 is formed in the first indicator member 920. The arm indicator portion 820 is provided with communication holes 821 and blocking portions 822 that are formed in an arrangement pattern corresponding to the type of the tape cassette 230. When the first indicator member 920 is adhered to the front surface of the wall portion 235, the communication holes 821 and the blocking portions 822 are formed in positions that respectively correspond to the plurality of detection holes 236 formed in the wall portion 235.

The plurality of communication holes 821 have an opening width that is slightly larger than that of the detection holes 236. In the present embodiment, among the plurality of communication holes 821, the communication hole 821 that is formed in a position corresponding to one of the indicator portions 800A to 800D (refer to FIG. 13) of the first embodiment is a hole whose opening shape is a vertically long rectangular shape. The communication hole 821 that is formed in a position corresponding to the indicator portion 800E (refer to FIG. 13) of the first embodiment is a cutout portion having a convex shape that is cut out upward from a lower edge portion.

When the first indicator member 920 is affixed to the wall portion 235, the detection holes 236 that face the communication holes 821 are exposed via the communication holes 821. Therefore, the switch terminals 222 of the arm detection switches 210 can be inserted. In other words, the arm detection switches 210 that face the detection holes 236 that are exposed via the communication holes 821 are in the off state because the switch terminals 222 are inserted into the detection holes 236.

The blocking portions 822 are surface portions where the communication holes 821 are not Formed. When the first indicator member 920 is affixed to the wall portion 235, the detection holes 236 that face the blocking portions 822 are covered by the blocking portions 822. Therefore, the switch terminals 222 of the arm detection switches 210 cannot be inserted. In other words, the arm detection switches 210 that face the detection holes 236 covered by the blocking portions 822 are in the on state because the switch terminals 222 come into contact with the blocking portions 822.

An arrangement pattern of the communication holes 821 and the blocking portions 822 that are formed in the first indicator member 920 is determined in advance based on predetermined rules depending on the tape type, in a similar way to the non-pressing portions 801 and the pressing portions 802 in the first embodiment. Therefore, not only the tape printer 1 can recognize the tape type by detecting the first indicator member 920, but also a person can recognize the tape type by visually checking the first indicator member 920.

As explained above, in the tape cassette 230 of the second embodiment, since the first indicator member 920 is affixed to the wall portion 235, it is possible to change the arm indicator portion 820 that is formed on the wall portion 235. Therefore, the common top case 231A and the common bottom case 231B can be used regardless of the type of the tape housed in the cassette case 231. Further, since the first indicator member 920 is a member in the form of a film, it can be formed by press working at a low cost. It is therefore possible to reduce manufacturing costs of the tape cassette 230. Note that the first indicator member 920 may be a member in the form of a sheet.

A tape cassette 330 of a third embodiment will be explained with reference to FIG. 15 to FIG. 19. In the tape cassette 330 of the third embodiment, an arm indicator portion 830 and a rear indicator portion 953 are formed on a top case 331A. Note that the tape cassette 330 is the same as the tape cassette 30 according to the first embodiment except for some of the structural components. Therefore, the same structural components are denoted with the same reference numerals and an explanation thereof is omitted or simplified.

Figure 19:
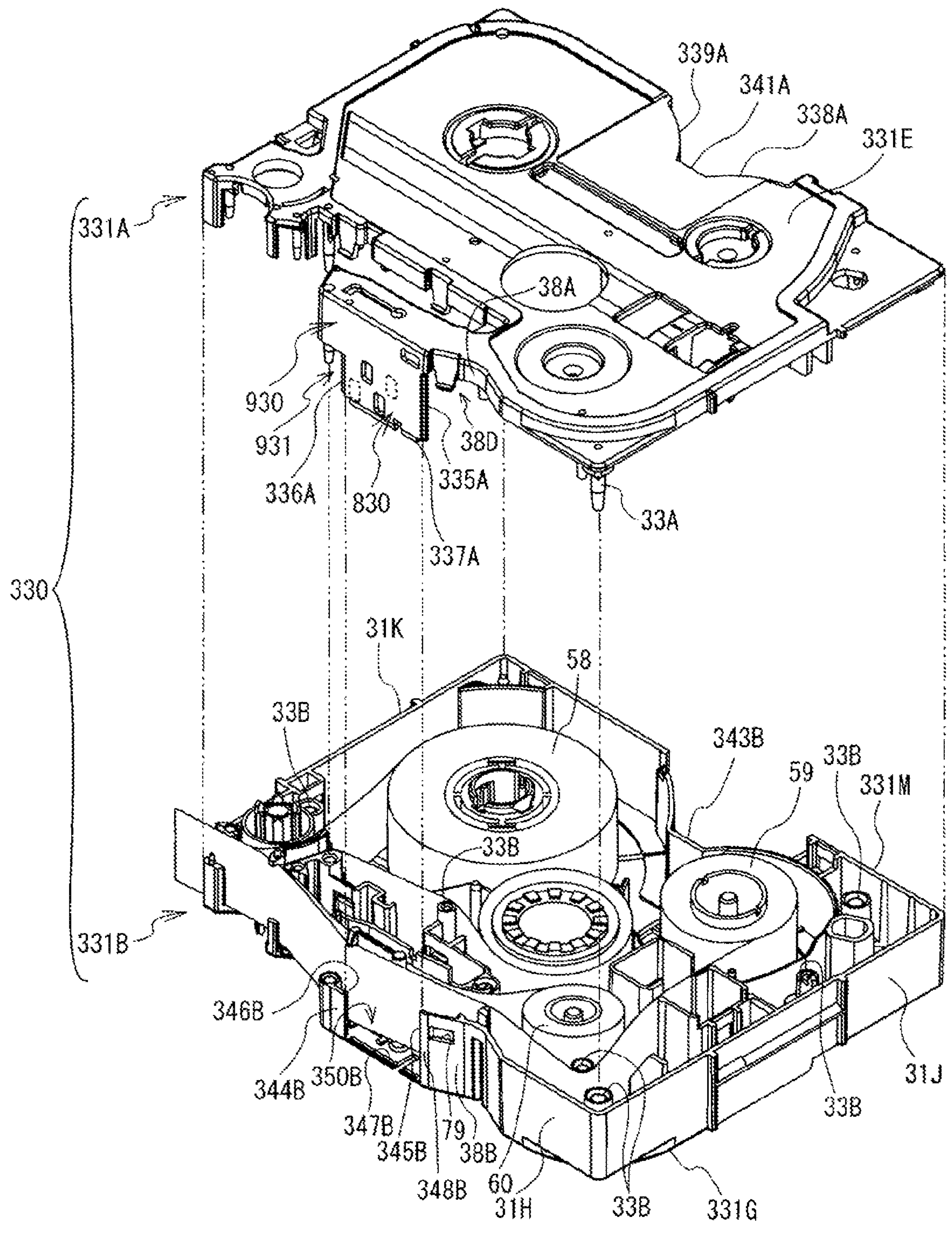
FIG. 19 is an exploded perspective view of a tape cassette 330.

As shown in FIG. 19, the tape cassette 330 is provided with the top case 331A and a bottom case 331B. The top case 331A will be explained with reference to FIG. 15 and FIG. 16. The top case 331A is provided with a top wall 331E that is formed in a rectangular shape that is longer in the left-right direction in a plan view. A rear edge portion of the top wall 331E is provided with a left arc portion 339A, which is formed in a substantially quarter arc shape that bulges toward the rear right in a plan view, and a right arc portion 338A, which is formed in a substantially quarter arc shape that bulges toward the rear left in the plan view, such that they are arranged side by side in the left-right direction. A middle portion 341A that extends linearly in the left-right direction is formed between the right arc portion 338A and the left arc portion 339A.

Figure 16:
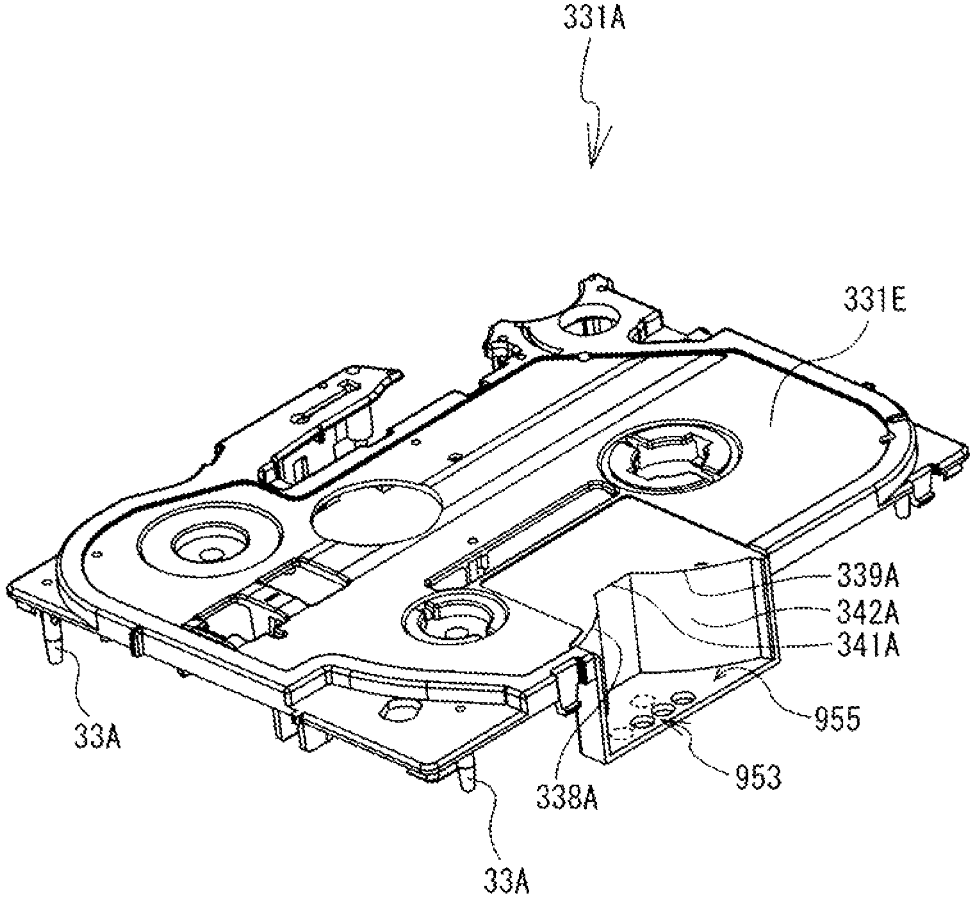
FIG. 16 is a perspective view of the top case 331A as seen from the rear right side.

As shown in FIG. 16, a plate-shaped protruding plate portion 342A is provided that protrudes downward from the left arc portion 339A, the right arc portion 338A and the middle portion 341A. A height dimension (a dimension in the up-down direction) of the protruding plate portion 342A is the same as the height dimension from the top surface 30A of the tape cassette 330 to the lower surface of the corner portions 32A (refer to FIG. 9).

A second indicator plate portion 955, which extends in a direction orthogonal to a surface of the protruding plate portion 342A, is formed on the lower end of the protruding plate portion 342A, the second indicator plate portion 955 being a flat surface portion that has a substantially triangular shape in a plan view and that corresponds to the rear support portion 8C (refer to FIG. 2). The second indicator plate portion 955 is provided with the rear indicator portion 953. The rear indicator portion 953 is similar to the rear indicator portion 950 of the first embodiment and an explanation thereof is thus omitted.

Figure 15:
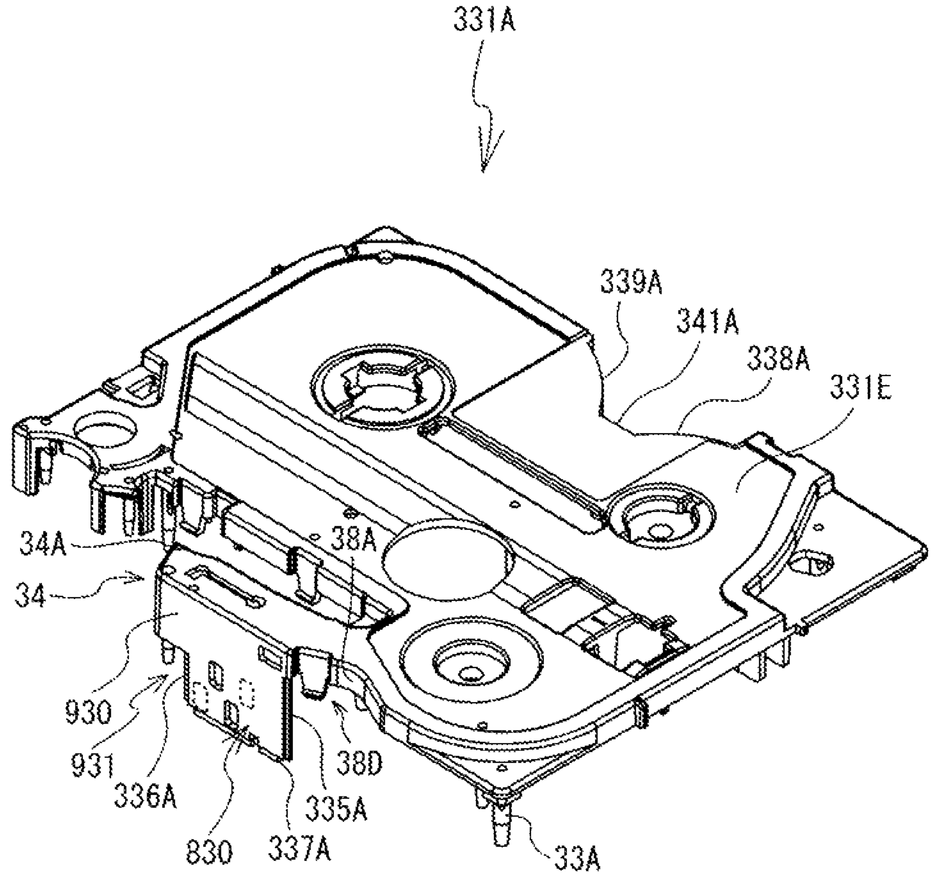
FIG. 15 is a perspective view of a top case 331A according to a third embodiment, as seen from the front right side.

As shown in FIG. 15, a plate-shaped first indicator plate portion 930 is provided protruding downward from a central portion of the front end of the top wall 331E of the top case 331A. The first indicator plate portion 930 is formed in a substantially rectangular plate shape that is horizontally long in a front view. The first indicator plate portion 930 is a portion of the front surface of the arm portion 34 that is provided on the top case 331A.

A cutout portion 931, which is cut out in a vertically long rectangular shape in a front view, is formed in a lower left corner portion of the first indicator plate portion 930. A convex portion 335A that continuously protrudes to the right is provided from an upper end portion to a lower end portion of the right end face of the first indicator plate portion 930. A convex portion 336A that continuously protrudes to the left is provided from a central portion in the up-down direction to a lower end portion of the left end face of the first indicator plate portion 930. A convex portion 337A that continuously protrudes downward is provided from a left end portion to a right end portion of the lower end face of the first indicator plate portion 930. A height dimension (a dimension in the up-down direction) of the first indicator plate portion 930 is the same as the height dimension of the tape cassette 330. The first indicator plate portion 930 is provided with the arm indicator portion 830. The arm indicator portion 830 is similar to the arm indicator portion 800 of the first embodiment and an explanation thereof is thus omitted.

Note that the pin portions 33A are provided protruding downward from a lower surface of the top wall 331E, in a similar way to the first embodiment. A height dimension of the pin portions 33A is smaller than the height dimension of the first indicator plate portion 930 and the height dimension of the protruding plate portion 342A.

Figure 17:
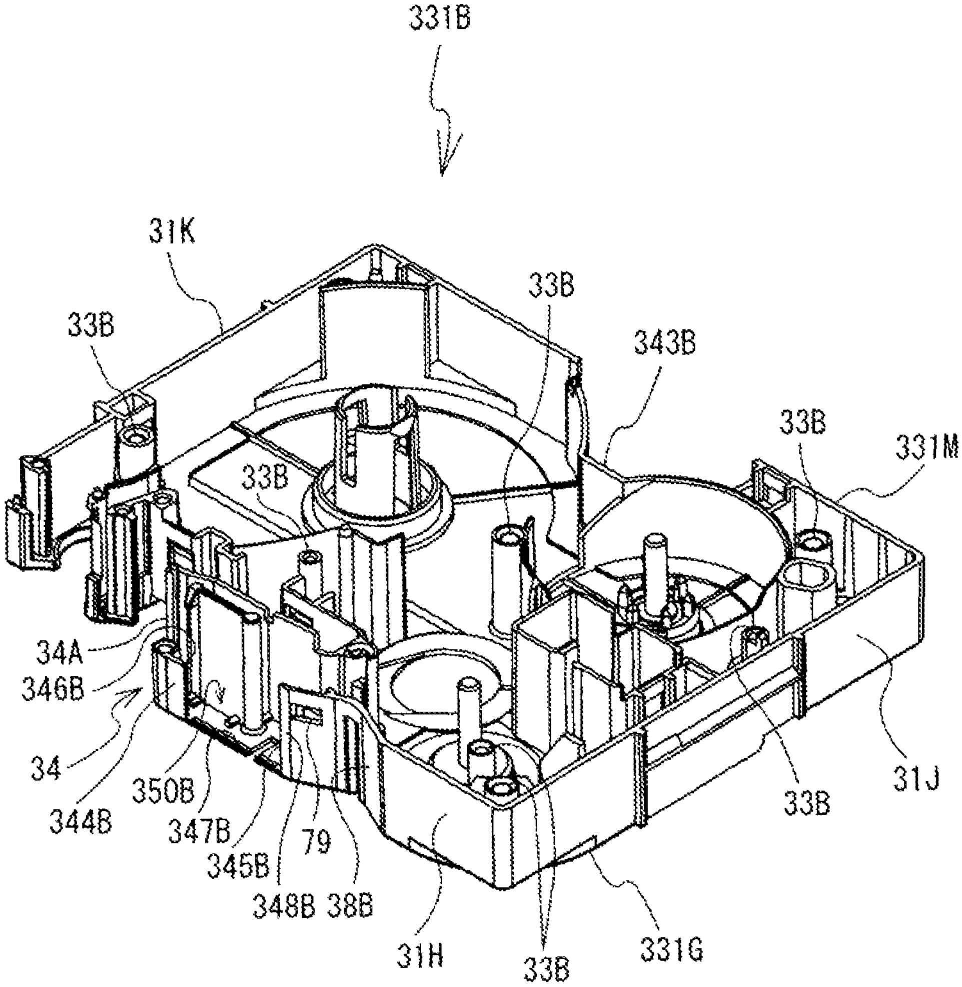
FIG. 17 is a perspective view of a bottom case 331B as seen from the front right side.
Figure 18:
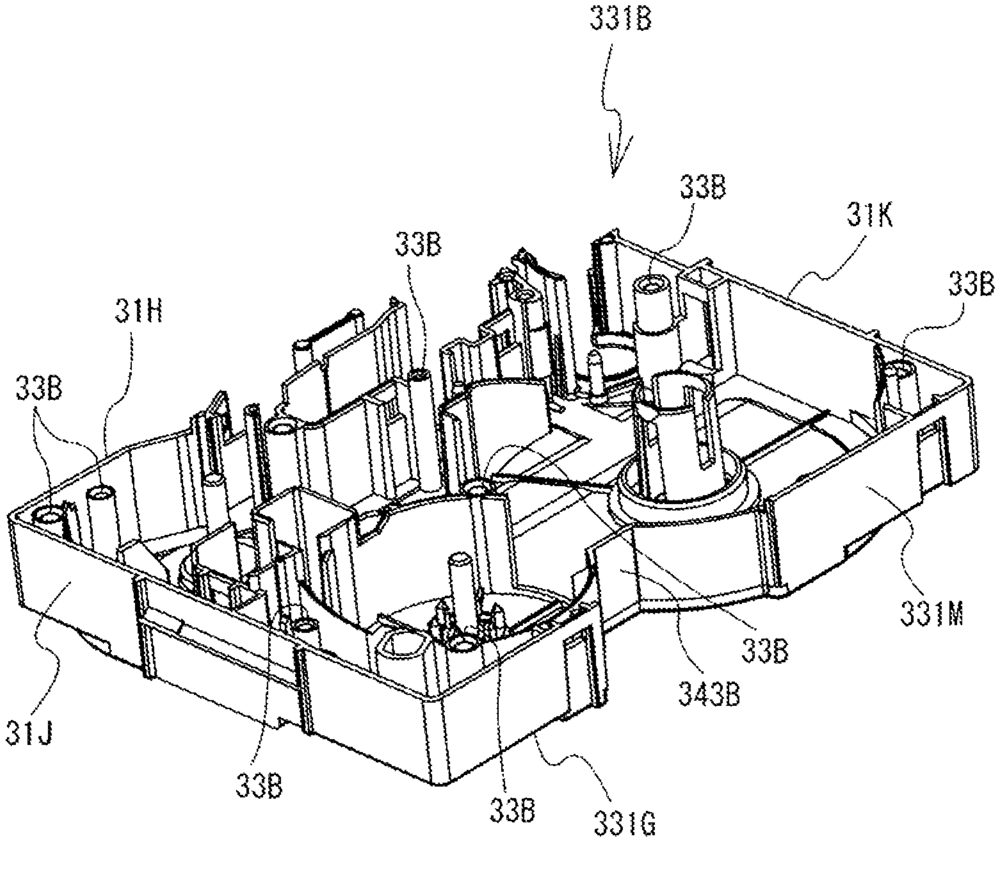
FIG. 18 is a perspective view of the bottom case 331B as seen from the rear right side.

The bottom case 331B will be explained with reference to FIG. 17 and FIG. 18. The bottom case 331B is formed in a box shape in which an upper portion opens. A rear edge portion of a bottom wall 331G has a shape in which two substantially quarter arcs are provided side by side in a plan view in a central portion, corresponding to the shape of the rear edge portion of the top wall 331E. A central portion in the left-right direction of a back wall 331M is provided with a recessed portion 343B that is recessed toward the front in the up-down direction. The recessed portion 3438 is a concave portion that is recessed in a substantially triangular shape corresponding to the above-described second indicator plate portion 955 in a plan view.

A right guide wall 348B, which is a wall portion provided continuously to the lower semi-circular portion 38B, is provided on the left side of the lower semi-circular portion 38B. A groove portion 345B that is continuous from the upper end to the lower end is formed in the left end face of the right guide wall 348B. The right guide wall 348B is a portion of the front surface of the arm portion 34 that is provided on the upstream side, in the tape feed direction, of the discharge opening 34A in the bottom case 331B.

On the left side of the right guide wall 348B, a left guide wall 344B, which is a wall portion formed in a vertically long rectangular plate shape in a front view, is provided in a standing manner on the bottom wall 331G away from the right guide wall 348B. The left guide wall 344B is a portion of the front surface of the arm portion 34 that is provided in the vicinity of the discharge opening 34A in the bottom case 331B. A groove portion 346B that is continuous from the upper end to the lower end is formed in the right end face of the left guide wall 344B.

A cutout space that opens upwardly and that is surrounded by the right guide wall 348B, the left guide wall 344B and the bottom wall 331G is an indicator plate attachment portion 350B to which the above-described first indicator plate portion 930 is attached. In a portion of the bottom wall 331G between the right guide wall 348B and the left guide wall 344B, a groove portion 347B is formed along the left-right direction of the indicator plate attachment portion 350B.

A method for assembling the tape cassette 330 having the above-described structure will be explained with reference to FIG. 19. The operator houses the double-sided adhesive tape 58, the film tape 59 and the ink ribbon 60 respectively in predetermined positions of the bottom case 331B. Next, the operator puts the top case 331A on the bottom case 331B from above. At this time, the first indicator plate portion 930 is inserted between the right guide wall 348B and the left guide wall 344B, namely, into the indicator plate attachment portion 350B. At the same time, the second indicator plate portion 955 is inserted into the recessed portion 343B.

When the operator presses the top case 331A downward onto the bottom case 331B, the first indicator plate portion 930 slidingly moves downward in the indicator plate attachment portion 350B while being guided between the right guide wall 348B and the left guide wall 344B. Specifically, the convex portion 336A slidingly moves along the groove portion 346B, and the convex portion 335A slidingly moves along the groove portion 345B. At the same time, the second indicator plate portion 955 slidingly moves downward in the recessed portion 343B while being guided by the back wall 331M.

The plurality of pin portions 33A that are provided on the top case 331A are respectively fitted into the cylindrical holes of the plurality of boss portions 33B that are provided in the bottom case 331B. When the top case 331A is moved further downward, the fixing portion 38D of the top case 331A is fitted into the fixing hole 79 of the bottom case 331B. When the first indicator plate portion 930 is fitted into the indicator plate attachment portion 350B and the second indicator plate portion 955 is fitted into the recessed portion 343B, the convex portion 337A of the top case 331A is joined to the groove portion 347B of the bottom case 331B. This completes the attachment of the top case 331A to the bottom case 331B.

When the top case 331A is attached to the bottom case 331B, the second indicator plate portion 955 is included in a portion of the bottom wall 331G in a similar way to the above-described rear surface portion 68 (refer to FIG. 11). The second indicator plate portion 955 is on the same plane (i.e., at the same height position) as the lower surface of the corner portions 32A (refer to FIG. 9). Therefore, when the tape cassette 330 is inserted in the cassette housing portion 8 (refer to FIG. 2), the second indicator plate portion 955 is supported from below by the rear support portion 8C and the rear indicator portion 953 is detected by the rear detection portion 300, in a similar way to the first embodiment.

As explained above, according to the tape cassette 330 of the third embodiment, the arm indicator portion 830 and the rear indicator portion 953 are formed on the top case 331A. Therefore, the common bottom case 331B can be used regardless of the type of the tape housed in the tape cassette 330, and it is thus possible to reduce manufacturing costs of the tape cassette 330. Further, the operator can attach the top case 331A provided with the arm indicator portion 830 to the bottom case 331B while confirming the tape housed in the bottom case 331B. Therefore, assembly errors of the cassette case 331 are reduced.

The operator can mount the arm indicator portion 830 and the rear indicator portion 953 on the tape cassette 330 by simply attaching the top case 331A to the bottom case 331B. Therefore, the workability of the tape cassette 330 in a manufacturing process is improved. Further, when the top case 331A is attached to the bottom case 331B, the first indicator plate portion 930 on which the arm indicator portion 830 is formed is guided downward by the right guide wall 348B and the left guide wall 344B. The second indicator plate portion 955 that is provided with the rear indicator portion 953 is guided downward by the back wall 331M. Therefore, the operator can accurately inserts the first indicator plate portion 930 into the indicator plate attachment portion 350B, and thus the workability of the tape cassette 330 in the manufacturing process is further improved.

Figure 21:
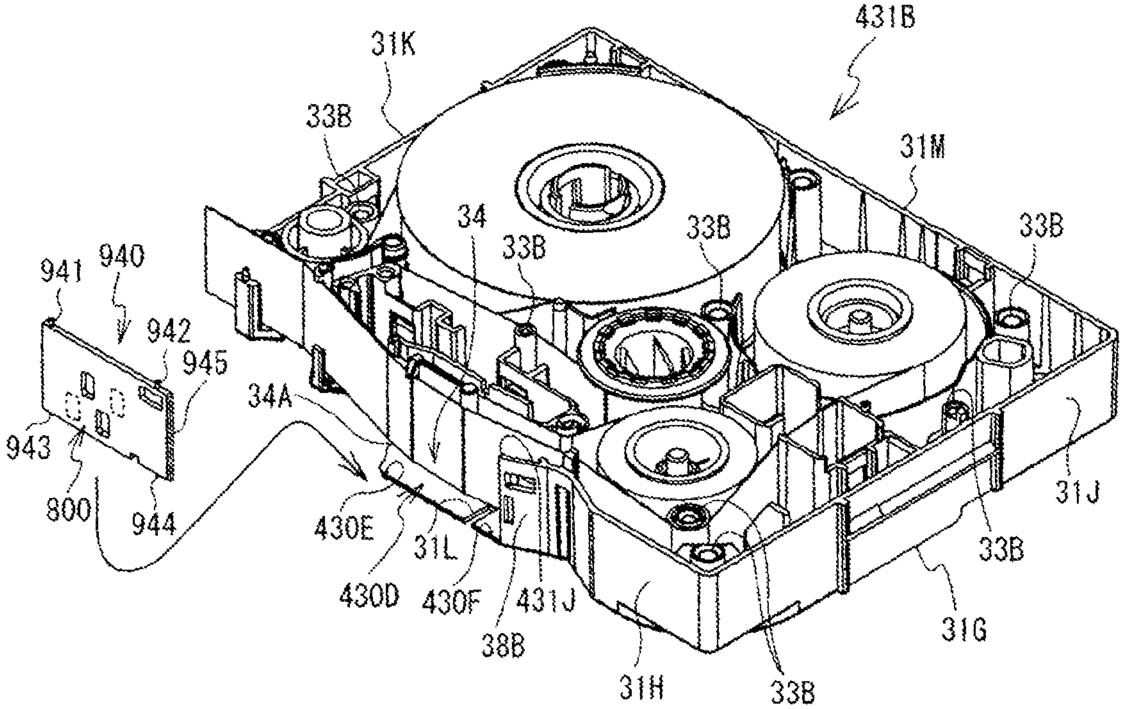
FIG. 21 is a view in which a first indicator member 940 is attached to an attachment portion 430D.

Note that it is needless to mention that the present disclosure is not limited to the above-described embodiments and various modifications are possible. For example, in the first embodiment, the first indicator member 900 is attached to the open portion 30D that is formed in a state in which the top case 31A is attached to the bottom case 31B. However, as shown in FIG. 21, a bottom case 431B may be provided with an attachment portion 430D to which a first indicator member 940 is attached.

Hereinafter, a tape cassette 430 of a first modified example, in which the bottom case 431B is provided with the attachment portion 430D to which the first indicator member 940 is attached, will be explained with reference to FIG. 20 and FIG. 21. Note that the tape cassette of the first modified example is structured in a similar way to the first embodiment except that the first indicator member 940 is attached. Therefore, in the following explanation, portions different from those of the first embodiment only will be explained and the other structural components are denoted with the same reference numerals and an explanation thereof will be omitted.

Figure 20:
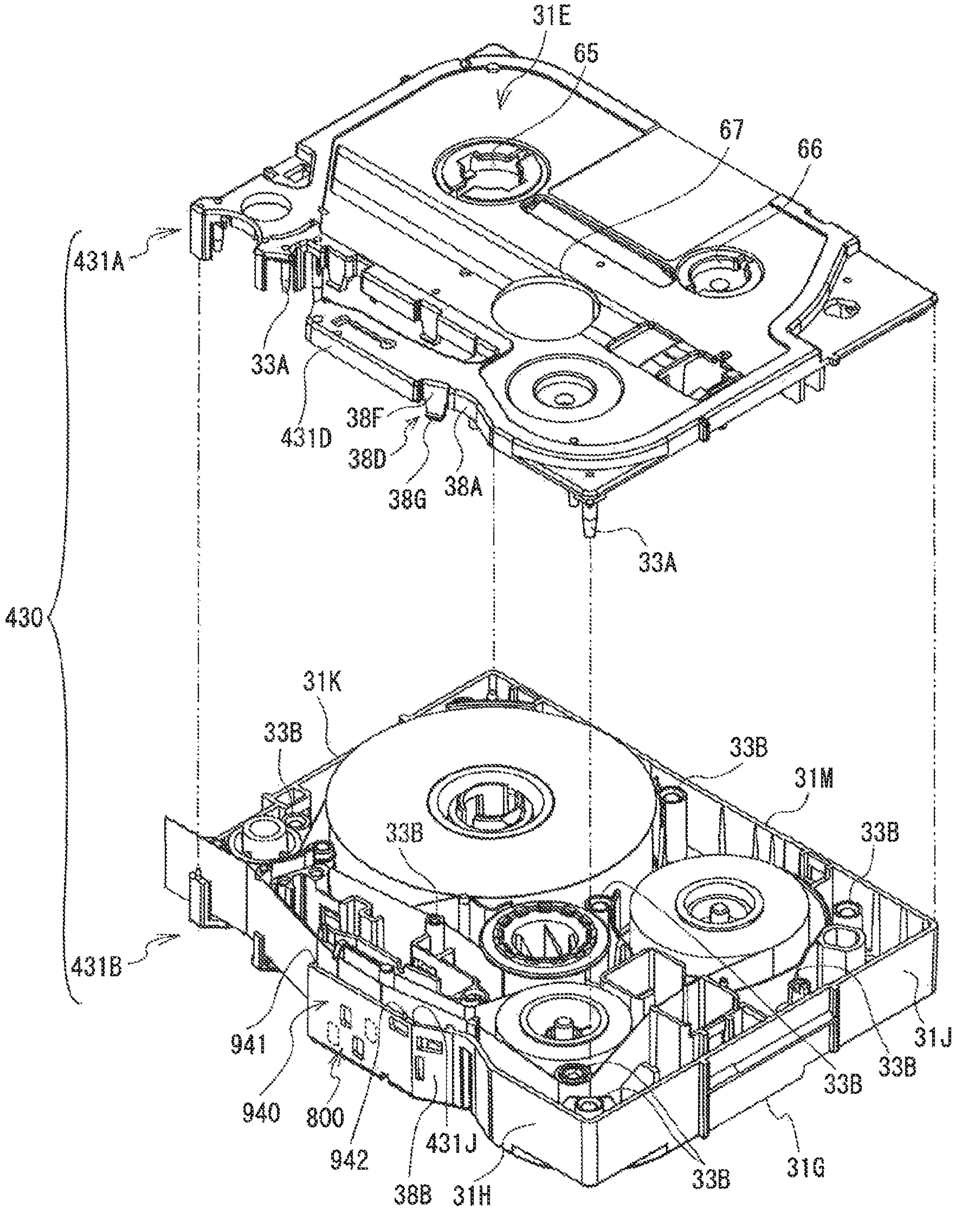
FIG. 20 is an exploded perspective view of a tape cassette 430 according to a first modified example.

As shown in FIG. 20, the tape cassette 430 of the first modified example is provided with a top case 431A and the bottom case 431B. An extending portion 431D that is formed in a horizontally long rectangular plate shape in a front view is provided on the left side of the upper semi-circular portion 38A of the top case 431A. The extending portion 431D extends downward from the front end of the top wall 31E. The lower end face of the extending portion 431D is provided with two concave portions (not shown in the drawings) that are recessed upward and arranged side by side in the left-right direction.

The bottom case 431B will be explained with reference to FIG. 21. The bottom case 431B includes, on the left side of the lower semi-circular portion 38B, the attachment, portion 430D that is a space in which the first indicator member 940 can be removably attached. The left end face of the lower semi-circular portion 38B is provided with a groove portion 431J that is continuously formed from the upper end to the lower end. In a front edge portion of a top surface of the bottom wall 31G, two concave portions 430F and 430E that are recessed downward are provided from the lower semi-circular portion 38B toward the left such that they are arranged side by side with an interval between them. The concave portions 430E and 430F are provided along the front edge of the lower end face of the arm portion 34 in the bottom case 331B.

A structure of the first indicator member 940 will be explained with reference to FIG. 21. The first indicator member 940 is formed in a rectangular flat plate shape that is horizontally long in a front view. The upper end face of the first indicator member 940 is provided with cylindrically-shaped convex portions 941 and 942 that protrude upward such that they are arranged side by side in the left-right direction. The lower end face of the first indicator member 940 is provided with cylindrically-shaped convex portions 943 and 944 that protrude downward such that they are arranged side by side in the left-right direction. A convex portion 945 that continuously protrudes to the right is provided from the upper end to the lower end of the right end face of the first indicator member 940. The first indicator member 940 is provided with the arm indicator portion 800, which is the same as that of the first embodiment.

A method for assembling the tape cassette 430 will be explained with reference to FIG. 20 and FIG. 21. As shown in FIG. 21, the operator attaches the first indicator member 940 to the attachment portion 430D of the bottom case 431B. Specifically, the first indicator member 940 is caused to move downward from above the attachment portion 430D. At this time, the first indicator member 940 is slidingly moved downward so that the convex portion 945 slides along the groove portion 431J. The convex portions 943 and 944 of the first indicator member 940 are respectively fitted into the concave portions 430E and 430F of the bottom case 431B. Next, as shown in FIG. 20, the operator puts the top case 431A on the bottom case 431B. At this time, the pin portions 33A of the top case 431A are fitted into the boss portions 33B of the bottom case 431B. The convex portions 941 and 942 of the first indicator member 940 are fitted into the two concave portions (not shown in the drawings) provided in the lower end face of the extending portion 431D. This completes the assembly of the tape cassette 430.

According to the tape cassette 430 of the first modified example, the tape housed in the bottom case 431B can be visually checked through the attachment portion 430D. While confirming the tape housed in the bottom case 431B, the operator can attach the first indicator member 940 that indicates the correct tape type to the bottom case 431B, and it is thus possible to suppress assembly errors of the tape cassette 430.

As a modified example of the third embodiment, at least one of the arm indicator portion 830 and the rear indicator portion 953 may be provided on a member that can be attached to and removed from a top case 531A. Hereinafter, a tape cassette 530 of a second modified example, in which the arm indicator portion 830 and the rear indicator portion 953 are respectively provided on members that can be attached to and removed from the top case 531A, will be explained with reference to FIG. 22 and FIG. 23. Note that the tape cassette 530 of the second modified example is structured in a similar way to the third embodiment except that the arm indicator portion 830 and the rear indicator portion 953 are respectively provided on the members that can be attached to and removed from the top case 531A. Therefore, in the following explanation, portions different from those of the third embodiment only will be explained and the other structural components are denoted with the same reference numerals and an explanation thereof will be omitted.

Figure 22:
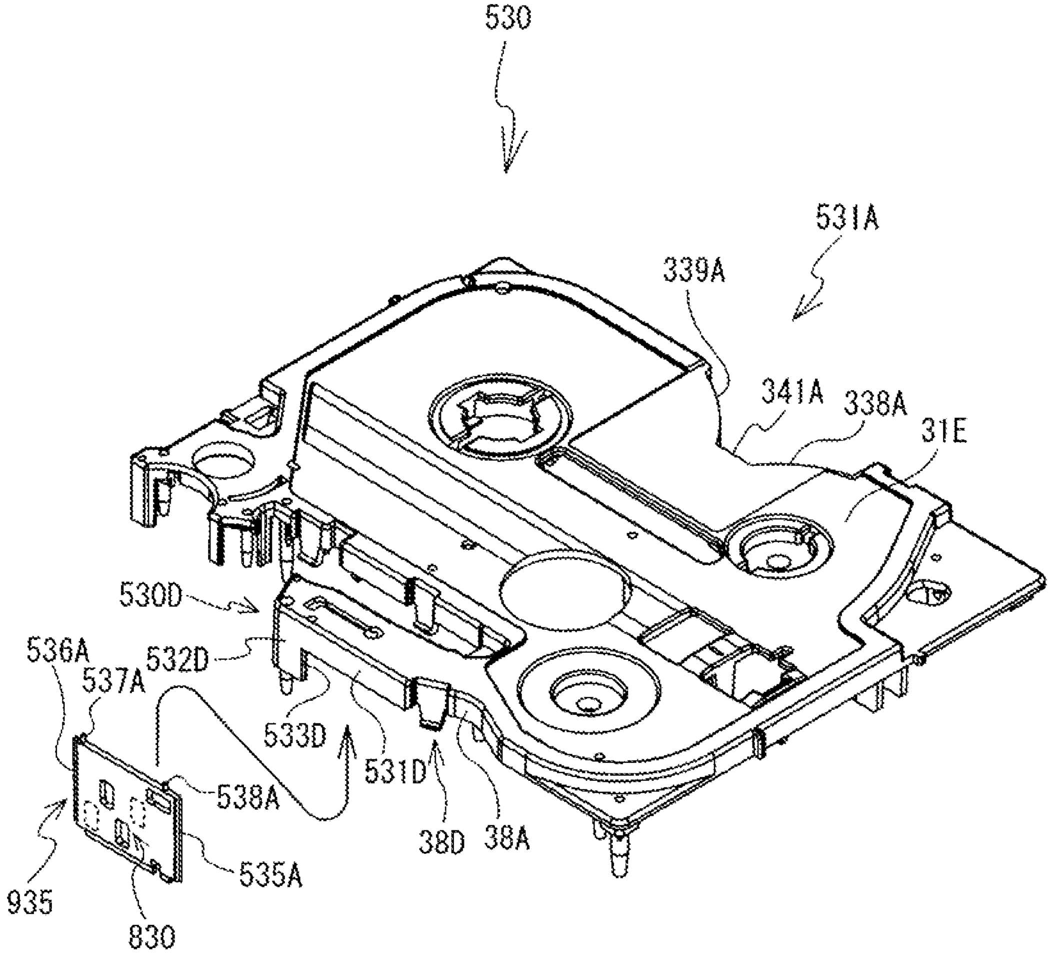
FIG. 22 is a view in which a first indicator member 935 is attached to an attachment portion 530D according to a second modified example.

The top case 531A will be explained with reference to FIG. 22 and FIG. 23. As shown in FIG. 22, on the left side of the upper semi-circular portion 38A, a plate-shaped attachment portion 530D is extended downward from a front end portion of the top wall 31E of the top case 531A. When viewed from the front, the attachment portion 530D has a shape obtained by rotating an L-shape by 90 degrees in the clockwise direction. The attachment portion 530D is provided with: a fixing portion 531D which is formed continuously to a left end portion of the upper semi-circular portion 38A and which has a horizontally long rectangular shape in a front view; and a downwardly extending guide portion 532D which is formed continuously to the left side of the attachment portion 530D and which has a vertically long rectangular shape in the front view. The lower end face of the fixing portion 531D is provided with two concave portions (not shown in the drawings) that are recessed upward and arranged side by side in the left-right direction. A groove portion 533D is formed that is continuous from the upper end to the lower end of the right end face of the guide portion 532D. A plate-shaped first indicator member 935 can be attached to and removed from the attachment portion 530D.

The first indicator member 935 will be explained with reference to FIG. 22. The first indicator member 935 is formed in a substantially rectangular plate shape that is horizontally long in a front view. The upper end face of the first indicator member 935 is provided with two upwardly protruding convex portions 537A and 538A such that they are arranged side by side in the left-right direction. A convex portion 535A that continuously protrudes to the right is provided from the upper end to the lower end of the right end face of the first indicator member 935. A convex portion 536A that continuously protrudes to the left is provided from the upper end to the lower end of the left end face of the first indicator member 935. The first indicator member 935 is provided with the arm indicator portion 830, which is the same as that of the third embodiment.

A method for attaching the first indicator member 935 to the attachment portion 530D will be explained with reference to FIG. 22. The operator moves the first indicator member 935 upward from below the attachment portion 530D. At this time, the first indicator member 935 is slidingly moved upward so that the convex portion 536A slides along the groove portion 533D. The convex portions 537A and 538A of the first indicator member 935 are respectively fitted into the two concave portions of the top case 531A. This completes the attachment of the first indicator member 935 to the top case 531A.

Figure 23:
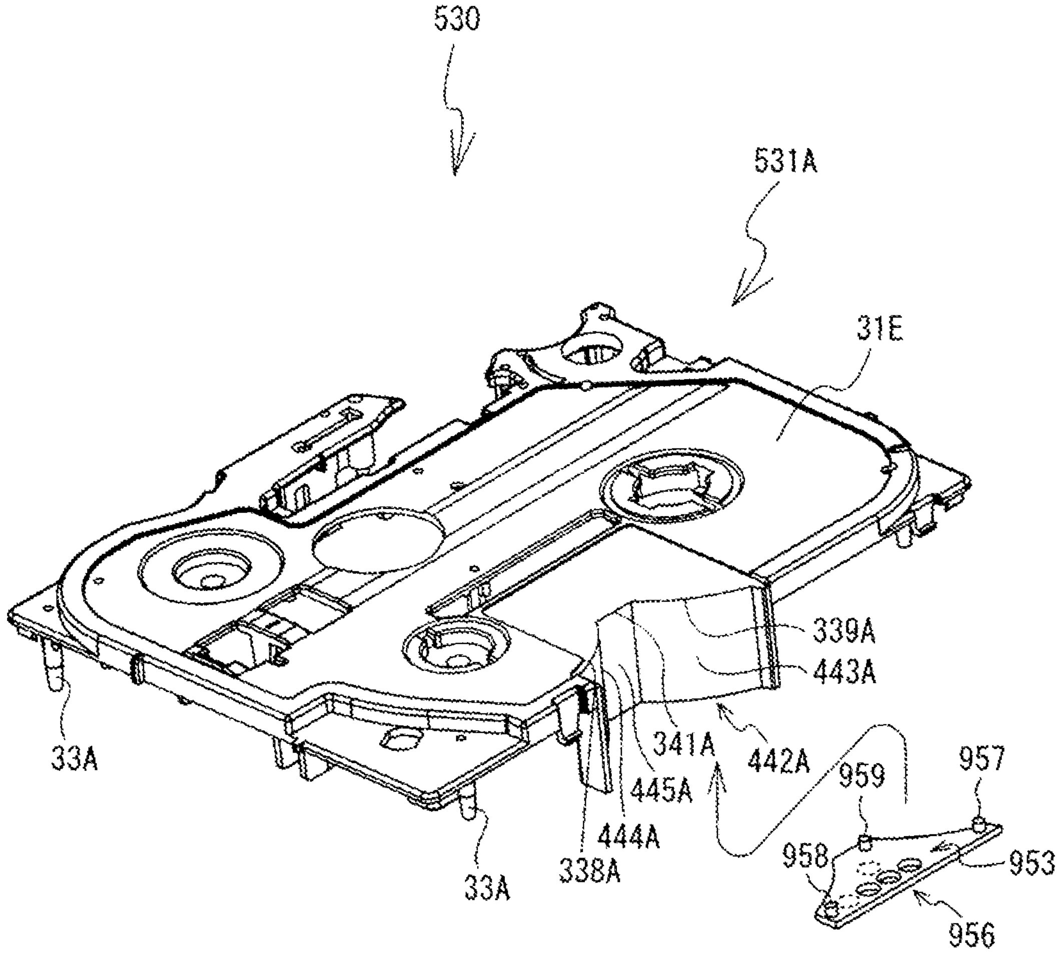
FIG. 23 is a view in which a second indicator member 956 is attached to an extended plate portion 442A.

As shown in FIG. 23, a plate-shaped extending plate portion 442A is provided that extends downward from the left arc portion 339A, the right arc portion 338A and the middle portion 341A of the top case 531A. The extending plate portion 442A is formed by a left plate portion 443A that extends downward from the left arc portion 339A, a right plate portion 444A that extends downward from the right arc portion 338A, and a middle plate portion 445A that extends downward from the middle portion 341A. A height dimension (a dimension in the up-down direction) of the extending plate portion 442A is the same as the height dimension from the top surface 30A of the tape cassette 530 to the lower surface of the corner portions 32A (refer to FIG. 9). A left end portion of the lower end face of the left plate portion 443A, a right end portion of the lower end face of the right plate portion 444A, and a right end portion of the lower end face of the middle plate portion 445A are respectively provided with concave portions (not shown in the drawings) that are recessed upward.

As shown in FIG. 23, a second indicator member 956 can be attached to and removed from the extending plate portion 442A. The second indicator member 956 is formed in a flat plate shape and has a substantially triangular shape in a plan view. A right end portion, a left end portion and a front end portion of the second indicator member 956 are respectively provided with convex portions 957, 958 and 959 that protrude upward from a top surface. The second indicator member 956 is provided with the rear indicator portion 953 in a similar way to the third embodiment. When the second indicator member 956 is attached to the extending plate portion 442A, the convex portions 957, 958 and 959 of the second indicator member 956 are respectively fitted into three concave portions that are formed in a lower end portion of the extending plate portion 442A of the top case 531A.

When the tape cassette 530 of the second modified example is assembled, the top case 531A, to which the first indicator member 935 and the second indicator member 956 have been attached, is attached to the bottom case 331B which is the same as that of the third embodiment. In a state in which the top case 531A is attached to the bottom case 331B, the second indicator member 956 is included in a portion of the bottom wall 331G (refer to FIG. 19) in a similar way to the above-described second indicator plate portion 955 (refer to FIG. 16). Therefore, when the tape cassette 530 is inserted in the cassette housing portion 8 (refer to FIG. 2), the second indicator member 956 is supported from below by the rear support portion 8C, and the rear indicator portion 953 is detected by the rear detection portion 300.

According to the tape cassette 530 of the second modified example, the first indicator member 935 and the second indicator member 956 are provided independently from the top case 531A and the bottom case 331B. Therefore, the common top case 531A and the common bottom case 331B can be respectively used regardless of the type of the tape housed in the tape cassette.

Figure 24:
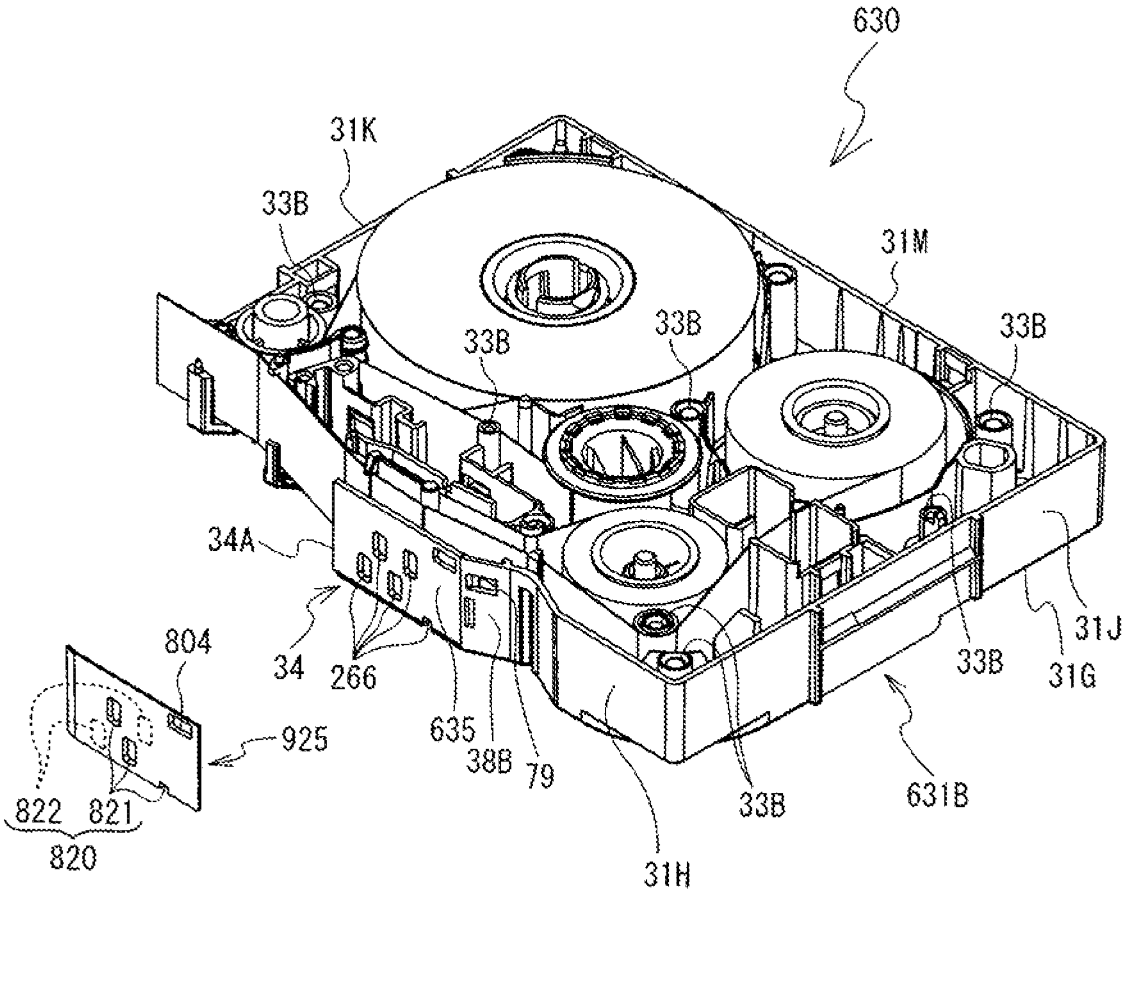
FIG. 24 is a view in which a first indicator member 925 is attached to a wall portion 635 according to a third modified example.

As shown in FIG. 24, as a modified example of the tape cassette 230 of the second embodiment, after a first indicator member 925 is adhered to a bottom case 631B, a top case may be attached to the bottom case 631B to form a cassette case. A tape cassette 630 of a third modified example, in which the first indicator member 925 is adhered to the bottom case 6318, will be explained with reference to FIG. 24.

The tape cassette 630 of the third modified example is provided with the bottom case 631B that has a substantially box shape. A wall portion 635 that is continuously provided from the lower semi-circular portion 38B to the left is formed in the bottom case 631B along a front end portion of the bottom wall 31G. Detection holes 266 are formed in the wall portion 635 in a similar way to the second embodiment. The first indicator member 925 in the form of a film is adhered to a front surface of the wall portion 635. The first indicator member 925 is provided with the arm indicator portion 820 in a similar way to the second embodiment.

Also in the tape cassette 630 of the third modified example, it is possible to attach the first indicator member 925 to the bottom case 631B while visually checking a surface of the tape housed in the bottom case 631B. The operator can attach the first indicator member 925 that indicates the correct tape type while confirming the type of the tape housed in the bottom case 631B, and it is thus possible to suppress assembly errors of the tape cassette 630.

In the above-described embodiments and modified examples, the arm indicator portions 800, 820 and 830 include the plurality of indicator portions. However, it is sufficient if each indicator portion includes at least one indicator hole (the non-pressing portion 801 in the present embodiment) and indicates the tape type. Although the non-pressing portion 801 is a through hole having a vertically long rectangular shape, the non-pressing portion 801 may have another shape. For example, the non-pressing portion 801 may have any opening shape, such as a square shape, a circular shape or the like, as long as the arm detection switch 210 can be inserted.

Further, although the rear indicator portions 950 and 953 include the plurality of indicator portions, it is sufficient if each indicator portion includes at least one indicator hole (the non-pressing portion 951 in the present embodiment) and indicates the tape type. The non-pressing portion 951 need not necessarily be a circular hole, and it may have a square shape, a rectangular shape or the like as long as the rear detection switch 310 can be inserted.

Although in the first embodiment, the latch hole 804 provided in the arm front surface 35 is provided in the first indicator member 900, it may be provided in the top case 31A. In this case, the first indicator member 900 need not be provided with the latch hole 804. Further, the latch hole 804 may be provided in a boundary portion between the first indicator member 900 and the top case 31A. Further, an upper end position of the indicator portions 800B and 800C may be used as a boundary between the first indicator member 900 and the top case 31A.

In the above-described embodiments and modified examples, the non-pressing portions 801 and the latch hole 804 are independent hole portions. In place of these, the plurality of non-pressing portions 801 may be included in a single continuous hole portion, or the non-pressing portions 801 and the latch hole 804 may be included in a single continuous hole portion.

In the first embodiment, the groove portion 901 is formed on the upper end face of the first indicator member 900, and the convex portion 907 is formed on the lower end face of the first indicator member 900. In the open portion 30D, the convex portion 30F is formed corresponding to the groove portion 901 and the groove portion 30E is formed corresponding to the convex portion 907. In place of these, a convex portion may be formed on the upper end face of the first indicator member 900, and a groove portion corresponding to this convex portion may be provided in the open portion 30D. A groove portion may be formed in the lower end face of the first indicator member 900, and a convex portion corresponding to this groove portion may be provided on the open portion 30D.

In the second embodiment, the first indicator member 920 is provided with the hole portion that corresponds to the latch hole 804. In place of this, the first indicator member 920 may have a size that covers the arm indicator portion 820 only.

The apparatus and methods described above with reference to the various embodiments are merely examples. It goes without saving that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A tape cassette comprising:

a cassette case which includes a bottom case and a top case that is attached to an upper side of the bottom case, and which includes a top surface, a bottom surface, a front surface and a pair of side surfaces;

a tape that is housed in the cassette case, the tape being a print medium;

a tape discharge portion that discharges, from the cassette case, the tape that has been guided in the cassette case along a predetermined feed path, at least part of which extends in parallel with the front surface;

a first indicator portion which includes at least one indicator hole and indicates a type of the tape;

a first indicator member which is a member independent from at least the bottom case, and which is provided with the first indicator portion; and a first attachment portion which is provided on an upstream side, in a tape feed direction, of the tape discharge portion in the front surface, and to which the first indicator member is removably attached;

wherein:

the first attachment portion is an opening portion that opens toward the front of the cassette case;

the first indicator member has a shape corresponding to an opening shape of the first attachment portion, and is fitted into the first attachment portion; and the at least one indicator hole opens towards the front of the cassette case in a state in which the first indicator member is attached to the first attachment portion.

2. The tape cassette according to claim 1, wherein the first indicator member is provided independently from the top case and the bottom case.

3. The tape cassette according to claim 2, wherein
the first attachment portion is formed between the top surface and the bottom surface in a state in which the top case is attached to the bottom case.

4. The tape cassette according to claim 3, wherein
the first attachment portion is a cutout portion which is formed continuously from the tape discharge portion toward a upstream side in the tape feed direction, and
the first indicator member is fitted into the first attachment portion from the tape discharge portion side toward the upstream side in the tape feed direction.

5. The tape cassette according to claim 2, wherein
the first attachment portion is provided along a front end edge of the bottom case.

6. The tape cassette according to claim 5, wherein
the first attachment portion is an opening portion that opens toward the front of the bottom case, and
the first indicator member has a shape corresponding to an opening shape of the first attachment portion, and is fitted into the first attachment portion.

7. The tape cassette according to claim 5, wherein the first attachment portion is a wall portion having a plurality of hole portions, and the first indicator member is a member in a form of a sheet or in a form of a film, and in a state of being adhered to the first attachment portion, the first indicator member covers, among the plurality of hole portions that the first attachment portion has, the hole portions except the hole portion that is communicatively connected with the indicator hole included in the first indicator portion.

8. The tape cassette according to claim 2, wherein
the first attachment portion is provided along a front end edge of the top case.

9. The tape cassette according to claim 1, further comprising:
a second indicator portion which includes at least one indicator hole and indicates a type of the tape, which is different from that indicated by the first indicator portion.

10. The tape cassette according to claim 9, wherein
the top case includes a plate-shaped bottom surface plate portion that is included in the bottom surface in a state in which the top case is attached to the bottom case, and
the second indicator portion is provided in the bottom surface plate portion.

11. The tape cassette according to claim 9, further comprising:
a second indictor member which is a member independent from the top case and the bottom case, and which is provided with the second indicator portion; and
a second attachment portion which is provided on the top case, and to which the second indicator member is attached.

12. The tape cassette according to claim 11, wherein
the second indicator portion is provided in the bottom surface in a state in which the second indicator member is attached to the second attachment portion and the top case is attached to the bottom case.

13. The tape cassette according to claim 1, wherein the first indicator member is provided in the top case.

14. The tape cassette according to claim 13, wherein the first indicator member is a plate-shaped portion that protruded downward from a front end edge of the top case, and
the bottom case includes
a first guide portion that guides the first indicator member to a position where the first indicator member is fitted into the first attachment portion when the top case is attached to the bottom case, and
a joining portion that is joined with the first indicator member when the first indicator member is guided by the first guide portion to the position where the first indicator member is fitted into the first attachment portion.

15. The tape cassette according to claim 14, further comprising:
a second indicator portion which includes at least one indicator hole and indicates a type of the tape, which is different from that indicated by the first indicator portion;
wherein
the top case includes a plate-shaped second indicator member that is included in the bottom surface in a state in which the top case is attached to the bottom case,
the second indicator portion is provided in the second indicator member,
the bottom case includes
a second attachment portion to which the second indicator member is attached, and
a second guide portion that guides the second indicator member such that the second indicator member is fitted into the second attachment portion when the top case is attached to the bottom case, and
the joining portion is joined with the first indicator member when the second indicator member is guided by the second guide portion to a position where the second indicator member is fitted into the second attachment portion.

* * * * *